US006211452B1

(12) United States Patent
Haruyama

(10) Patent No.: US 6,211,452 B1
(45) Date of Patent: *Apr. 3, 2001

(54) ELECTRONIC MUSICAL INSTRUMENT HAVING A FUNCTION OF DIVIDING PERFORMANCE INFORMATION INTO PHRASES AND DISPLAYING KEYS TO BE OPERATED FOR EACH PHRASE

(75) Inventor: Kazuo Haruyama, Hamamatsu (JP)

(73) Assignee: Yamaha Corporation, Hamamatsu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/552,526

(22) Filed: Nov. 9, 1995

(30) Foreign Application Priority Data

Nov. 10, 1994 (JP) .................................................. 6-300118
Dec. 5, 1994 (JP) .................................................. 6-330100
Mar. 7, 1995 (JP) .................................................. 7-077373

(51) Int. Cl.[7] ............................ G09B 15/02; G09B 15/08

(52) U.S. Cl. ....................... 84/477 R; 84/478; 84/479 A; 84/485 R; 84/464 A

(58) Field of Search ................................ 84/477 R, 478, 84/479 A, 485 R, 464 R, 464 A, 721, 746, 426, DIG. 25

(56) References Cited

U.S. PATENT DOCUMENTS 4,651,612 * 3/1987 Matsumoto .......................... 84/1.03
4,703,681 * 11/1987 Okamoto ............................... 84/478
5,107,743 * 4/1992 Decker .................................. 84/478
5,286,909 * 2/1994 Shibukawa ............................ 84/609
5,656,789 * 8/1997 Nakada et al. ..................... 84/477 R

* cited by examiner

*Primary Examiner*—Robert E. Nappi
*Assistant Examiner*—Marlon Fletcher
(74) *Attorney, Agent, or Firm*—Morrison & Foerster

(57) ABSTRACT

Plural key-displaying elements are provided in corresponding relation to plural keys. A series of performance information is divided into plural phrases, namely sections, and for each of the phrases, the displays corresponding to keys to be performed within the phrase are together lit, so as to guide a player about keys to be depressed. There is provided a phrase dividing device or program for automatically dividing a series of performance information into phrases on the basis of the contents of the information, so that a phrase-by-phrase key-depression instructing display can be effected. All the displaying elements corresponding to keys to be depressed within a phrase are lit, and as the performance progresses, the displaying element corresponding to each of the keys to be next depressed is changed from the lit state over to a blinking state. Key-depression instructing display for keys to be performed in a next phrase may be initiated at appropriate timing when the instructing display is being effected for the current phrase. In such a case, the displaying state may be sequentially changed from a specific key in the current phrase to another specific key in the next phrase. The phrase dividing operation may be performed appropriately in accordance with any of various determination criteria such as tone pitch information and other performance information, or in response to an operational state of a pedal operator.

67 Claims, 34 Drawing Sheets

OTHER EXAMPLE OF PERFORMANCE DATA IN PERFORMANCE INFOR. MEMORY (TRACK NO. TR=0)
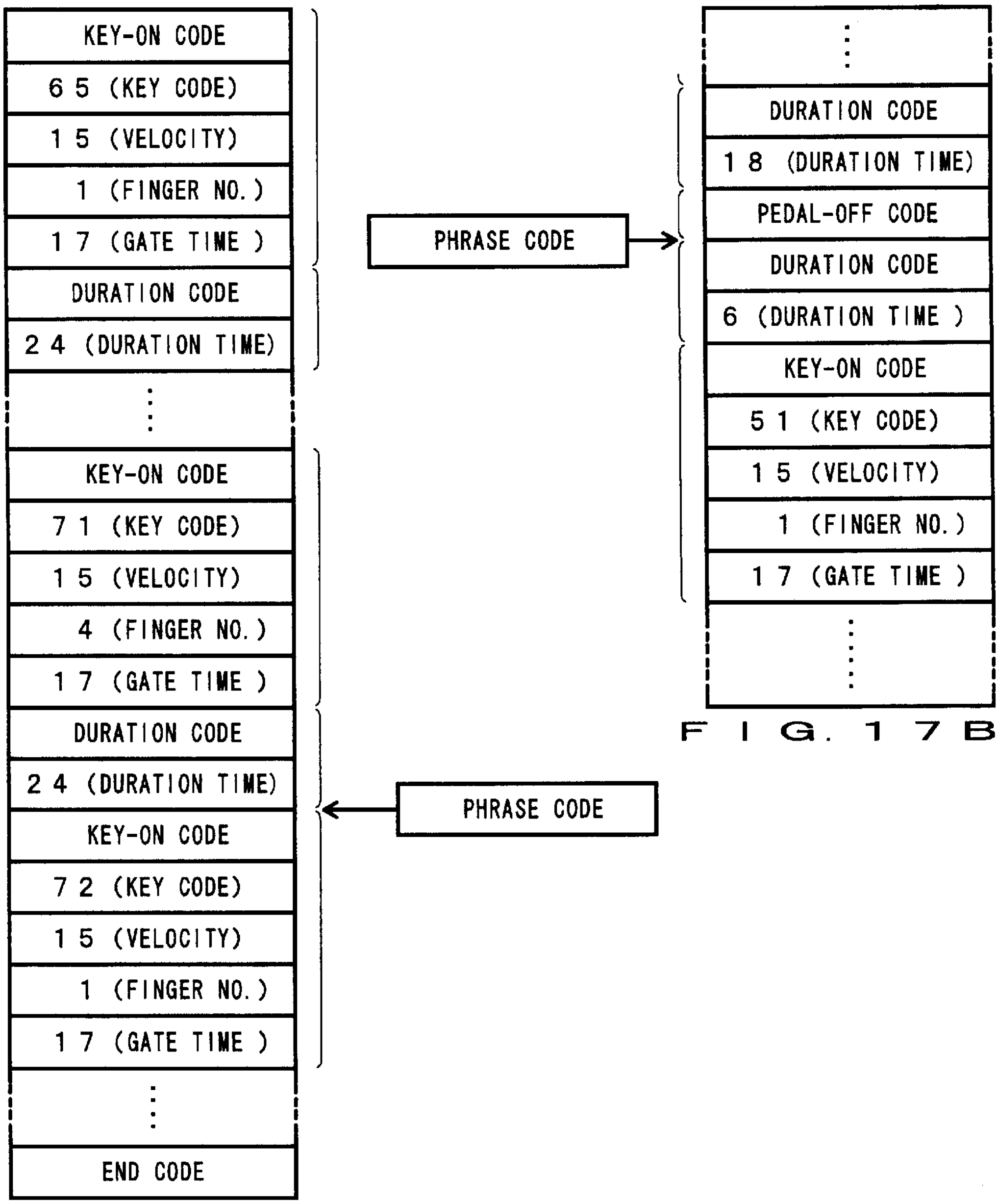
FIG. 17A
FIG. 17B
FIG. 18

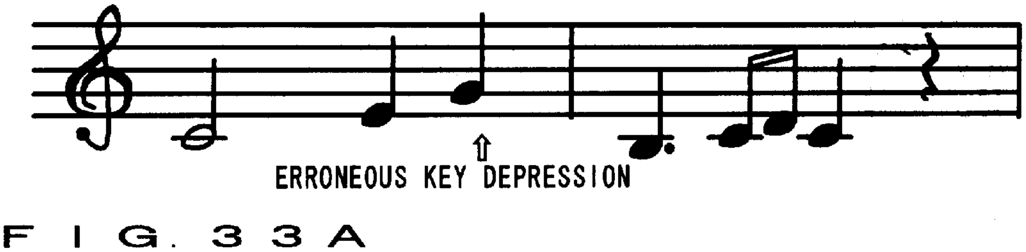
FIG. 33A
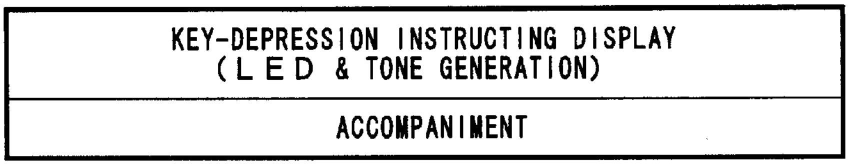
FIG. 33B
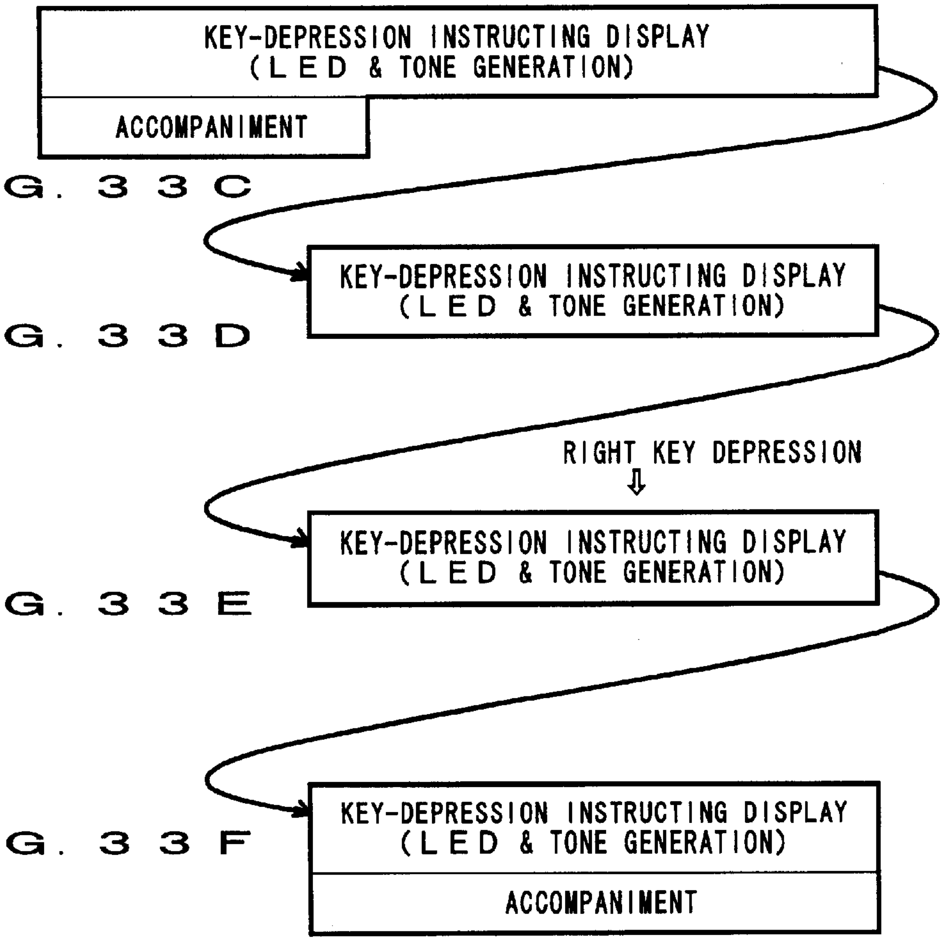
FIG. 33C
FIG. 33D
FIG. 33E
FIG. 33F

EXAMPLE OF PERFORMANCE DATA IN PERFORM. INFOR. MEMORY (TR=0)

ELECTRONIC MUSICAL INSTRUMENT HAVING A FUNCTION OF DIVIDING PERFORMANCE INFORMATION INTO PHRASES AND DISPLAYING KEYS TO BE OPERATED FOR EACH PHRASE

BACKGROUND OF THE INVENTION

The present invention relates to an electronic musical instrument having a function of displaying approximate places where a player should position his or her hands and fingers to depress keys as an assistance in playing the musical instrument ("key-depression instructing display" function).

The present invention also relates to an electronic musical instrument which divides performance information into a plurality of sections (phrases) in accordance with its contents, and is applicable to electronic musical instruments such as one having a key-depression instructing display function, and automatic performance devices and other similar devices.

Electronic musical instruments have been known which have a function of automatically instructing a player about keys to be depressed as an assistance in playing the musical instrument (key-depression instructing display function). Such electronic musical instruments typically have light emitting diodes (LEDs) provided adjacent to the upper edges of the keyboard keys in corresponding relations thereto and, in accordance with the progression of performance, sequentially lights the LEDs corresponding to the keys to be depressed, to thereby visually instruct what keys the player should depress.

Among the above-mentioned electronic musical instrument having the key-depression instructing display function, there are known one type which is designed to light only the LEDs corresponding to the keys to be depressed now, and another type which is designed to collectively light the LEDs corresponding to the keys to be depressed within a phrase (phrase-by-phrase LED lighting). Upon actual depression of a key by the player, these electronic musical instruments turn off the corresponding LED. A typical example of such electronic musical instruments is disclosed in, for example, Japanese Patent Publication No. SHO 63-187525.

However, in the prior art electronic musical instrument which is designed to light only the LEDs corresponding to the keys to be depressed now (key-by-key LED lighting type), it is necessary for the player to repeat operations, such as in a reflective action test, to quickly depress a key in response to lighting of a corresponding LED. Such performance operations would inevitably result in a sporadic, scattered performance, and therefore a natural, smooth performance could not be attained.

On the other hand, the electronic musical instrument which is designed to collectively light the LEDs corresponding to the keys to be depressed within a phrase (phrase-by-phrase LED lighting type) has the advantage that the player can recognize approximate places where the player should position his or her hands and fingers to depress the keys more easily than the key-by-key LED lighting type. But, with the instrument of the phrase-by-phrase LED lighting type, it is necessary that performance information to be utilized should be previously divided into phrases with particular data indicative of boundaries between the phrases. Thus, in the case of performance information undivided into phrases, the LEDs can not be lit on a phrase-by-phrase basis, so that it is necessary for the player or user to read out the performance information to divide it into phrases in advance.

Further, because of such an arrangement that the LEDs are turned off in response to actual depression of the LED-instructed keys, the player's eyes tend to unconsciously follow the turned-off LEDs, which would make it rather difficult for the player to accurately recognize the key-depression instruction by the LEDs.

In addition, because the LED displaying states are changed phrase by phrase, the LEDs corresponding to the keys to be depressed are collectively lit in response to each phrase change, and thus the key-depression instructing display immediately after the phrase change would be difficult to recognize.

SUMMARY OF THE INVENTION

It is therefore a first object of the present invention to provide an electronic musical instrument having a key-depression instructing display function, which allows key-displaying elements to be activated phrase by phrase even with music piece performance information undivided into phrases.

It is a second object of the present invention to provide an electronic musical instrument having a key-depression instructing display function, which is capable of preventing a reduced recognizability of the key-depression instructing display due to turning-off of key-displaying elements activated phrase by phrase.

It is a third object of the present invention to provide an electronic musical instrument having a key-depression instructing display function, which is capable of achieving an increased recognizability of the key-depression instructing display, activated phrase by phrase, at the time of a phrase change.

It is a fourth object of the present invention to provide a phrase dividing device which is capable of automatically dividing music piece performance information into phrases.

To achieve the above-mentioned objects, an electronic musical instrument in accordance with a first aspect of the present invention comprises a plurality of performance operators corresponding to a plurality of tone pitches, display means including a plurality of key-displaying elements provided in corresponding relation to said performance operators, performance information supply means for supplying a series of performance information constituting optional music piece, said performance information containing at least tone pitch information, dividing means for dividing the performance information for a music piece supplied from said performance information supply means into a plurality of sections, in accordance with contents of the performance information, and control means for, in accordance with performance progression of the music piece and for each of the sections, activating, into a displaying state, said key-displaying element corresponding to every tone pitch information contained in the performance information present within the section.

In the case of a keyboard musical instrument, for example, the performance operators comprise keys corresponding to various tone pitches, and the individual key-displaying elements comprise optical key-displaying elements such as light emitting diodes (LEDs) disposed in easy-to-see positions in corresponding relations to the individual keys. On the basis of the tone pitch information contained in a series of performance information for a music piece supplied from the performance information supply means, any of the key-displaying elements corresponding to the tone pitch information is activated into a displaying state (such as a lit or blinking state), so that the performance operators to be operated in accordance with the progression of performance are displayed to the player as a performance assistance or guide. Such a performance guide display is executed, for each section, by an automatic dividing process on the performance information by the dividing means.

The electronic musical instrument according to the first aspect of the present invention is characterized in that the dividing means operates to automatically divide the supplied performance information for a music piece into a plurality of sections in accordance with the contents of the performance information. The "section" divided by the dividing means is an equivalent to a "phrase" of a music piece. The term "phrase" as used herein refers to an optional fragment divided from a music piece just as a facility for key-depression guiding instruction and has a broader meaning than the normal "phrase" referring to a music piece fragment defined by a certain musical theory.

In one preferred embodiment, the dividing means includes determination means for, in accordance with the contents of the series of performance information for a music piece supplied from the performance information supply means, determining boundaries or dividing points between the sections, and means for supplying dividing information corresponding to the boundaries between the sections determined by the determination menas. With this arrangement, the series of performance information sequentially supplied from the supply means is divided into sections by dividing it in accordance with the dividing information.

The series of performance information, which is generally known as automatic performance sequence performance information, contains tone color data, key code data (i.e., tone pitch information), key-on/key-off data (i.e., key depression information), duration data (i.e., note length information), etc. corresponding to the music piece. The series of performance information is usually stored in a memory device or circuit so as to be read out sequentially therefrom in accordance with the progression of the music piece. The dividing means reads out the series of performance information containing these data and divides the read-out information into a plurality of sections in accordance with the contents of the information. That is, the dividing means determines, from the supplied series of performance information, a plurality of phrases dividing the music piece and divides the information into the sections in correspondence with the determined phrases. For example, if, as a result of analysis of the series of performance information, there is detected a place in the information where no tone generation event occurs more than a predetermined time (e.g., a place where a rest exits), the dividing information indicative of a dividing point may be inserted in that detected place.

In accordance with the performance progression of the music piece and for each of the sections, the control means performs control to simultaneously activate, into a displaying state, the key-displaying element corresponding to every tone pitch information contained in the performance information present within the section. That is, the key-displaying element (e.g., LED) associated with the key corresponding to every tone pitch information within a phrase is activated into a lit displaying state. According to the present invention as arranged in the above-mentioned manner, even where the series of performance information undivided into sections (phrases) is supplied from the supply means, it can be automatically divided into a plurality of phrases by means of the dividing means, so that the key-depression instructing or guiding display of keys to be depressed can be executed collectively phrase by phrase.

Further, an electronic musical instrument in accordance with a second aspect of the present invention comprises a plurality of performance operators corresponding to a plurality of tone pitches, display means including a plurality of key-displaying elements provided in corresponding relation to the performance operators, performance information supply means for supplying a series of performance information constituting optional music piece, the performance information containing at least tone pitch information, dividing means for dividing the performance information for a music piece supplied from the performance information supply means into a plurality of sections, and control means for, in accordance with performance progression of the music piece and for each of the sections, activating, into a displaying state, the key-displaying element corresponding to every tone pitch information contained in the performance information present within the section, activation by the control means of the key-displaying elements being simultaneously effected throughout the section in a first predetermined display mode.

The characteristic feature of the musical instrument in accordance with the second aspect invention resides in the displaying control by the control means. More specifically, the key-displaying element corresponding to every tone pitch information contained in the performance information present within a section is simultaneously activated and maintained in a displaying state of first predetermined display mode, so that even after a specific performance operator (key) to be operated in the section (phrase) has been actually operated, the corresponding key-displaying element is maintained in the displaying state. Namely, even after the player has operated (depressed) a specific key as instructed by the lightning of the corresponding key-displaying element, the key-displaying element is maintained in the lit state. Thus, where the key-displaying elements corresponding to one or more keys to be operated are being lit collectively, none of such key-displaying elements will be turned off one after another as the keys are depressed. This effectively prevents the player's eyes from unconsciously following the turned-off LEDs and hence prevents a decrease in recognizability of the key-depression instructing display.

The musical instrument in accordance with the second aspect invention may further comprise display change means for, in accordance with the performance progression within the specific section, changing a display mode of a specific key-displaying element corresponding to specific tone pitch information to be next performed from the first display mode to a predetermined second display mode. In this case, when any of the performance operators corresponding to the specific key-displaying element activated into the displaying state of the second display mode is operated, the display change means may restore the specific key-displaying element from the second display mode to the first display mode. As an example, the first display mode may be a mode to place the key-displaying elements in a "lit" displaying state, and the second display mode may be a mode to place the key-displaying element in a "blinking" displaying state. In addition, if the displaying time is limited, the blinking display of the second display mode may be effected such that the element is initially in the "turned-off" state, then placed in the "lit" state and then restored into the initial "turned-off" state. This state change order permits the player to well confirm the blinking state with less blinking actions of the key-displaying element.

Further, an electronic musical instrument in accordance with a third aspect of the present invention comprises a plurality of performance operators corresponding to a plurality of tone pitches, display means including a plurality of key-displaying elements provided in corresponding relation to the performance operators, performance information supply means for supplying a series of performance information constituting optional music piece, the performance information containing at least tone pitch information dividing means for dividing the performance information for a music piece supplied from the performance information supply means into a plurality of sections, and control means for, in accordance with performance progression of the music piece and for each of the sections, performing control to activate, activating into a displaying state of first display mode, the key-displaying element corresponding to every tone pitch information contained in the performance information present within the section, and also, in accordance with the progression of performance within the section, changing a display mode of specific one of the key-displaying elements corresponding to specific tone pitch information to be performed from the first display mode to a predetermined second display mode.

The characteristic feature of the musical instrument in accordance with the third aspect invention also resides in the displaying control by the control means. Namely, in accordance with performance progression of the music piece and for each of the sections, the control means performs control to activate, into a displaying state of first display mode (e.g., display by LED lighting), the key-displaying element corresponding to every tone pitch information contained in the performance information present within a section. Also, in accordance with the progression of performance within the section, the control means changes the display mode of specific one of the key-displaying elements corresponding to specific tone pitch information to be performed from the first display mode to a predetermined second display mode (e.g., display by LED blinking). Assuming that the tone pitch information to be performed within a phrase correspond to keys of “C4”, “D4” and “E4”, the key-displaying elements corresponding to the keys of “C4” , “D4” and “E4” are simultaneously lit within the phrase, and the thus-lit key-displaying elements are sequentially changed into a blinking displaying state as the key to be operated changes in accordance with the progression of performance within the phrase. Thus, every key to be operated (depressed) within a phrase is collectively guide-displayed in the first display mode (e.g., by lighting the corresponding key-displaying elements), so that the player can easily and quickly know or recognize approximate places where the player position his or her hands and fingers. Also, because a specific key to be operated (depressed) next is guide-displayed in the second display mode (e.g., by blinking the corresponding LED), the player can easily and quickly recognize the key to be actually operated next.

In the above-mentioned musical instrument in accordance with the third aspect invention, when one of the performance operators corresponding to the specific key-displaying element activated in the displaying state of the second display mode is operated, the control means may restore the specific key-displaying element from the second display mode to the first display mode. As an example, the first display mode may be a mode to place the key-displaying elements in a lit displaying state, while the second display mode may be a mode to place the key-displaying element in a blinking displaying state. In addition, if the displaying time is limited, the blinking of the second display mode may be effected such that the element is initially in the “turned-off” state, then placed in the “lit” state and then restored into the initial “turned-off” state. This state change order permits the player to well confirm the blinking state with less blinking actions of the key-displaying element.

Further, an electronic musical instrument in accordance with a fourth aspect of the present invention comprises a plurality of performance operators corresponding to a plurality of tone pitches, display means including a plurality of key-displaying elements provided in corresponding relation to the performance operators, performance information supply means for supplying a series of performance information constituting optional music piece, the performance information containing at least tone pitch information, dividing means for dividing the performance information for a music piece supplied from the performance information supply means into a plurality of sections, and control means for, in accordance with performance progression of the music piece and for each of the sections, performing control to activate, into a displaying state of predetermined display mode, the key-displaying elements corresponding to the tone pitch information contained in the performance information present within a first section, and activate, into a displaying state of predetermined display mode, the key-displaying elements corresponding to the tone pitch information of the performance information present within a second section following the first section.

The characteristic feature of the musical instrument in accordance with the fourth aspect of the present invention also resides in the displaying control by the control means. Namely, the control means performs control to activate, into a displaying state of predetermined display mode, the key-displaying elements corresponding to the tone pitch information contained in the performance information present within a first section (current phrase), and also activate, into a displaying state of predetermined display mode, the key-displaying elements corresponding to the tone pitch information of the performance information present within a second section (next phrase) following the first section. Thus, while the key-depression instructing display for the current phrase is executed in a predetermined display mode, the key-depression guiding display for the current phrase can be executed in a predetermined display mode. This allows the player to recognize a key depression range for the next phrase before the current phrase changes to the next one, substantially improving the recognizability of the guiding display at the time of a phrase change.

As one embodiment of the fourth aspect invention, when a performance in the first section has progressed to reach performance timing of Nth (wherein N is a natural number) tone pitch information before the end of the first section, the control means may simultaneously activate, into the displaying mode, the key-displaying element corresponding to every tone pitch information of the performance information present within the second section. For instance, upon arrival at timing to perform the last tone pitch information in the current section, i.e. phrase, the control means simultaneously activates the key-displaying element corresponding to every tone pitch information of the next section, i.e. phrase.

As another embodiment of the fourth aspect invention, when activating a first key-displaying element corresponding to predetermined tone pitch information present within the first section, the control means may sequentially activate, into the displaying state, one or more predetermined key-displaying elements provided between the first key-displaying element and a second key-displaying element corresponding to the predetermined tone pitch information present within the second section, and then the control means may perform control to activate, into the displaying state of predetermined display mode, the key-displaying elements corresponding to the tone pitch information of the performance information present within the second section.

Further, an electronic musical instrument in accordance with a fifth aspect of the present invention comprises a plurality of performance operators corresponding to a plurality of tone pitches, display means including a plurality of key-displaying elements provided in corresponding relation to the performance operators, performance information supply means for supplying a series of performance information constituting optional music piece, the performance information containing at least tone pitch information, dividing means for dividing the performance information for a music piece supplied from the performance information supply means into a plurality of sections, and control means for, in accordance with performance progression of the music piece and for each of the sections, performing control to activate, into a displaying state of predetermined display mode, the key-displaying elements corresponding to the tone pitch information contained in the performance information present within a first section, and also start activating, in the course of or at the end of the first section, the key-displaying elements corresponding to the tone pitch information of the performance information present within a second section following the first section into a displaying state of predetermined display mode, wherein prior to starting activating the key-displaying elements for the second section, the control means performs control to sequentially activate, into a displaying state, one or more predetermined key-displaying elements provided between a first key-displaying element corresponding to predetermined tone pitch information present within the first section and a second key-displaying element corresponding to predetermined tone pitch information present within the second section.

The characteristic feature of the musical instrument in accordance with the fifth aspect invention also resides in the displaying control by the control means. Namely, the control means performs control to activate, into a displaying state of predetermined display mode, the key-displaying elements corresponding to the tone pitch information contained in the performance information present within a first section (current phrase). The control means also starts activating, in the course of or at the end of the first section, the key-displaying elements corresponding to the tone pitch information of the performance information present within a second section (next phrase) following the first section into a displaying state of predetermined display mode. Prior to starting activation of the key-displaying elements for the second section, the control means performs control to sequentially activate one or more predetermined key-displaying elements provided between a first key-displaying element corresponding to predetermined tone pitch information present within the first section (e.g., last tone pitch information in the phrase) and a second key-displaying element corresponding to predetermined tone pitch information present within the second section (e.g., first tone pitch information in the phrase).

That is, in starting key-depression instructing display for the next phrase in the course of performance of the current phrase as in the above-mentioned fourth aspect invention, as well as in starting key-depression instructing display for the next phrase at the end of the current phrase (i.e., at the time of a phrase change), the control means sequentially activates one or more predetermined key-displaying elements provided between a first key-displaying element corresponding to predetermined tone pitch information present within the first section (e.g., last tone pitch information or other tone pitch information before the last tone pitch information in the first section) and a second key-displaying element corresponding to predetermined tone pitch information present within the second section (e.g., first tone pitch information or other tone pitch information after the first one in the second section). If the above-mentioned first key-displaying element corresponds to the key of "C4" and the above-mentioned second key-displaying element corresponds to the key of "A4", all the intervening key-displaying element may be sequentially lit which corresponds to the keys of "C#4" to "G#4". Alternatively, only one or more of the intervening key-displaying elements may be selected to be sequentially activated. This arrangement achieves a smooth transfer of the guiding display from the position of the performance operators corresponding to the current phrase to the position of the performance operators corresponding to the next phrase, to thereby allow the player's eyes to easily move to the position of the performance operators corresponding to the next phrase when the music piece performance progresses from the current position to the next phrase. Consequently, the player can easily recognize the position of the performance operators to be operated in the next phrase.

In each of the second to fifth aspects of the invention, there may be employed phrase dividing means which automatically performs the phrase dividing process as defined in connection with the first aspect invention, or alternatively, such phrase dividing means may be employed which effects a phrase division at every predetermined section in accordance with appropriate phrase dividing information prepared in advance.

Furthermore, in order to accomplish the above-mentioned objects, a phrase dividing device in accordance with the present invention comprises performance information supply means for supplying a series of performance information constituting optional music piece, detection means for detecting, from the series of performance information, a change point where performance fingering changes, and dividing means for determining a point dividing the music piece on the basis of detection by the detection means and dividing the series of performance information supplied from the performance information supply means, at the point determined by the dividing means, into a plurality of sections. Preferably, the detection means may detect a change point where player's fingers operating the performance operators effects cross-fingering.

On the basis of the tone pitch information contained in the performance information, the detection means can detect or predict a point where the player's fingering changes. For example, the player's fingering varies greatly where, after a tone pitch considerably differing in musical interval from the last-operated tone pitch is to be performed. In this case, by detecting such fingering change points, it is allowed to divide the music piece at every detected point and thereby automatically divide the performance information of the music piece. Some form of the performance information may contain, as the tone pitch information, finger number information indicative of a specific finger to be used for depressing a key, in addition to information indicative of the tone pitch, i.e., key (e.g., key code). In such a case, it is possible to even more accurately detect a point where cross-fingering occurs, on the basis of the finger number information. More specifically, once the performance has progressed to reach a pre-detected cross-fingering point, the series of performance information is phrase-divided by insertion of the dividing information (phrase data) indicative of a dividing point.

By performing the above-mentioned phrase dividing process on the basis of the fingering change point, an appropriate phrase division is achieved taking the fingering into account. Thus, where this phrase dividing device is applied to an electronic musical instrument with a key-depression instructing display function as previously mentioned, a phrase-by-phrase key-depression instructing display can be executed in a desirable manner taking the fingering into account.

The performance information divided into phrases by the dividing device of the present invention may be utilized for any desired purpose. For example, the phrase-divided performance information may be utilized in electronic musical instruments with a key-depression instructing display function as previously mentioned, or in automatic performance devices or musical-instrument-equivalent devices for other purposes. Of course, the phrase dividing device of the present invention may be implemented by a personal computer, or by a performance information processing device or program using the computer.

A phrase dividing device in accordance with another aspect of the present invention comprises performance information supply means for supplying a series of performance information constituting optional music piece, a foot operator information supply means including a foot operator operable by a player's foot and supplying foot operator information indicative of an operational state of the foot operator, and dividing means for dividing the series of performance information supplied from the performance information supply means into a plurality of sections in accordance with the foot operator information supplied from the foot operator information supply means.

In this phrase dividing device, the series of performance information is divided into a plurality of sections in accordance with the foot operator information indicative of an operational state of the foot operator (which may be an existing pedal operator such as a damper pedal). In this way, a desired phrase division is achieved by the player operating the foot operator at desired timing while the music piece is automatically reproduced.

A phrase dividing device in accordance with still another aspect of the present invention comprises performance information supply means for supplying a series of performance information constituting optional music piece, the performance information including at least key-on and key-off information to control tone generation, detection means for detecting, on the basis of the key-on and key-off information supplied from the performance information supply means, when an key-off state lasts more than a predetermined time, and dividing means for, on the basis of detection by the detection means, dividing the series of performance information supplied from the performance information supply means at every point where the key-off state lasts more than the predetermined time and thereby dividing the series of performance information into a plurality of sections.

The above-mentioned phrase dividing device is characterized in that it performs an automatic phrase dividing process by detecting when an key-off state lasts more than a predetermined time on the basis of the key-on and key-off information supplied from the performance information supply means and then dividing the series of performance information at every point where the key-off state lasts more than the predetermined time.

A phrase dividing device in accordance with still another aspect of the present invention comprises performance information supply means for supplying a series of performance information constituting optional music piece, the performance information including at least tone pitch information, and dividing means for dividing the series of performance information supplied from the performance information supply means into a plurality of sections, on the basis of a pitch range of the tone pitch information supplied from the performance information supply means.

Preferably, the dividing means sequentially may analyze the supplied performance information to detect a point where a range from a lowest pitch tone to a highest pitch tone in the tone pitch information has exceeded a predetermined pitch range (e.g., one octave) and insert data, indicative a dividing point, at the detected point so as to divide the performance information into phrases. Thus, the performance information can be divided into a plurality of sections in such a manner that a group of tone pitch information contained in each section falls within a predetermined pitch range, and because the phrase-division of the performance information is performed in correspondence with such sections, there can be achieved a phrase-division taking into account a range of fingering during a performance.

A phrase dividing device in accordance with still another aspect of the present invention comprises performance information supply means for supplying a series of performance information constituting optional music piece, the performance information including at least tone pitch information, and dividing means for dividing the series of performance information supplied from the performance information supply means into a plurality of sections in such a manner that the number of different tone pitch information contained in each of the sections is not greater than a predetermined value.

The above-mentioned phrase dividing device is characterized in that the dividing means divides the series of performance information into a plurality of sections in such a manner that the number of different tone pitch information contained in each of the sections is not greater than a predetermined value, although any appropriate method may be used for execution of the phrase division. For example, assuming that the above-mentioned predetermined value is "4" and tone pitch information indicative of "C4", "D4", "E4", "C4" and "F4" are sequentially performed in a specific section (phrase) in the mentioned order, the total number of different tone pitch information in the phrase ("4") does not exceed the predetermined value "4", and hence that phrase division can be allowed. If, however, the tone pitch information contained in a section are "C4", "D4", "G4", "F4" and "E4", then the total number of tone pitch number is "5" greater than the predetermined value "4", and hence that phrase division can not be allowed; so the phrase division is modified to include only four different tone pitch information such as "C4", "D4", "E4" and "F4". As the result, where a key-depression instructing display is effected phrase by phrase on the basis of the divided performance information, the number of keys to be collectively displayed for each phrase can be limited to an appropriate value because the phrase division is executed in such a manner that the number of keys to be displayed does not exceed a predetermined value.

A phrase dividing device in accordance with still further aspect of the present invention comprises performance information supply means for supplying a series of performance information constituting optional music piece, the performance information including at least tone pitch information, and dividing means for dividing the series of performance information supplied from the performance information supply means into a plurality of sections in such a manner that the number of different tone pitch information contained in each of the sections is greater than a predetermined value.

The above-mentioned phrase dividing device is characterized in that the dividing means divides the series of performance information into a plurality of sections in such a manner that the number of different tone pitch information contained in each of the sections is greater than a predetermined value, although any appropriate method may be used for execution of the phrase division. Namely, this prevents the number of tone pitch information contained in a section (phrase) from becoming extremely small, to thereby avoid reduced efficiency of the key-depression instructing display which is for example executed phrase by phrase on the basis of the divided performance information. For example, depending on a manner of the phrase division, the number of tone pitch information may become extremely small such as only one or two, and accordingly the number of keys to be guide-displayed may become extremely small such as only one or two, thus inevitably resulting a poor efficiency of the instructing display. In view of this, the present invention is constructed to guarantee that the number of keys to be collectively guide-displayed is always greater than a predetermined value, to thereby enhance the efficiency of the instructing display.

A phrase dividing device in accordance with still further aspect of the present invention comprises performance information supply means for supplying a series of performance information constituting optional music piece, the performance information including at least tone pitch information, and dividing means for dividing the series of performance information supplied from the performance information supply means into a plurality of sections in such a manner that the number of different tone pitch information contained in each of the sections is within a range between first and second predetermined values.

With the above-mentioned arrangement, where a phrase-by-phrase key-depression is executed on the basis of the divided performance information, the performance information is divided into phrases in such a manner that the number of keys to be guide-displayed falls within a predetermined range. Consequently, the number of keys to be collectively guide-displayed for each phrase can be limited to an appropriate range.

A phrase dividing device in accordance with still further aspect of the present invention comprises performance information supply means for supplying a series of performance information constituting optional music piece, the performance information including at least tone pitch information, and dividing means for dividing the series of performance information supplied from the performance information supply means into a plurality of sections, in accordance with the number of the tone pitch information contained in the performance information. With this arrangement, it is possible to automatically perform a simplified phrase dividing process based on the number of tone pitch information contained in the performance information.

For better understanding of the features of the present invention, the preferred embodiments of the present invention will be described in detail below with reference to the accompanying drawings.

BRIEF DESCRIPTION OF THE DRAWINGS

In the accompanying drawings:

FIGS. 17A and 17B are diagrams each showing another example format of performance data for a single track stored in a performance information memory of FIG. 13;

FIG. 18 is a diagram showing an example of a score corresponding to the performance data of FIG. 17A;

FIGS. 33A to 33F are diagrams showing an example of a repeated key-depression instructing display process in the third embodiment where when the guide mode register is at "0", a key-depression instructing display by both LED lighting and tone generation is repeated until a right key is depressed;

DETAILED DESCRIPTION OF THE PREFERRED EMBODIMENTS

Figure 2:
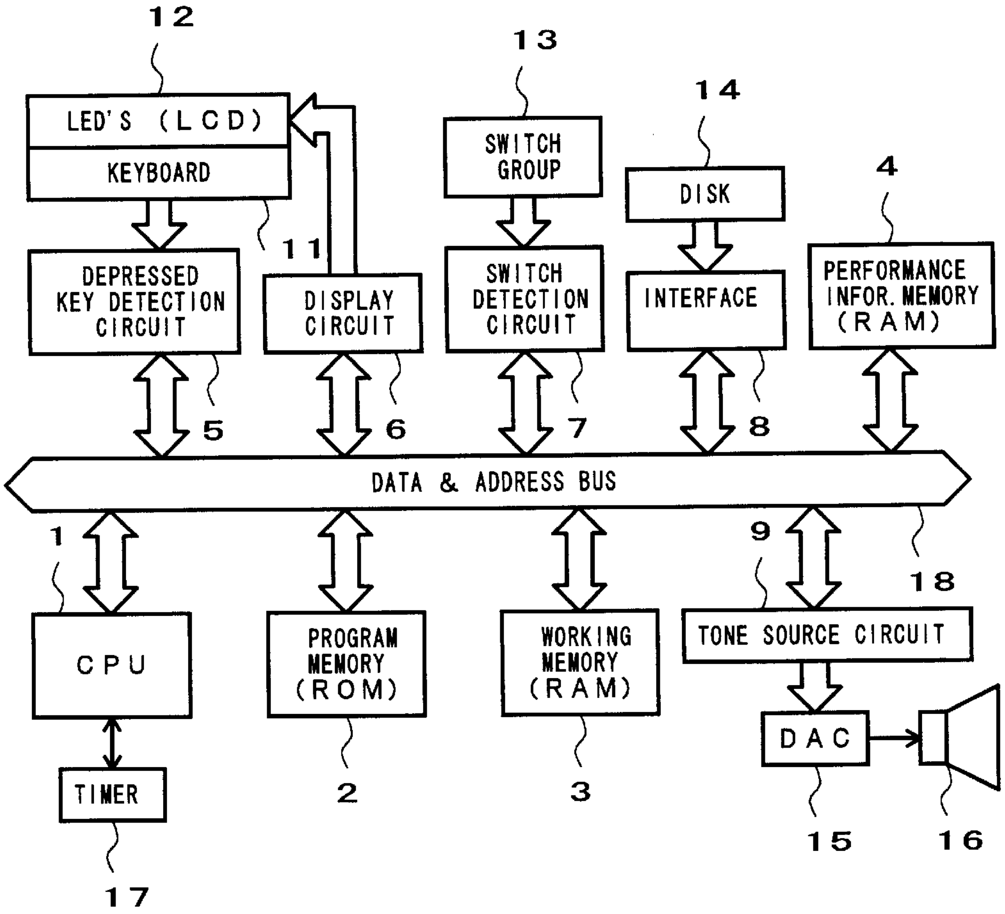
FIG. 2 is a hardware block diagram illustrating an example of the hardware structure of the electronic musical instrument having the key-depression instructing display function in accordance with an embodiment of the present invention.

FIG. 2 is a hardware block diagram illustrating an example of the hardware structure of an electronic musical instrument having a key-depression instructing display function in accordance with an embodiment of the present invention. This electronic musical instrument includes LEDs (Light Emitting Diodes) and an LCD (Liquid Crystal Display) adjacent to the upper edge of a keyboard, so that in accordance with performance data, any of the LEDs and LCD can display approximate places along the keyboard where the player should position his or her hands and fingers to depress the keyboard keys for music piece performance, and also display the individual keys to be depressed now and next.

In this embodiment, the electronic musical instrument performs various processes under the control of a microcomputer that comprises a microprocessor unit (CPU) 1, a program memory (ROM) 2 and a working memory (RAM) 3.

The CPU 1 controls the entire operation of the electronic musical instrument. To this CPU 1 are connected, via a data and address bus 18, the program memory 2, working memory 3, performance information memory 4, depressed key detection circuit 5, display circuit 6, switch operation detection circuit 7, interface 8 and tone source circuit 9.

The program memory 2, which is a read-only memory, prestores system programs for the CPU 1 and various tonal parameters and data.

The working memory 3 is allocated in predetermined address areas of a random access memory (RAM) for temporarily storing various data and flags which arise as the CPU 1 executes a program.

For each of predetermined music pieces, the performance information memory 4 prestores, in a plurality of tracks, performance data of the music piece to be performed by the player, and performance data of accompaniment tones (chord, bass and rhythm tones) accompanying the music piece. Assume that the number of available tracks is "9" in this embodiment. The performance data are like those used in an average automatic performance and comprised of key data, duration data, tone color data, effect data, etc.

The keyboard 11 has a plurality of keys for designating the pitch of each tone to be generated and key switches provided in corresponding relations to the keys. If necessary, the keyboard 11 may also include a key-touch detection means such as a key depression velocity or force detection device. The keyboard 11 is employed here just because it is a fundamental performance operator which is relatively easy for players to manipulate, but any other suitable performance operator may of course be employed.

The depressed key detection circuit 5, which includes key switch circuits provided in corresponding relations to the keys on the keyboard 11, outputs key-on event data upon detection of a newly depressed key and key-off event data upon detection of a newly released key, as well as a key code (note number) indicative of the pitch of the key where the key-on or key-off event has occurred. The depressed key detection circuit 5 also detects the key depression velocity or force to output velocity data or after-touch data.

A display device 12 includes the LEDs and LCD near the upper side of the keyboard ll,in such a manner that a pair of red-color and green-color LEDs is provided for each of the keys.

In accordance with the performance data, the display circuit 6 functions to light any of the LEDs and display predetermined graphic symbols on the LCD.

The switch operation detection circuit 7, which is provided in corresponding relations to operators 13, detects the operational state of each of the operators 13 and outputs data indicative of the detected operational state as event information.

Among these operators 13 are a load switch for controlling data readout from a disk 14, a start/stop switch for controlling start/ stop of an automatic performance and a visual indication of key to be depressed (i.e., "key-depression instructing display"), and various other operators for selecting, setting and controlling the color, volume, effect etc. of each tone to be generated.

The disk 14 is a data storage medium such as a floppy disk which prestores various performance data corresponding to predetermined music pieces.

The interface 8 functions to convert the performance data stored in the disk 14 into data processable in the microcomputer.

The tone source circuit 9, which is capable of generating plural tone signals simultaneously through a plurality of tone generation channels, on the basis of the performance data supplied via the data and address bus 18.

Any tone signal generation method may be used in the tone source circuit 9 depending on a desired application. For example, any conventionally known tone signal generation method may be used such as: the memory readout method where tone waveform sample value data stored in a waveform memory are sequentially read out in accordance with address data that change in correspondence to the pitch of tone to be generated; the FM method where tone waveform sample value data are obtained by performing predetermined frequency modulation operations using the above-mentioned address data as phase angle parameter data; or the AM method where tone waveform sample value data are obtained by performing predetermined amplitude modulation operations using the above-mentioned address data as phase angle parameter.

The tone signal generated by the tone source circuit 9 is audibly reproduced or sounded through a digital-to-analog converter (DAC) 15 and a sound system 16 including amplifiers and speakers.

Timer 17 generates clock pulses which are used to count time intervals and to read out the performance data from the performance information memory 4, and the frequency of the clock pulses is adjustable via a tempo switch (not shown) which is one of the operators 13. Each generated clock pulse is given to the CPU 1 as a timer interrupt command, so that the CPU 1 performs an interrupt process according to the clock pulse to generate a tone or indicate a key to be depressed.

Figure 3:
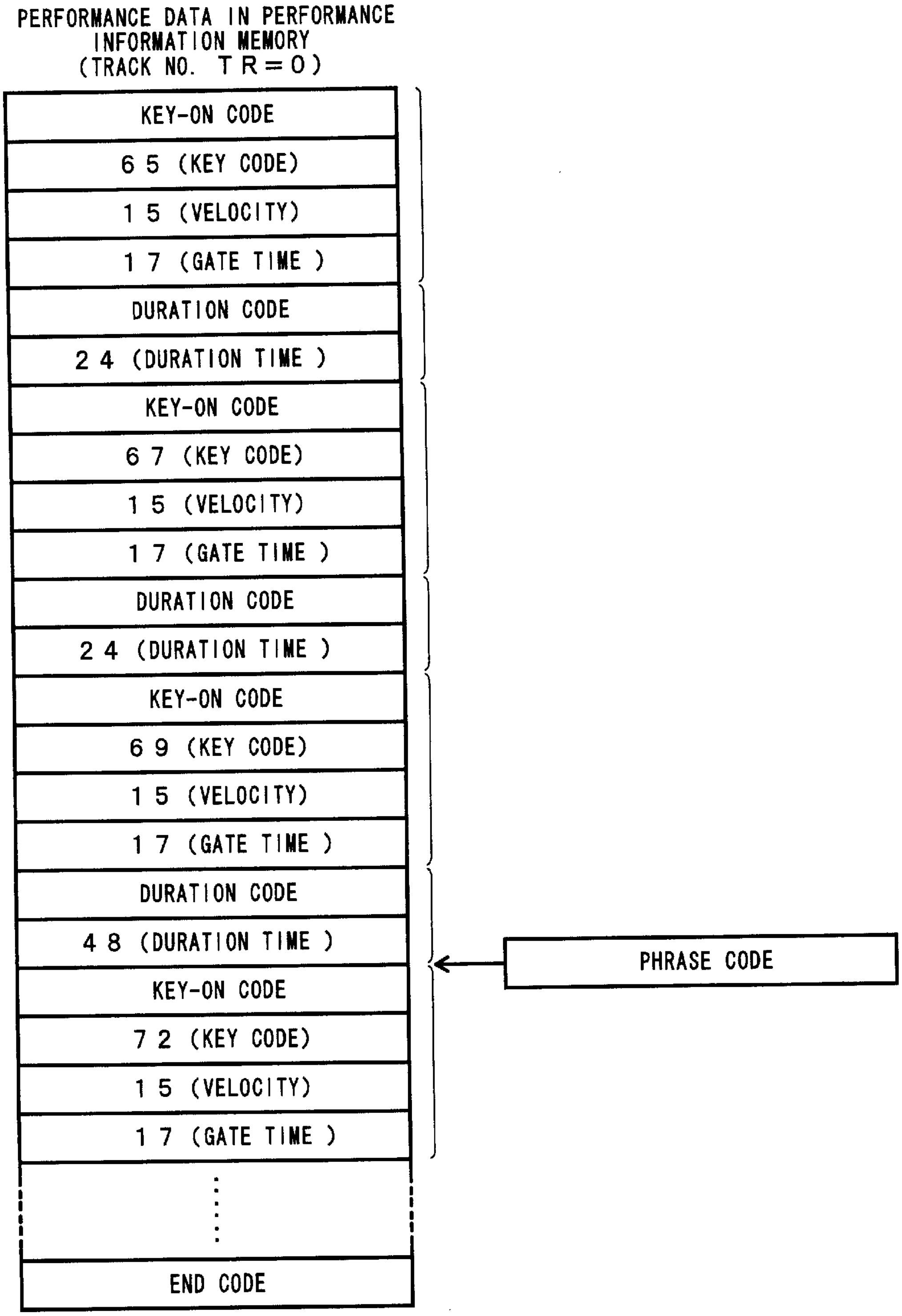
FIG. 3 shows an example format of performance data for a single track stored in a performance information memory of FIG. 2.

In FIG. 3, there is shown an example format of the performance data for a single track (track number TR=0) stored in the performance information memory 4. Track number "0" (TR=0) represents a track storing the performance data relating to keys to be depressed by the right hand, and track number "1" (TR=1) represents a track storing the performance data relating to keys to be depressed by the left hand. Other track numbers 2 to 8 (TR=2 to 8) represent tracks storing the performance data relating to accompaniment tones (chord, bass and rhythm tones).

As shown in FIG. 3, the performance data comprises key data, duration data and an end code. The key data includes a key-on code indicating that succeeding data is data relating to a key-on event, a key code indicative of the pitch of the key, velocity data indicative of the depression velocity of the key, and gate time data indicative of the length or duration of a tone to be generated. The duration data includes a duration code indicating that succeeding data is data relating to a duration, and duration time data indicative of a time interval between events. The end code indicates an end of the key-depression instructing data. As will be described later, the electronic musical instrument according to this embodiment functions to insert phrase codes, each between the duration time and key-on code as shown, to thereby automatically divide the performance data into phrases.

Next, a description will be made about exemplary processes which are carried out in the electronic musical instrument of FIG. 2 by the microcomputer.

Figure 4:
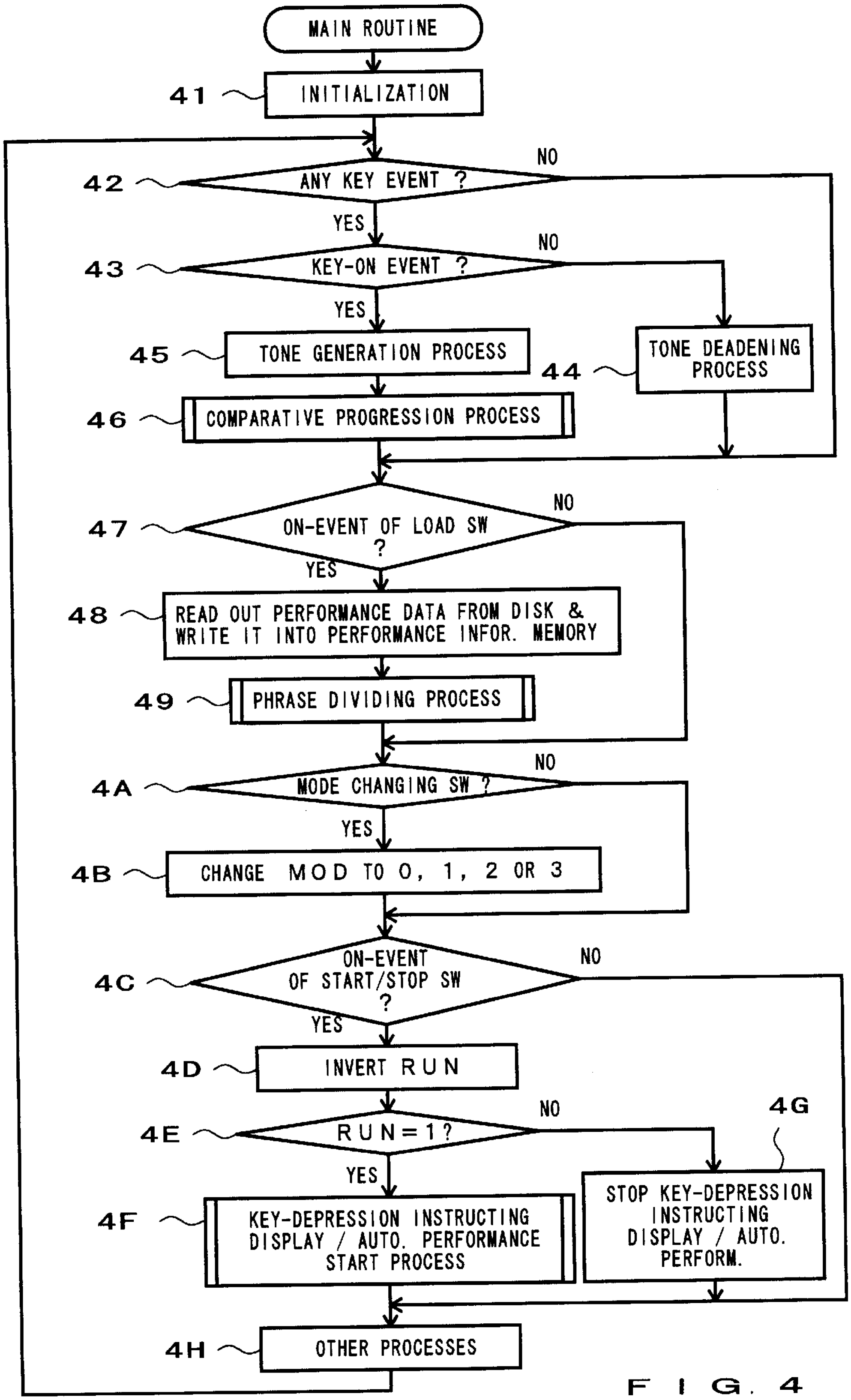
FIG. 4 is a flowchart of an example of a main routine that is carried out by a microcomputer.

FIG. 4 is a flowchart of a main routine that is performed by the microcomputer in the following step sequence.

Step 41: Upon power-on, the CPU 1 commences an initialization process based on a control program stored in the program memory 2, where various registers and flags in the working memory 3 are set to respective predetermined initial values.

Step 42: The depressed key detection circuit 5 is scanned to determine whether there has occurred any key event in response to the player's operation on the keyboard 11. If answered in the affirmative, the routine proceeds to next step 43, but if not, the routine jumps to step 47.

Operations of steps 43 to 45 are performed every time there has occurred a key event corresponding to the player's operation on the keyboard 11.

Step 43: A determination is made as to whether the key event detected is a key-on or key-off event. If it is a key-on event (YES), the routine proceeds to step 45; otherwise, the routine branches to step 44.

Step 44: Because the key event is a key-off event as determined at the preceding step, a tone deadening or muting process corresponding to the event is performed, and then the routine goes to step 47.

Step 45: Because the key event is a key-on event as determined at step 43, a tone generation process corresponding to the event is performed.

Step 46: A comparative progression process is performed, where control is made about whether or not to execute a key-depression instructing display while making a comparative determination as to whether every key to be depressed (i.e., for which the corresponding LED is blinking or flashing, in this embodiment) has actually been depressed by the player. After this step, the routine goes to step 47.

Figure 5:
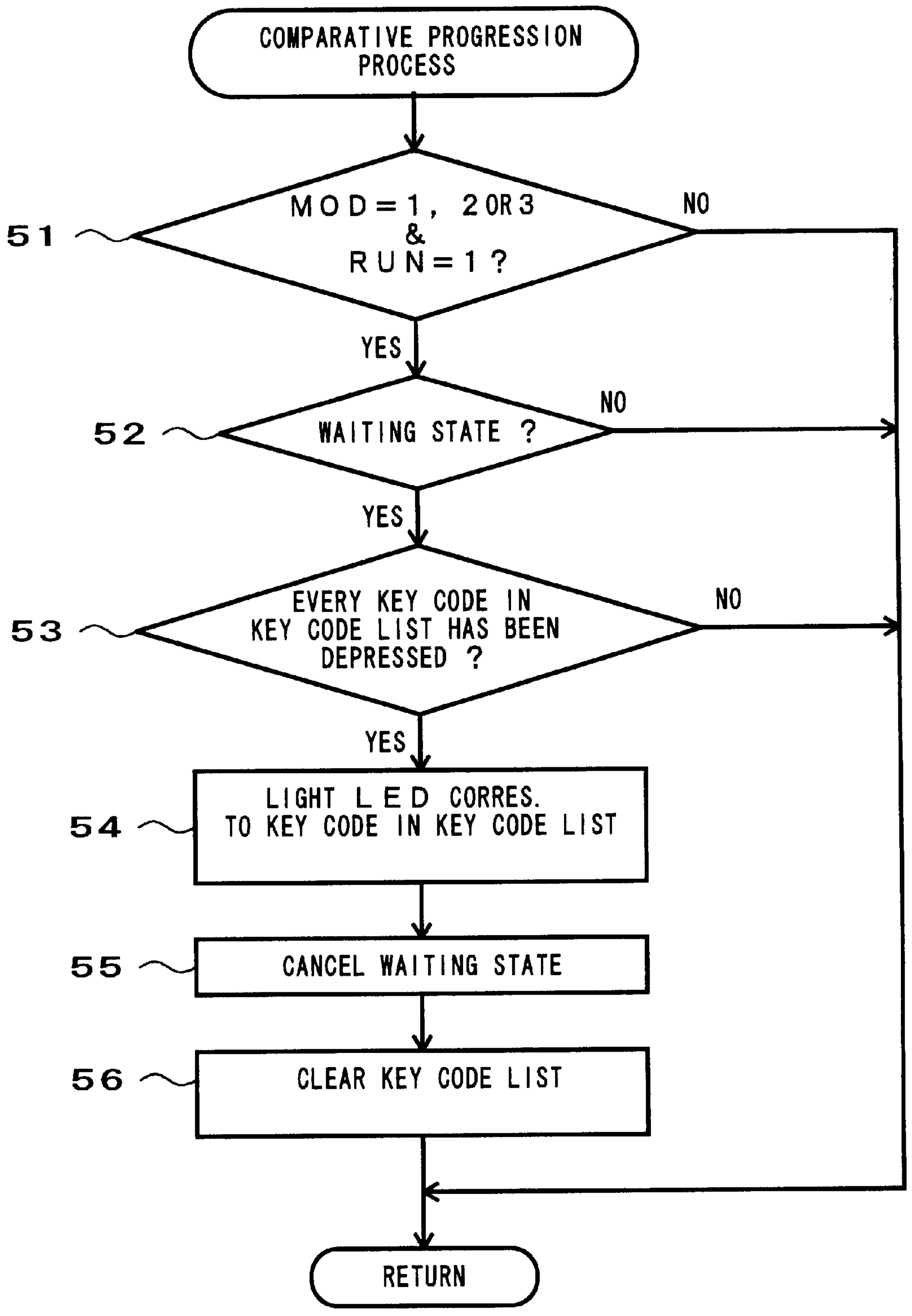
FIG. 5 is a flowchart illustrating a detailed example of a comparative progression process of FIG. 4.

FIG. 5 illustrates the detail of the comparative progression process of step 46 which is typically performed in the following step sequence.

Step 51: It is determined whether a mode number register MOD is at a value of "1", "2" or "3" and a running state flag RUN is at "1". If answered in the affirmative, the program proceeds to step 52; otherwise, the program returns to step 47 of the main routine of FIG. 4. The mode number register MOD is provided for instructing any one of several key depression modes: value "0" set in the register MOD indicates a mode where no key-depression instructing display is to be made; "1" indicates that a key-depression indication is to be made only for the right-hand performance; "2" indicates that a key-depression instructing display is to be made only for the left-hand performance, and "3" indicates that a key-depression instructing display is to be made for the right-hand and left-hand performances. Further, the running state flag RUN indicates any one of automatic performance states: value "0" set in the register MOD indicates a state where no automatic performance is in progress (running), and value "1" indicates that an automatic performance is in progress. Thus, if the mode number register MOD is at "1", "2" or "3" and the running state flag RUN is at "1", this means that a key-depression instructing display is to be made for the right-hand performance and/or left-hand performance and an automatic performance is in progress or running.

Step 52: A determination is made as to whether the instrument is in a waiting state, i.e., whether a waiting state flag WAIT is at "1". If answered in the affirmative (YES), the program goes to next step 53; otherwise, the program returns to the main routine to enter step 47. The waiting state flag WAIT is set to "1" at step 108 of FIG. 10 when new key-on data is registered into a to-be-sounded-key-code list (hereinafter, key code list) in an interrupt process as will be later described, and hence the affirmative determination at this step 52 means that new key-on data has been additionally registered in the key code list.

Step 53: It is determined whether every key code registered in the key code list has actually been depressed. If every registered key code has been depressed (YES), the program proceeds to step 54, but if not, the program returns to the main routine to enter step 47.

Step 54: Because of the affirmative determination at step 53, the LED corresponding to every registered key code in the list is lit. The reason for this is that the LED corresponding to every registered key code has been placed in the flashing (blinking) state at step 107 of a data process shown in FIG. 10.

Step 55: The waiting state flag WAIT is reset to "0" to cancel the waiting state, in response to which the interrupt process will be performed at and after step 83 of FIG. 8.

Step 56: The key code list is cleared; that is, every key code is erased from the list. Then, the program returns to the main routine to enter step 47.

Figure 8:
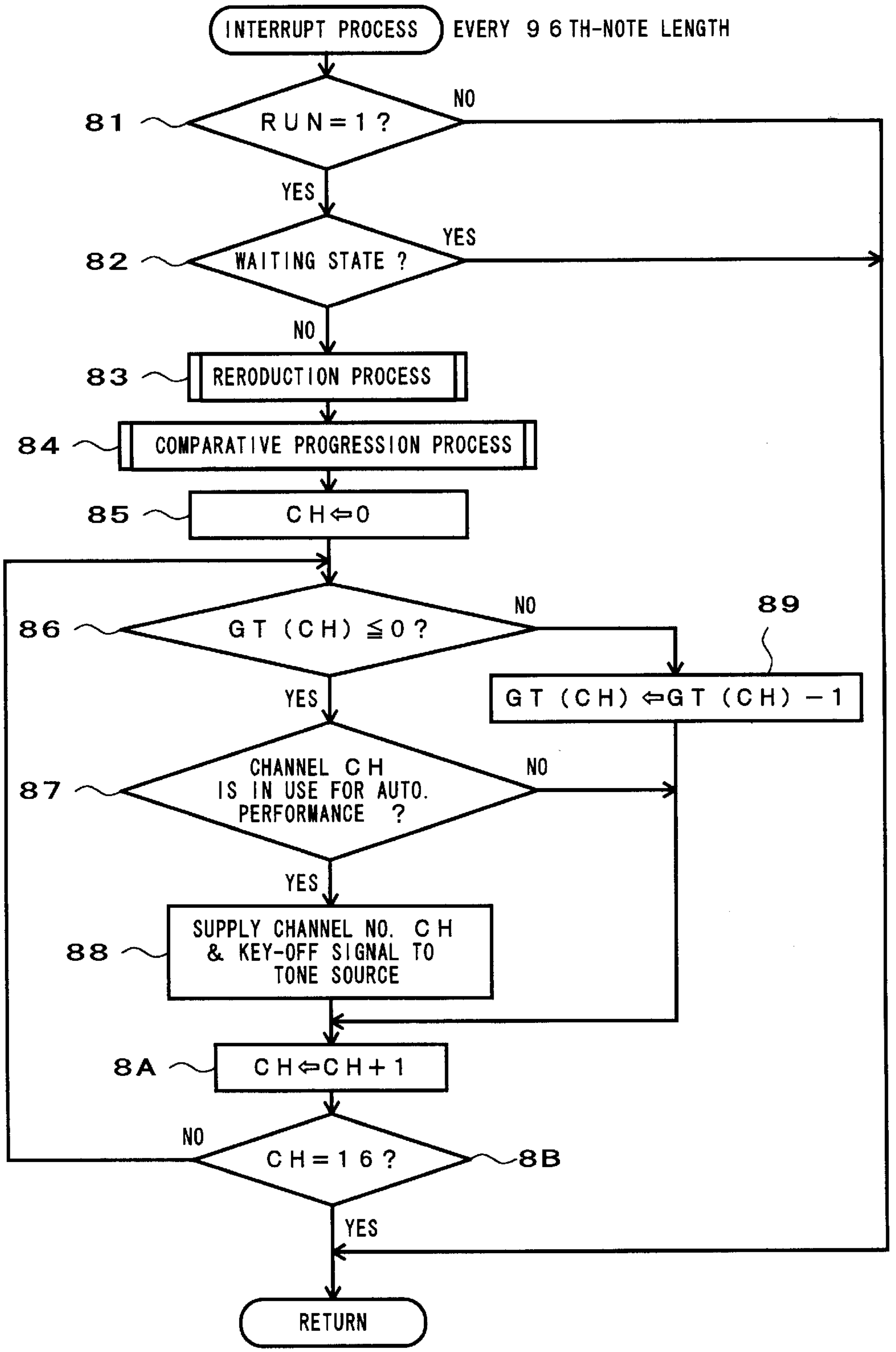
FIG. 8 is a flowchart illustrating an example of an interrupt process performed at an interrupt rate of 96 times per measure.

This comparative progression process is also performed at step 84 of FIG. 8, and thus, when a negative determination is made in any one of steps 51 to 53, or when the operation of step 56 has been completed, the program proceeds to step 85 of FIG. 8.

Step 47: The operators 13 are scanned to determine whether there has occurred an on-event of the load switch (not shown). If answered in the affirmative (YES), the routine proceeds to step 48, but if not, the routine jumps to step 4A.

Step 48: Because of the affirmative determination at the preceding step 47 that there has occurred an on-event of the load switch, performance data as shown in FIG. 3 is read out from the disk 14 to be loaded in the performance information memory 4.

Step 49: A phrase dividing process is performed to divide into predetermined phrases the performance data read out at step 48, as will be later described in detail.

Step 4A: The operators 13 are scanned to determine whether there has occurred an on-event of a mode changing switch (not shown). If answered in the affirmative (YES), the routine proceeds to next step 4B, but if not, the routine jumps to step 4C.

Step 4B: Because of the affirmative determination at the preceding step 4A that there has occurred an on-event of the mode changing switch, the value of the mode number register MOD is changed to one of the values "0", "1", "2" and "3"; that is, if the value of the mode number register MOD is "0" prior to this step, it is changed to "1", if "2", it is changed to "2", and if "3", it is changed to "0".

Step 4C: The operators 13 are scanned to determine whether there has occurred an on-event of the start/stop switch (not shown). If answered in the affirmative (YES), the routine proceeds to next step 4D, but if not, the routine jumps to step 4H.

Step 4D: The value of the running state flag RUN is inverted. Namely, in this embodiment, each time the start/stop switch is operated, a key-depression instructing display by LED lighting and automatic performance are started or stopped.

Step 4E: A determination is made as to whether the running state flag RUN is at "1" or not. With an affirmative determination (YES), the routine proceeds to step 4F; otherwise, the routine branches to step 4G.

Step 4G: Because the running state flag RUN is at "0" as determined at the preceding step 4E, the key-depression instructing display/automatic performance start precess terminated.

Figure 6:
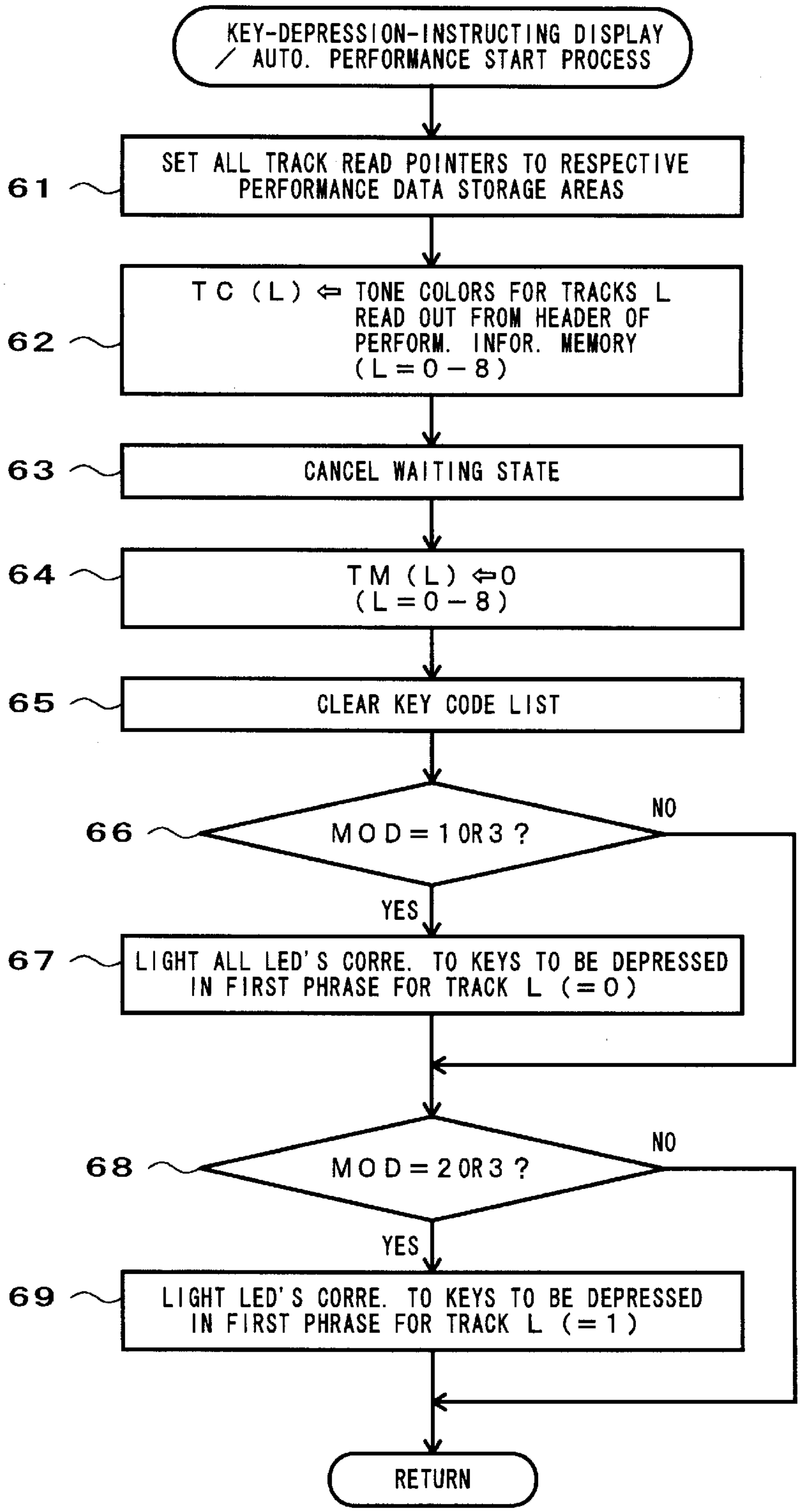
FIG. 6 is a flowchart illustrating a detailed example of a key-depression instructing display/automatic performance start process of FIG. 4.

Step 4F: Because the running state flag RUN is at "1" as determined at the preceding step 4E, the key-depression instructing display/automatic performance start process performed in the following step sequence, as shown in FIG. 6.

Step 61: Because the running state flag RUN has just been inverted to the value "1" in response to the operation of the start/stop switch, read pointers for all the tracks are set to point to the respective head addresses of corresponding storage areas in the performance information memory 4.

Step 62: Tone colors for track numbers L read out from the header portion of the performance information memory 4 are written into a tone color register TC(L). This tone color register TC(L) is provided for storing tone colors for all the tracks. The track numbers L are values "0" to "8" which specify tracks to be reproduced of the performance information memory 4. Track number L=0 signifies a track storing the performance data relating to key depression by the right hand, track number L=1 signifies a track storing the performance data relating to key depression by the left hand, and other track numbers L=2–8 signify other tracks storing the performance data relating to the accompaniment tones (i.e., chord, bass and rhythm tones).

Step 63: The waiting state flag WAIT is set to "0" to cancel the waiting state, in response to which the interrupt process is carried out at and after step 83 of FIG. 8.

Step 64: Timing counters TM(L) corresponding to track numbers L=0–8 are reset to "0". The timing counters TM(L) are provided, one for each track, for timing the key-depression instructing display (LED lighting) and automatic performance operations.

Step 65: The key-depression-code lost is cleared.

Step 66: A determination is made as to whether the mode number register MOD is at either "1" or "3". If the answer is YES, the program proceeds to next step 67, but if not, the program jumps to step 68.

Step 67: The affirmative determination at the preceding step 66 signifies that a key-depression instructing display is to be made at least for the right-hand performance, and thus every LED is lit which corresponds to a key to be depressed in the first phrase for track number L=0 storing the performance data for the right-hand performance.

Step 68: A determination is made as to whether the mode number register MOD is at either "2" or "3". If the answer is YES, the program proceeds to next step 69, but if not, the program jumps to step 4H of FIG. 4.

Step 69: The affirmative determination at the preceding step 68 signifies that a key-depression instructing display is to be made at least for the left-hand performance, and thus every LED is lit which corresponds to a key to be depressed in the first phrase for track number L (=1) storing the performance data for the left-hand performance, and the program returns to the main routine to enter step 4H.

Step 4H: Other processes based on the player's operation of any other operators 13 and tone volume changing process, etc. are performed.

Figure 7:
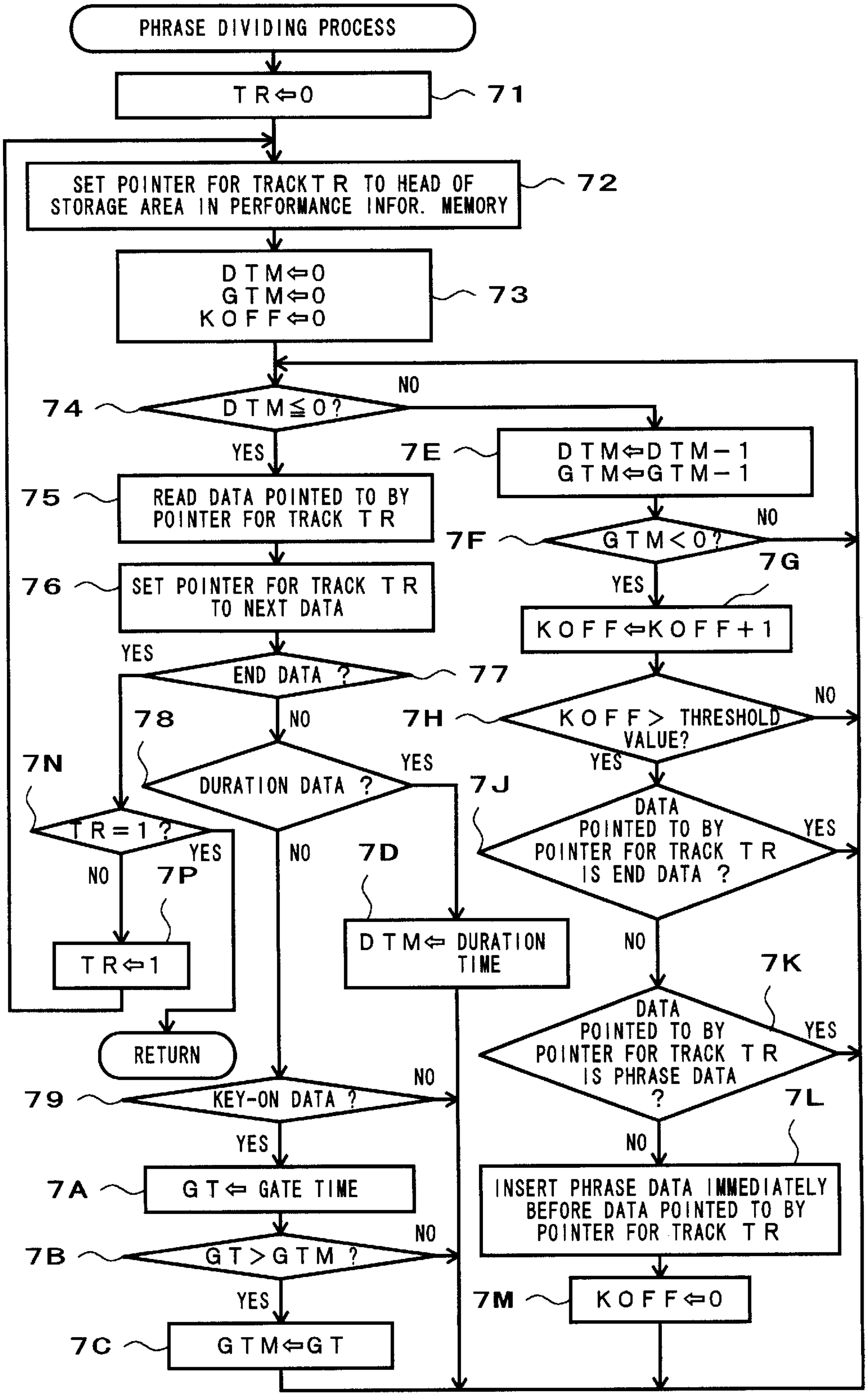
FIG. 7 is a flowchart illustrating a detailed example of a phrase dividing process of FIG. 4.

FIG. 7 shows the detail of the phrase dividing process of step 49 of FIG. 4. In this phrase dividing process, the performance data read out from the disk 14 at step 48 of FIG. 4 and then loaded into the performance information memory 4 is divided into the predetermined phrases in the following step sequence.

Step 71: Value "0" is set to a track number register TR. This register TR specifies a track to be reproduced in the performance information memory 4, and any one of values "0" to "8" is stored in this register TR. Track number "0" signifies a track storing the performance data relating to key depression by the right hand, track number "1" signifies a track storing the performance data relating to key depression by the left hand, and other track numbers "2" to "8" signify tracks storing the performance data relating to accompaniment tones (i.e., chord, bass and rhythm tones).

Step 72: The read pointer for the track specified by the track number register TR is set to point to the head address of the corresponding storage area in the performance information memory 4.

Step 73: Duration time register DTM, maximum gate time register GTM and key-off time counting register KOFF are all reset to "0". The duration time register DTM is devoted to storing a duration time of the performance data; the maximum gate time register GTM is devoted to storing a maximum gate time in the performance data being reproduced, and the key-off time counting register KOFF is devoted to counting a gate-off state time.

Step 74: It is determined whether or not the value stored in the duration time register DTM is "0" or less. If answered in the affirmative (YES), the program proceeds to next step 75, but if the value stored in the duration time register DTM is greater than "0", the program branches to step 7E.

Step 75: Since the affirmative determination at the preceding step 74 means that readout timing of next performance data has been reached, the performance data is read out which is pointed to by the read pointer for the track specified by the track number register TR.

Step 76: In preparation for next data readout, the read pointer for the track specified by the register TR is set to point to the read address of the next data. In the case of the performance data as shown in FIG. 3, the pointer is advanced by four addresses.

Step 77: It is determined whether the data read out at step 75 is end data or not. If answered in the affirmative (YES), the program goes to step 7N, but if the read-out data is other than end data (NO), the program proceeds to step 78.

Step 78: A determination is made as to whether the data read out at step 75 is duration data. If answered in the affirmative (YES), the program goes to step 7D, but if the read-out data is other than duration data (NO), the program proceeds to step 79.

Step 79: It is determined whether the data read out at step 75 is key-on data or not. If answered in the affirmative (YES), the program goes to step 7A, but if the read-out data is other than key-on data (NO), the program loops back to step 74.

Step 7A: Because the read-out data is key-on data as determined at the preceding step 79, the gate time of the key-on data is stored into a newest gate time register GT.

Step 7B: A determination is made as to whether the stored value in the newest gate time register GT is greater than the value stored in maximum gate time register GTM. With an affirmative answer (YES), the program proceeds to next step 7C, but with a negative answer (NO), the program reverts to step 74.

Step 7C: Because of the determination at step 7B that the stored value in the newest gate time register GT is greater than that in the maximum gate time register GTM, the stored value in the maximum gate time register GTM is replaced with the stored value in the newest gate time register GT.

Step 7D: Because the read-out data is duration data as determined at the preceding step 78, the duration time is stored into the duration time register DTM.

Step 7E: Because the value in the duration time register DTM is greater than "0", the respective stored values in the duration time register DTM and maximum gate time register GTM are both decremented by "1", and the program proceeds to step 7F.

Step 7F: It is determined whether or not the value stored in the gate time register GTM is smaller than "0". If answered in the affirmative (YES), the program proceeds to next step 7G, but if not, the program reverts to step 74.

Namely, the decrementing operation of step 7E is repetitively performed until the value in the duration time register DTM becomes "0" or less to make the determination at step 74 affirmative, or until the value in the maximum gate time register GTM becomes negative to make the determination of step 7F affirmative.

Step 7G: Because the value in the maximum gate time register GTM has turned to a negative value, the key-off time counting register KOFF is incremented by "1".

Step 7H: A determination is made as to whether the value in the key-off time counting register KOFF incremented at the preceding step 7G is greater than a predetermined threshold value. If the answer is "YES", the program proceeds to next step 7J, but if the incremented value is not greater than the predetermined threshold value, the program loops back to step 74. It is assumed herein that the threshold value is "12" corresponding to an eighth-rest.

Namely, because of the incrementing operation of step 7G, the key-off time counting register KOFF counts a gate-off time over which the duration time register DTM is at a value greater than "0" and also the maximum gate time register GTM is at a negative value.

Step 7J: It is determined whether or not the performance data pointed to by the read pointer for the track specified by the track number register TR is end data. If it is end data (YES), the program loops back to step 74, but it is other than end data (NO), the program proceeds to next step 7K.

Step 7K: It is determined whether or not data immediately before the performance data pointed to by the read pointer for the track specified by the track number register TR is phrase data. If it is phrase data (YES), the program loops back to step 74, but it is other than phrase data (NO), the program proceeds to next step 7L.

Because step 7H has determined that the key-off time counting register KOFF is at a value greater than the threshold value, phrase data may normally be inserted immediately before the data pointed to by the pointer; however, the insertion of such phrase data is meaningless if the data pointed to by the pointer is end data or if data immediately before the data pointed to by the pointer is phrase data. Therefore, the determination operations at steps 7J and 7K are conducted to ascertain this in advance.

Step 7L: Phrase data is inserted immediately before the performance data pointed to by the read pointer for the track specified by the track number register TR, because step 7H has determined that the stored value in the key-off time counting register KOFF incremented at the preceding step 7G is greater than the predetermined threshold value, step 7J has determined that the performance data pointed to by the read pointer for the track is not end data and also step 7K has determined that data immediately preceding the performance data pointed to by the read pointer is not phrase data.

Step 7M: Because new phrase data has been inserted at the preceding step 7L, the key-off time counting register KOFF is reset to "0", and then the program loops back to step 74 in order to perform the above-mentioned step operations until end data is read out.

Step 7N: Now that step 77 has determined that the read-out data is end data, it is determined here whether the track number register TR is at "1". If answered in the affirmative (YES), the program returns to the main routine to reenter step 4A; otherwise, the program proceeds to step 7P.

Step 7P: Since "0" is set to the track number register TR at step 71 in this phrase dividing process, the negative determination at step 7N means that the track number register TR is at "0", and thus the program sets "1" to the register TR and reenters step 72 so as to initiate a similar phrase diving process for the performance data relating to the left hand performance. In this way, the above-mentioned operations of steps 72 to 7M will be executed for track number "1".

FIG. 8 is a flowchart illustrating an example of an interrupt process performed at an interrupt rate of 96 times per measure (once for every 96th-note), in the following step sequence. In this interrupt process, a key-depression instructing display process and an automatic accompaniment process are performed.

Step 81: A determination is made as to whether the running state flag RUN is at "1" or not. With an affirmative determination (YES), the program proceeds to next step 82; otherwise, the routine immediately returns to the main routine.

Step 82: A determination is made as to whether the waiting state flag WAIT is at "1" or not. With an affirmative determination (YES), the program returns to the main routine, but if not, the program proceeds to next step 83.

Step 83: A process for reproducing performance data is effected as shown in FIG. 9.

Figure 9:
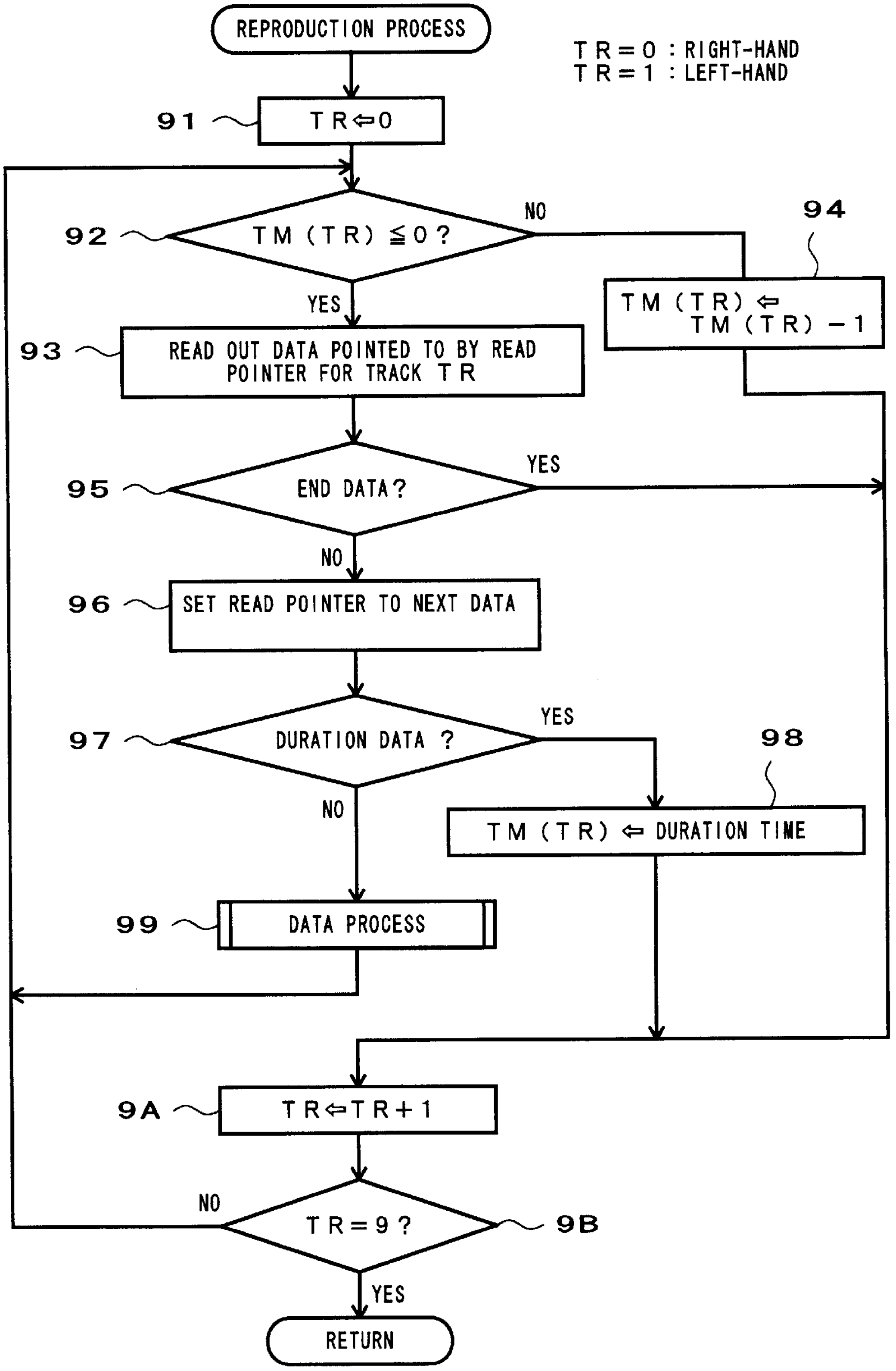
FIG. 9 is a flowchart illustrating a detailed example of a reproduction process of FIG. 8.

FIG. 9 is a flowchart illustrating a detailed example of the reproduction process of step 83, in which predetermined operations are performed for each of nine tracks within the performance information memory 4 in the following step sequence.

Step 91: Now that the running state flag RUN is at "1" as determined at step 81 of FIG. 8 and also a waiting state is not ON at step 82, "0" is set to the track number register TR which specifies a track to be reproduced in the performance information memory 4 by storing any one of values "0" to "8".

Step 92: It is determined whether or not the current stored value in a timing counter TM(TR), i.e., the current timing count for a track specified by the register TR is "0" or less. If the answer is "YES", the program proceeds to step 93; otherwise, the program branches to step 94.

Step 93: Since the preceding step 92 has determined that the current timing count is "0" or less, this step reads out performance data pointed to by the read pointer for the track specified by the register TR.

Step 94: Since the preceding step 92 has determined that the current timing count is greater than "0", the program jumps to step 9A after decrementing the stored value in the register TR by "1".

Step 95: A determination is made as to whether the data read out at step 93 is end data or not. With an affirmative answer (YES), the program jumps to step 9A, but with a negative answer (NO), the program proceeds to step 96.

Step 96: The read pointer is set to point to the read address of next data. For example, if the data read out at step 93 is key-on data, the pointer is advanced by four addresses, or if the read-out data is duration data, the pointer is advanced by two addresses.

Step 97: A determination is made as to whether the data read out at step 93 is duration data or not. With an affirmative answer (YES), the program proceeds to step 98, but with a negative answer (NO), the program proceeds to step 99.

Step 98: Now that the data read out at step 93 is duration data as determined at step 97, the duration data is stored into the timing counter TM(TR) for the track specified by the register TR.

Figure 10:
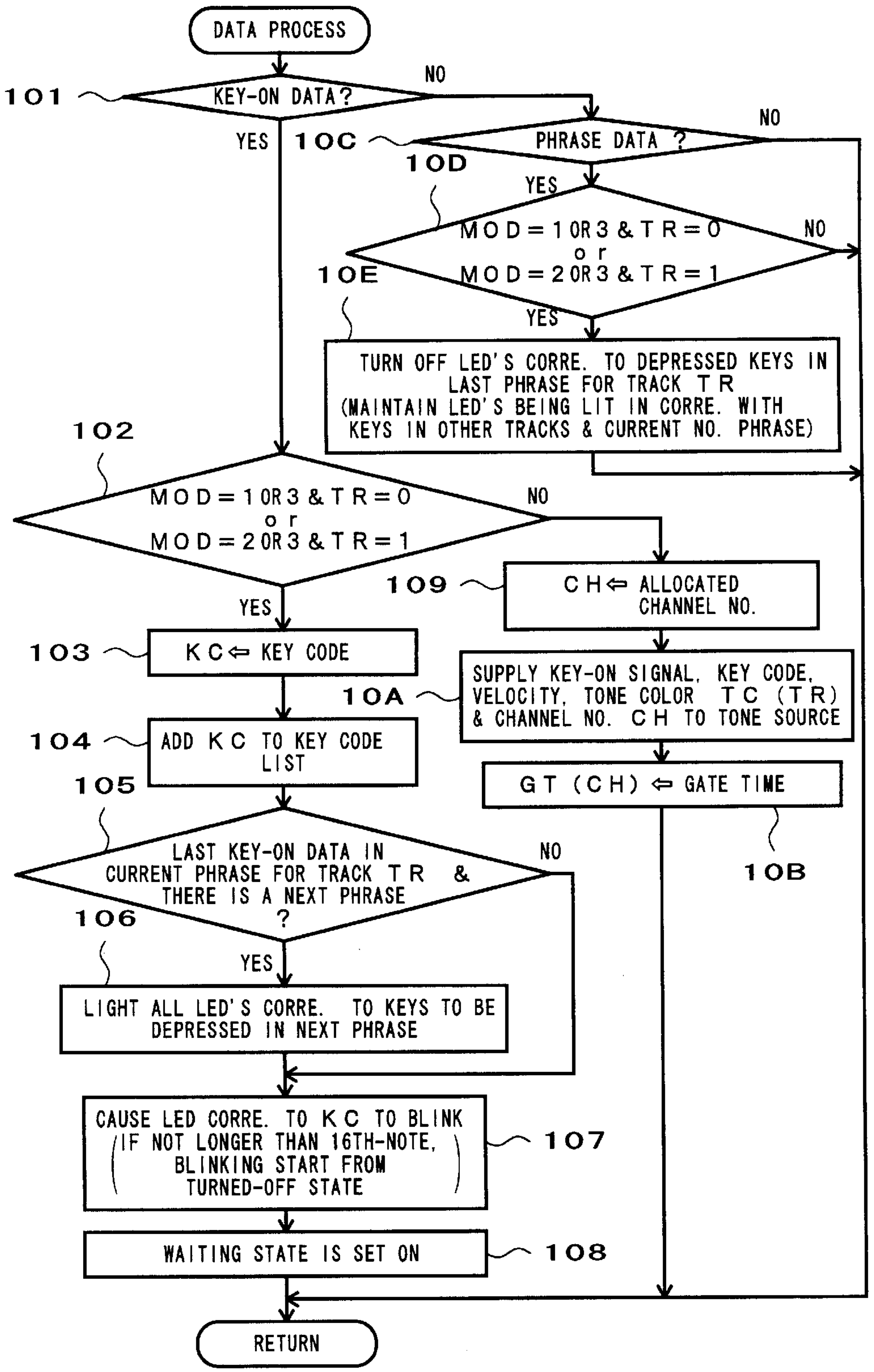
FIG. 10 is a flowchart illustrating a detailed example of a data process of FIG. 9.

Step 99: The data process of FIG. 10 is performed on the data read out at step 93. FIG. 10 illustrates the detail of the data process of this step, which is carried out in the following step sequence.

Step 101: A determination is made as to whether the data read out at step 93 is key-on data or not. If the read-out data is key-on data (YES), the program proceeds to step 102, but if not (NO), the program proceeds to step 10C.

Step 102: A determination is made as to whether the mode number register MOD is at "1" or "3" and the track number register TR is at "0", or whether the mode number register MOD is at "2" or "3" and the track number register TR is at "1". If the answer is YES, the program proceeds to step 103; otherwise, the program branches to step 109. The condition where the mode number register MOD is at "1" or "3" and the track number register TR is at "0" means that the track being currently reproduced relates to the right-hand key depression and the current key-depression instructing display mode is a mode to make such a indication for the right-hand key depression. On the other hand, the condition where the mode number register MOD is at "2" or "3" and the track number register TR is at "1" means that the track being currently reproduced relates to the left-hand key depression and the current key-depression instructing display mode is a mode to make such a indication for the left-hand key depression.

Step 103: Now that step 101 has determined that the read-out data is key-on data and step 102 that the mode to make a key-depression instructing display is on, the key code of the read-out key-on data is stored into the key code register KC.

Step 104: The key code newly stored in the key code register KC is additionally registered in the key code list.

Step 105: It is determined whether the key-on data read out at step 93 of FIG. 9 is the last key-on data in the current phrase of the track specified by the track number register TR and also there exists any next phrase. If the answer is YES, the program moves onto next step 106, but if not, the program jumps to step 107.

Step 106: Because the LED corresponding to the key code of the last key-on data in the current phrase is caused to blink at next step 107, all the LEDs corresponding to keys to be depressed in the next phrase are lit. This operation allows the player to readily recognize the positions of keys to be depressed in the next phrase.

Step 107: The LED corresponding to every key code in the key code register KC is lit. Where the gate time of the read-out key-on data is not greater than 16th-note, the corresponding LED is controlled to blink from the initial turned-off or inactive state. Because, in this embodiment, the LEDs corresponding to all keys to be depressed in the phrase are lit at step 67, 69 or 106, this step causes the currently lit LED to blink in accordance with the gate time. However, the blinking operation of the LED is performed in accordance with timing clock pulses asynchronous with this interrupt process, and hence, where the gate time is very short, e.g, not longer than 16th-note, it is difficult to distinguish the respective timing of the changing states of the already-lit LED if it is sequentially changed in order of the "lit", "turned-off" and then "lit" states because the lit states overlap each other. So, this embodiment is designed to change the states of the already lit LED in order of the "turned-off", "lit" and then "turned-off" states, so as to allow the player to readily recognize the key depression timing.

Step 108: The waiting state flag WAIT is set to "1" to place the musical instrument in the waiting state, and then the program reverts to step 92 of FIG. 9.

Step 109: Because the determination result at step 102 that the musical instrument is in the mode to not make a key-depression instructing display (mode number register MOD is at "0" or that the track number register TR is one of "2" to "8" signifies that an automatic performance based on the performance data is to be executed, an available channel is allocated and the number of the allocated channel is stored into a channel register CH.

Step 10A: On the basis of the key-on data read out from among the stored performance data, a corresponding key-on signal, key code, velocity, tone color specified by a tone color register TC(TR) and channel number CH are supplied to the tone source circuit 9.

Step 10B: The gate time contained in the key-on data is stored into the gate time register GT(CH), and then the program reverts to step 92 of FIG. 9.

Step 10C: Now that the preceding step 101 has determined that the data read out at step 93 of FIG. 9 is not key-on data, it is determined at this step whether the read-out data is phrase data or not. If answered in the affirmative, the program proceeds to step 10D, but if not, the program reverts to step 92 of FIG. 9.

Step 10D: A determination is made, similarly to step 102 above, as to whether the mode number register MOD is at "1" or "3" and also the track number register TR is at "0", or whether the mode number register MOD is at "2" or "3" and the track number register TR is at "1". If the answer is YES, the program proceeds to next step 10E; otherwise, the program reverts to step 92 of FIG. 9.

Step 10E: Now that step 10C has determined that the data read out at step 93 of FIG. 9 is phrase data and step 10D has determined that a key-depression instructing display is to be made for the right and/or left hand performance, this step turns off the LEDs corresponding to the depressed keys in the last phrase for the track specified by the track number register TR, and then the program reverts to step 92 of FIG. 9. However, those LEDs being lit in correspondence with keys in the other tracks and in the current phrase are maintained in the respective current states.

Step 9A: This step is taken, when the stored value in the timing counter TM(TR) has been decremented by "1" at step 94, when step 95 has determined that the read-out data for the track number TR is end data, or when the duration time has been stored into the timing counter TM(TR). At this step, the value in the track number register TR is incremented by "1" so as to execute the above-mentioned reproduction process for the next track.

Step 9B: A determination is made as to whether the value incremented at the preceding step 9A is "9" or not, i.e., whether the reproduction process has been completed for all the tracks. With an affirmative determination, the program continues to step 84 of FIG. 8; otherwise, the program reverts to step 92 of FIG. 9 to perform the reproduction process for the next track.

Step 84: A same comparative progression process as in FIG. 5 is performed. The comparative progression process at this step is carried out when the player has depressed a key prior to the key-depression instructing display (turning on and off of the LEDs) of step 107 of FIG. 10. That the player has depressed a key prior to the key-depression instructing display means that a key has been depressed before the key code of the key to be indicated is registered into the key code list, so that even when the comparative progression process of step 46 of FIG. 4 has been executed, step 52 will result in the negative determination. Thus, the comparative progression process of step 46 of FIG. 4 will become meaningless. To deal with this inconvenience, this step executes the same comparative progression process as in FIG. 5.

Operations at steps 85 to 8B are directed to executing an automatic performance by reading out performance data from the tracks other than track numbers "0" and "1" in the performance information memory 4.

Step 85: The channel register CH is set to a value of "0".

Step 86: It is determined whether the value set in the channel register CH, i.e., the gate time of a channel specified by the channel register CH is "0" or less. If it is "0" or less (YES), the program proceeds to step 87, but if it is greater than "0" (NO), the program branches to step 89.

Step 87: A determination is made as to whether the channel specified by the stored value in the channel register CH is already in use for an automatic performance. With an affirmative answer, the program moves onto next step 88, but with a negative answer, the program jumps to step 8A.

Step 88: Now that the gate time is "0" or less and the channel is in use in an automatic performance as determined at steps 86 and 87, this step supplies the tone source circuit 29 with a key-off signal along with the channel number in order to terminate tone generation in that channel.

Step 89: Now that the gate time of the channel specified by the channel register CH is greater than "0" as determined at the preceding step 86, the stored value in the gate time register CT(CH) is decremented by "1".

Step 8A: The value in the channel register CH id incremented by "1" so as to execute the operations of steps 86 to 89 for the next channel.

Step 8B: A determination is made as to whether the current stored value in the channel register CH incremented at step 8A is "16", i.e., whether the operation of step 88 or 89 has already been executed for a total of 16 channels. If answered in the affirmative, the program returns to the main routine to wait until next interrupt timing, but if answered in the negative, the program loops back to step 86 to repeat the above-mentioned operations of steps 86 to 8B for the remaining channel or channels.

Figure 1A:
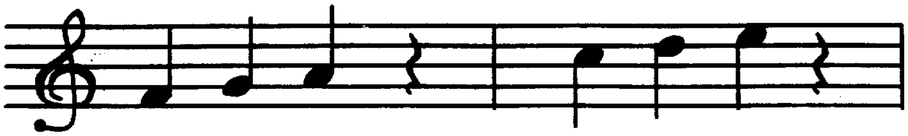
FIGS. 1A to 1E are diagrams schematically showing several examples of manners in which an electronic musical instrument of the present invention lights an LED to visually instruct a key to be depressed.

Now, a detailed description is given about how the performance data is divided by the phrase dividing process of FIG. 7, in relation to the performance data as shown in FIG. 3 corresponding to the score of FIG. 1A. Alphanumerical characters "C4" to "E5" are shown on the keyboard in FIG. 1 for convenience of explanation and represent the key codes of the individual keys. In the performance data illustrated in FIG. 3, such key codes are stored as key numbers (numerical value data). For instance, key code "F4" corresponds to key number "65", "G4" to "67", "A4" to "69", "C5" to "72", "D5" to "74", and "E5" to "76".

After steps 71 to 74, the operations of steps 75 and 76 are executed. The first key-on data of FIG. 3, i.e., data relating to "F4 (=65)" is read out at step 75, and then at step 76, the read pointer is set to point to the read address of duration data following the key-on code. Then, after the operations of steps 77 to 79, the program moves on to step 7A, where the gate time of the read-out key-on data of "F4 (=65)" is stored into a newest gate time register GT. Because the maximum gate time register GTM is at a value "0" at this time point, the stored value "17" in the newest gate time register GT is set at step 7C into the maximum gate time register GTM.

Since the duration time register DTM is at a value of "0", the operations of steps 75 and 76 are executed after step 74. This time, duration time "24" is read out at step 75, and then at step 76, the read pointer is set to point to the read address of key-on data "G4 (=67)" following the duration time data. Then, after the operations of steps 77 and 78, the program moves on to step 7D, where "24" is stored into the duration time register DTM.

Now that the duration time register DTM is at "24", a negative determination results at step 74, so that the program goes to step 7E. At step 7E, the respective values in the duration time register DTM and maximum gate time register GTM are both decremented to "23" and "16", respectively. Accordingly, the decrementing operation of step 7E will be repeated thereafter until the maximum gate time register GTM reaches a negative value or the duration time register DTM reaches a value of "0" or less. Once the duration time register DTM reaches a value of "6" and the maximum gate time register GTM reaches a value of "−1" as the result of the decrementing operation of step 7E, an affirmative determination results at step 7F, so that the value in the key-off time counting register KOFF is incremented at step 7G. At this time point, the key-off time counting register KOFF is at a value of "1".

Because the threshold value is "12", a NO determination results at step 7H, so that the decrementing operation at step 7E and incrementing operation at step 7G are thereafter repeated until the duration time register DTM reaches a value of "0" or less or until the key-off time counting register KOFF reaches a value greater than the threshold value "12". Because the duration time register DTM reaches "0" and the key-off time counting register KOFF reaches "7" as the result of the decrementing operation, an YES determination results at step 74 before an YES determination is obtained at step 7H, and thus the operation of step 75 is executed by way of step 74. This time, the second key-on data, i.e., data relating to G4 (=67) of FIG. 3 is read out at step 75. Then, the gate time "17" of the read-out key-on data of "G4 (=67)" is stored into the newest gate time register GT. Because the maximum gate time register GTM is at a value "−7" at this time point, the stored value "17" in the newest gate time register GT is set at step 7C into the maximum gate time register GTM.

Since the duration time register DTM is at "0", the operations of steps 75 and 76 are executed by way of step 74. This time, the second duration time "24" is read out at step 75, and then at step 76, the read pointer is set to point to the read address of key-on data "A4 (=69)" following the duration time data. Then, after the operations of steps 77 and 78, the program moves on to step 7D, where "24" is stored into the duration time register DTM.

Now that the duration time register DTM is at "24" and the maximum gate time register GTM is at "17", the decrementing operation of step 7E is repeated thereafter until the maximum gate time register GTM reaches a negative value or the duration time register DTM reaches a negative value. Once the maximum gate time register GTM reaches a negative value, the decrementing and incrementing operations of steps 7E and 7G are repeated. Then, because the duration time register DTM reaches "0" and the key-off time counting register KOFF reaches "7", an YES determination results at step 74 and thus the operation of step 75 is executed to read out the third key-on data, i.e., data relating to A4 (=69) of FIG. 3 is read out at step 75. Then, the gate time "17" of the read-out key-on data of "A4 (=69)" is stored into the newest gate time register GT. At step 7C, the stored value "17" in the newest gate time register GT is stored into the maximum gate time register GTM.

Since the duration time register DTM is at "0", the operations of steps 75 and 76 are executed by way of step 74. This time, the third duration time "48" is read out at step 75, and then the read pointer is set at step 76 to point to the read address of key-on data "C5 (=72)" following the duration time data, and "48" is stored at step 7D into the duration time register DTM.

Now that the duration time register DTM is at "48" and the maximum gate time register GTM is at "17", the decrementing operation of step 7E is repeated similarly to the above-mentioned. After the duration time register DTM reaches "30" and the maximum gate time register GTM reaches "−1", the decrementing and incrementing operations of steps 7E and 7G are repeated. The duration time register DTM reaches "18" and the key-off time counting register KOFF reaches "13" as the result of the decrementing operation, an YES determination is obtained at step 7H so that the operations of steps 7J to 7M are executed.

Because the read pointer points to the fourth key-on data "C5 (=72)", a NO determination results at step 7J. The data immediately before the data pointed to by the pointer is the the third key-on data "A4 (=69)" rather but not phrase data, a negative determination is obtained at step 7K. Thus, by the operation of step 7L, phrase data is inserted immediately before the key-on data "C5 (=72)" pointed to by the read pointer as shown in FIG. 3. Then, the key-off time counting register KOFF is reset to "0" in preparation for next phrase data insertion, and the above-mentioned step operations are repeated for insertion of phrase data, until end data is read out.

Once end data is read out, an affirmative determination is obtained at step 77, and the track number register TR is set to "1" at step 7P so that the operations at steps 72 to 7M are performed for track number "1".

In the above-mentioned manner, the embodiment reads out the performance data and divide it predetermined phrases. In this embodiment, an optimal phrase division may be attained by setting the threshold value at step 7H to an appropriate value.

FIGS. 1A to 1E are diagrams schematically showing several examples of operations in which the electronic musical instrument of the present invention lights LEDs to visually indicate keys to be depressed.

FIG. 1A shows an example of the score corresponding to FIG. 3, and FIGS. 1B to 1E shows in time series the manner in which the key-depression instructing display is effected by dividing the performance data of FIG. 3 by means of the phrase dividing process of step 49 of FIG. 4 (FIG. 7) and lighting any of the LEDs provided on the upper side of the keyboard 11. The lit state of the LEDs are changed sequentially from that of FIG. 1B to that of FIG. 1E. In FIGS. 1B to 1E, LEDs being lit are shown in black-color circles, the LEDs not being lit (being turned off) shown in while-color circles, and the blinking LEDs shown in shaded circles.

According to the score of FIG. 1A, keys are depressed in order of "F4", "G4", "A4", "C5", "D5" and "E5".

First, once the load switch is activated, performance data as shown in FIG. 3 is read out from the disk 14 and loaded into the performance information memory 4 at step 48 of FIG. 4. Then, by the phrase dividing process of step 49 of FIG. 4 (FIG. 7), a phrase code is inserted between "A4 (=69)" and "C5 (=72)". Assume here that the mode number register MOD is set to any one of "1", "2" and "3".

Then, once the start/stop switch for automatic performance/key-depression instructing display is activated, the key-depression instructing display/automatic performance start process is triggered at step 4G of FIG. 4 (FIG. 6). Since the data before the newly inserted phrase code in FIG. 3 corresponds to the first phrase, three LEDs are lit, at step 67 of FIG. 6, which correspond to three key-on data "F4 (=65)", "G4 (=67)" and "A4 (=69)" belonging to the first phrase.

Figure 1B:
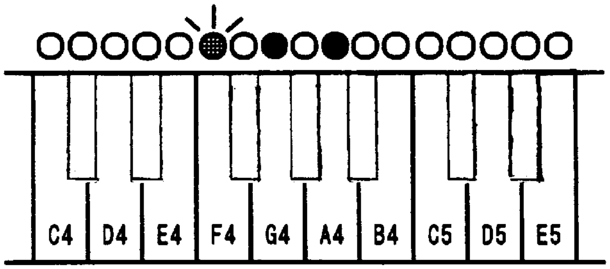

FIG. 1B shows the lighting states of the LEDs 12 when the interrupt process of FIG. 8 is executed for the first time after the above-noted operations. Because the running state flag RUN has been set to "1" at step 4D of FIG. 4 and the waiting state has been cancelled at step 63 of FIG. 6, an YES determination is obtained at 81 and a NO determination is obtained at step 82 in this interrupt process of FIG. 8, so that the reproduction process is executed at step 83 (FIG. 9).

In the reproduction process of FIG. 9, an YES determination results at step 92 by way of step 91. Then, the first key-on data, i.e., data relating to "F4 (=65)" of FIG. 3 is read out at step 93, and the data process of step 99 (FIG. 10) is performed by way of steps 95 to 97.

In the data process of FIG. 10, the operations of steps 103 and 104 are performed by way of steps 101 and 102, since the track number register TR has already been set to "0" at step 91 of FIG. 9 and the mode number register MOD has been set to any one of values "1", "2" and "3". At steps 103 and 104, "F4 (=65)" of the read-out key-on data is newly stored into the key code register KC and key code list.

Because the key-on data is the first data of the current phrase at this time point, a NO determination is obtained at step 105, so that the operations of steps 107 and 108 are executed. By the operation of step 107, the LED corresponding to the stored value "F4 (=65)" in the key code register KC is caused to blink as shown in FIG. 1B. Then, "1" is set to the waiting state flag WAIT by the operation of step 108 to place the musical instrument in the waiting state. After that, until the waiting state is cancelled by the operation of step 55 in the comparative progression process of FIG. 5 (step 46 of FIG. 4 or step 84 of FIG. 8), no substantive interrupt process will be executed because the determination at step 82 becomes affirmative (YES) and thereby the program immediately returns to the main routine.

Upon completion of the data process of step 99 of FIG. 9 (FIG. 10), the operation of step 93 is performed by way of step 92. This time, duration data following the key-on data relating to "F4 (=65)" of FIG. 3 is read out at step 93, so that the determination of step 97 becomes affirmative and thereby the operation of step 98 is executed. At step 98, the first duration data "24" of FIG. 3 is stored into the timing counter TM(0). Then, the value in the track number register TR(0) is incremented by "1" at step 9A, so that after this, the above-mentioned reproduction process is repeated for all of tracks "1" to "8". The operations at and after step 84 of FIG. 8 are executed once the track number register TR reaches a value of "9".

At step 84 (comparative progression process of FIG. 5), the determinations of steps 51 and 52 become affirmative because the waiting state is set ON by step 108 of FIG. 10, so that the operation of next step 53 is executed. Since the embodiment is described on the assumption that the player's key depression takes place after the key-depression instructing display (i.e., after blinking of the LEDs), no player's key depression has taken place at this time point. Therefore, the determination at step 53 becomes negative, so that the operations at and after step 85 are performed on the performance data read out from the tracks other than track numbers "0" and "1" for 16 channels of channel numbers "0" to "15".

If the player depresses the key "F4 (=65)" corresponding to the stored value in the key code register KC, after the associated LED has been caused to blink as shown in FIG. 1B, an affirmative determination results at step 43 of the main routine of FIG. 4, so that the tone generation process is executed at step 45 for the depressed key. Then, the comparative progression process of FIG. 5 is performed at next step 46. In this comparative progression process, the determinations at steps 51 and 52 become affirmative, and thereby the operation of step 53 is executed. Since only "F4 (=65)" of the key-on data "F4 (=65)" is stored in the key code list at the time of step 53, an YES determination results at step 53, so that the operations of steps 54 to 56 are executed. Namely, the LED corresponding to the key "F4 (=65)" having been blinking is placed into a lit state, "0" is set to the waiting state flag WAIT to cancel the waiting state, and the key code list is also cleared.

In response to the cancellation of the waiting state, the interrupt process at and after step 83 of FIG. 8 is performed. This time, the second key-on data, i.e., data relating to "G4 (=67)" of FIG. 3 is read out at step 93 of the reproduction process of FIG. 9. Then, in the data process of FIG. 10, "G4 (=67)" of the read-out key-on data is newly stored into the key code register KC and key code list at steps 103 and 104.

Figure 1C:
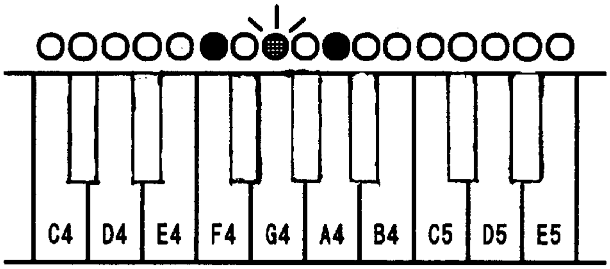

Because the read-out key-on data is one located intermediate in the current phrase at this time as well, a NO determination is obtained at step 105, and at step 107, the LED corresponding to the stored value "G4 (=67)" in the key code register KC is caused to blink as shown in FIG. 1C. Also, "1" is set to the waiting state flag WAIT by the operation of step 108 to place the musical instrument in the waiting state. Next, the duration data following the key-on data relating to "G4 (=67)" of FIG. 3 is read out at step 93 of FIG. 9, and the duration data "24" is stored at step 98 into the timing counter TM(0).

Then, the value in the track number register TR(0) is incremented by "1" at step 9A, so that after this, the above-mentioned reproduction process is repeated for all of tracks "1" to "8". The operations at and after step 84 of FIG. 8 are executed once the track number register TR reaches a value of "9" by the operation of step 9A.

If the player depresses the key "G4 (=67)" corresponding to the LED blinking as shown in FIG. 1C, the tone generation process is executed at step 45 of FIG. 4 for the depressed key, and the comparative progression process is performed at next step 46. In this comparative progression process, the LED corresponding to the key "F4 (=65)" having been blinking is placed into a lit state, "0" is set to the waiting state flag WAIT to cancel the waiting state, and the key code list is also cleared.

In response to the cancellation of the waiting state, the interrupt process at and after step 83 of FIG. 8 is again performed. This time, the third key-on data, i.e., data relating to "A4 (=69)" of FIG. 3 is read out at step 93 of the reproduction process of FIG. 9. Then, in the data process of FIG. 10, "A4 (=69)" of the read-out key-on data is newly stored into the key code register KC and key code list at steps 103 and 104.

Figure 1D:
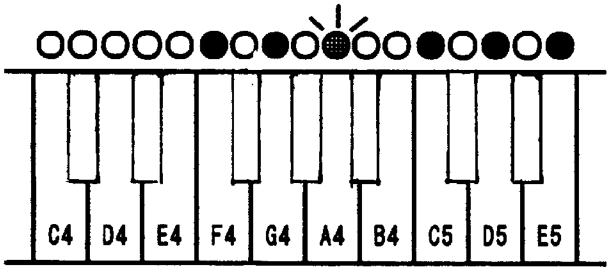

Because the read-out key-on data is one located last in the current phrase and there exists a next phrase at this time, an YES determination is obtained at step 105, three LEDs are lit, at step 106, which correspond to three key-on data "C5 (=72)", "D5 (=74)" and "E5 (=76)" belonging to the next phrase. At step 107, the LED corresponding to the stored value "A4 (=69)" in the key code register KC is caused to blink as shown in FIG. 1D. Also, "1" is set to the waiting state flag WAIT by the operation of step 108 to activate the waiting state. Next, the duration data following the key-on data relating to "A4 (=69)" of FIG. 3 is read out at step 93 of FIG. 9, and the duration data "48" is stored at step 98 into the timing counter TM(0).

Then, the value in the track number register TR is incremented by "1" at step 9A, so that after this, the above-mentioned reproduction process is repeated for all of tracks "1" to "8". The operations at and after step 84 of FIG. 8 are executed once the track number register TR reaches a value of "9" by the operation of step 9A.

Once the player depresses the key "A4 (=69)" corresponding to the LED blinking as shown in FIG. 1D, the tone generation process is executed at step 45 of FIG. 4 for the depressed key, and the comparative progression process is performed at next step 46. In this comparative progression process, the LED corresponding to the key "A4 (=69)" having been blinking is placed into a lit state, "0" is set to the waiting state flag WAIT to cancel the waiting state, and the key code list is also cleared.

In response to the cancellation of the waiting state, the interrupt process at and after step 83 of FIG. 8 is again performed. This time, the phrase data of FIG. 3 is read out at step 93 of the reproduction process of FIG. 9. Then, in the data process of FIG. 10, a No determination results at step 101, so that the determinations at step 10C and 10D become YES. Thus, the three LEDs are turned off, at step 10E, which correspond to three key-on data "F4 (=65)", "G4 (=67)" and "A4 (=69)" belonging to the preceding phrase. Then, at next interrupt timing, the interrupt process at and after step 83 of FIG. 8 is performed. This time, the first key-on data in the second phrase, i.e., data relating to "C5 (=72)" of FIG. 3 is read out at step 93. Then, in the data process of FIG. 10, "C5 (=72)" of the read-out key-on data is newly stored into the key code register KC and key code list at steps 103 and 104.

Figure 1E:
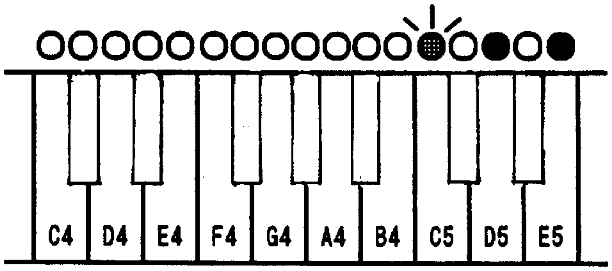

Because the read-out key-on data is one located first in the current phrase, a NO determination is obtained at step 105, the LED corresponding to the key-on data "C5 (=72)" is caused to blink as shown in FIG. 1E at step 107, and the operations similar to the above-mentioned are repeated from this time on so that the LEDs corresponding to the keys "D5 (=74)" and "E5 (=76)" are caused to blink sequentially.

Figure 11A:
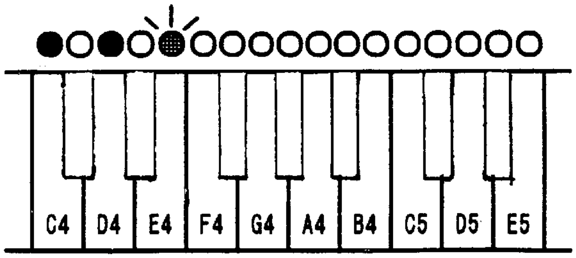
FIGS. 11A to 11J are diagrams schematically showing other examples of the key-depression instructing display process performed by the electronic musical instrument of the present invention.
Figure 11B:
Figure 11C:
Figure 11D:
Figure 11E:
Figure 11F:
Figure 11G:
Figure 11H:
Figure 11I:
Figure 11J:
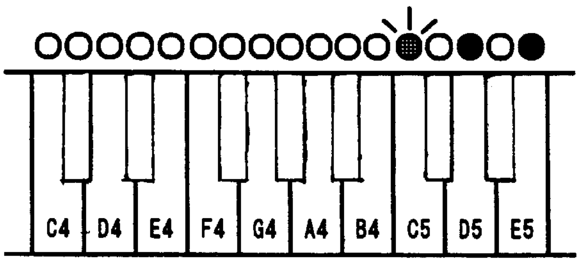

The exemplary operation of FIG. 1 has been described above in relation to the case where all the LEDs corresponding to keys to be depressed in the next phrase are lit in response to the blinking of the LED corresponding to the last key to be depressed in the current phrase. A modification may be made such that, in lighting all the LEDs corresponding to keys to be depressed in the next phrase in response to the blinking of the LED corresponding to the last key to be depressed in the current phrase as shown in FIG. 11A, the LEDs corresponding to the current phrase keys are turned off as shown in FIG. 11J after the LEDs intervening between the LEDs corresponding to the current phrase keys and the LEDs corresponding to the next phrase keys being lit one after another in the order as shown in FIGS. 11B to 11H and then the LEDs corresponding to the next phrase keys being lit as shown in FIG. 11I.

Figure 12A:
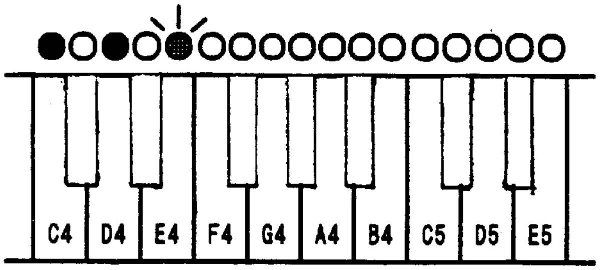
FIGS. 12A to 12I are diagrams schematically showing still other examples of the key-depression instructing display process performed by the electronic musical instrument of the present invention.
Figure 12B:
Figure 12C:
Figure 12D:
Figure 12E:
Figure 12F:
Figure 12G:
Figure 12H:
Figure 12I:
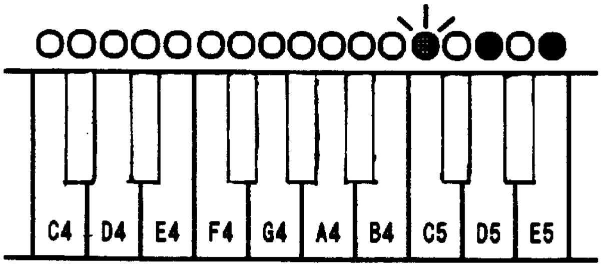

Another modification may be made such that, in lighting all the LEDs corresponding to the next phrase keys in response to the blinking of the LED corresponding to the last key to be depressed in the current phrase, the lit LEDs of FIG. 12A corresponding to the current phrase keys are turned off as shown in FIG. 12B, in response to which the LEDs intervening between the LEDs corresponding to the current phrase keys and the LEDs corresponding to the next phrase keys are lit one by one from the state of FIG. 12B to that of 12H and then the LEDs corresponding to the next phrase keys are lit as shown in FIG. 12I.

FIGS. 11 and 12 have been described in relation to the case where the last key to be depressed in the current phrase is "E4" and the first key to be depressed in the next phrase is "C5". Similar LED lighting takes place in other cases. However, where the last key to be depressed in the current phrase is "D4" and the first key to be depressed in the next phrase is "D5", the LEDs intervening between the last key to be depressed in the current phrase (i.e., D#4) and the first key to be depressed key in the next phrase (i.e., "C#5") may be sequentially lit. Alternatively, in this case, such LEDs from the one corresponding to a whole tone key closest to the last key to be depressed in the current phrase (i.e., "E4") to the one corresponding to a whole tone key closest to the first key to be depressed in the next phrase (i.e., "C5") may be lit as LEDs closest to the last and first keys, or only selected ones, rather than all, of the intervening LEDs may be lit.

Further, although the exemplary operation of FIG. 1 has been described above in relation to a case where all the LEDs corresponding to keys to be depressed in the next phrase are lit in response to the blinking of the LED corresponding to the last key to be depressed in the current phrase, the LEDs corresponding to the next phrase keys may all be lit in response to the blinking of any other LED corresponding to a key located a predetermined number of (two or three) notes before or a predetermined time before or a predetermined number of beats before the terminating point of the current phrase. Alternatively, the LEDs corresponding to the next phrase keys may be lit in time series according to the prescribed order of depression or progressively in accordance with the progressing state of the current phrase.

Moreover, although the embodiment has described above in connection with a case where the key-depression instructing display is made using LEDs, the indication may be made by displaying black-color and white-color circles etc. on the LCD or the like.

Furthermore, in stead of lighting all the LEDs corresponding to keys to be depressed in a single phrase as in the above-mentioned embodiment, only those within a predetermined range (e.g., an octave or 10 cm) from the blinking LED may be lit.

Moreover, although the embodiment has described above in connection with an electronic musical instrument which is provided with a display device adjacent the upper edge of the keyboard, the above-mentioned key-depression may be effected on an musical instrument without a display device, by adding a necessary display device thereto.

Furthermore, although the embodiment has described above in connection with a case where a key-depression instructing display is made synchronously with an actual key depression in such a manner that the actual key depression of an indicated key triggers a next key-depression instructing display, such a key-depression instructing display may be caused to progress irrespective of the progress of actual key depression.

In addition, although track numbers "0" and "1" have been described as storing performance data relating to the right-hand and left-hand key depressions, respectively, the tracks to be used for these purposes may be changed as necessary.

Further, although the embodiment has been described as using single-color LEDs, LED of two or more colors may be used. In such a case, the LED lighting may be in different colors between key-depression instructing displays for right-hand and left-hand key depressions. In addition, different colors may be used between LED lighting corresponding to a phrase and LED corresponding to actual key depression.

Further, the brightness of the LEDs may be made different in such a manner that the LED lighting corresponding to a phrase is relatively dark and the LED lighting corresponding to actual key depression is lighter.

Further, in an opposite manner to the above-mentioned embodiment, the LEDs corresponding to a phrase may be lit, with the LED corresponding to a key depression blinkingly lit.

Further, although the LEDs are arranged in a single row in the above-described embodiment, they may be arranged in two (upper and lower) rows, in which case the lit color may be different between the upper and lower LED rows. Also, one of the LED rows may be used as the phrase-corresponding LEDs, while the other LED row may be used as the key-depression-responding LEDs. Further, rather than using the same type LEDs for the black and white keyboard keys, different type LEDs may be used for the black and white keyboard keys; for example, the lit area or lit color of the LEDs may be made different between the black and white keyboard keys.

Furthermore, when an indicated key is depressed, the LED corresponding to the depressed key may be turned off.

In addition, the phrase-corresponding LEDs may be lit only for a predetermined period rather than being lit throughout the phrase; for instance, such LEDs may be lit momentarily at a changing point between phrases, may be lit until a predetermined time passes after a phrase switching point, may be lit until a first instructed key is depressed after a phrase changing point , may be lit until a predetermined number (two or three) of notes are depressed after a phrase changing point, or may be lit until a predetermined number of beats passe after a phrase changing point. Also, the phrase-corresponding LEDs may be caused to blink at a greater period than the depression-responding LED.

Moreover, although the embodiment has been described in relation to a case where a phase division takes place at a place where a gate-off time is greater than a predetermined value, the phrase division may of course be performed measure by measure.

Furthermore, in stead of blinking an LED corresponding to a key to be depressed now, LEDs corresponding to keys to be depressed now and next may be lit simultaneously. In this case, the manner of lighting these LEDs may be optionally determined from among combinations of various displaying methods mentioned above. For example, the brightness or color may be made different between the LEDS corresponding to the keys to be depressed now and next. Alternatively, in the case where the LEDs are arranged in upper and lower rows in such a manner that one of the LED rows may be used for the phrase-corresponding keys and the other LED row may be used for the depression-responding keys, the LED corresponding to the key to be depressed currently may be blinkingly lit and the LED corresponding to the key to be depressed next may be lit.

The present invention arranged in the above-mentioned manner advantageously allows the player to readily know or recognize where to position his or her hands and fingers along the keyboard. In addition, the present invention allows the player to know keys to be depressed now and next, and thereby the player can carry out a music performance very smoothly with ease.

Now, a second embodiment of the present invention will be described hereinbelow with reference to FIGS. 13 to 21.

Figure 13:
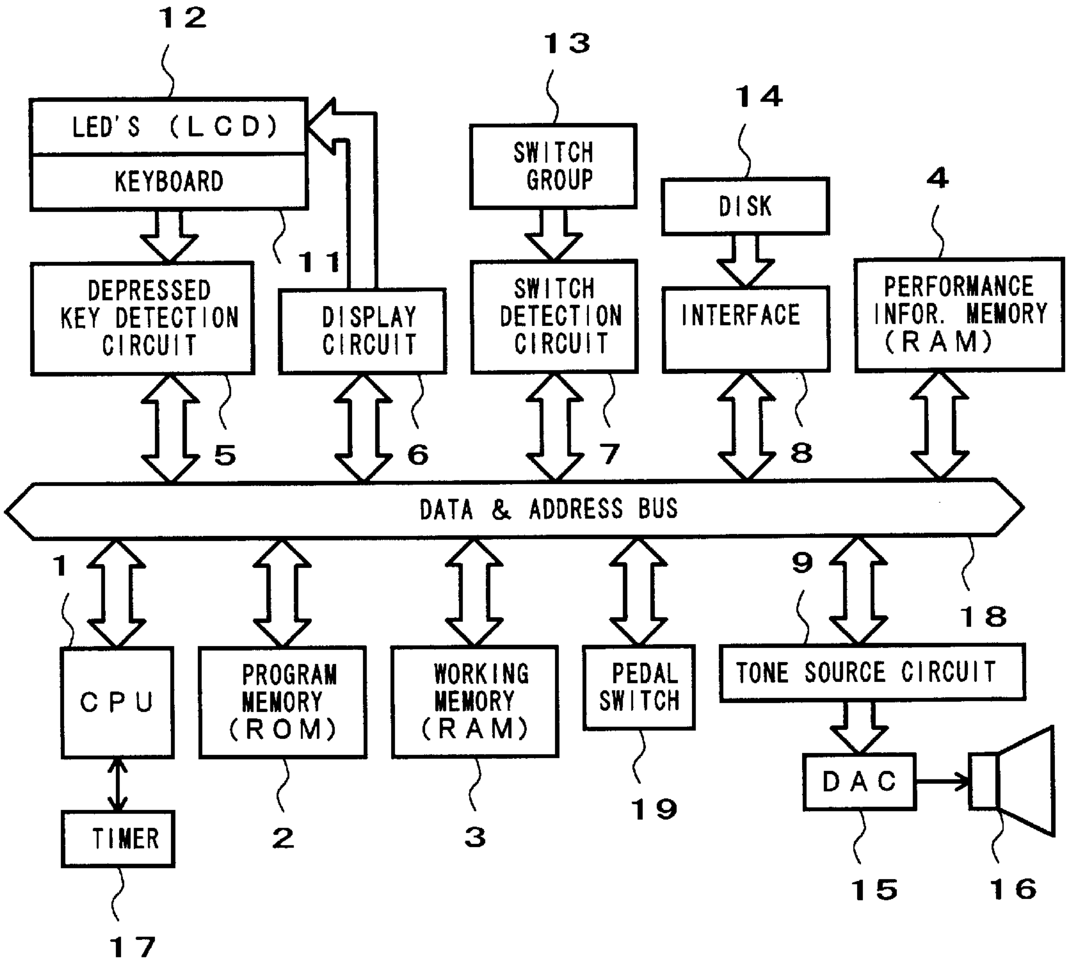
FIG. 13 is a block diagram illustrating an example of the hardware structure of an electronic musical instrument incorporating therein a phrase dividing device in accordance with a second embodiment of the invention.

FIG. 13 is a block diagram illustrating an example of the hardware structure of an electronic musical instrument incorporating therein a phrase dividing device in accordance with a second embodiment of the invention, wherein same reference characters as in FIG. 2 denote same elements as in the figure. The embodiment of FIG. 13 is different from that of FIG. 2 in that it is provided with a pedal switch 19 which is activated and deactivated in response to ON/OFF of a damper pedal by the player.

In this second embodiment, stored data in a performance information memory 4 are the same as in FIG. 3, and a "main routine", "comparative progression process" and "key-depression instructing display/automatic performance start process" are the same as those shown in FIGS. 4 to 6. Further, an "interrupt process", "reproduction process" and "data process" are the same as those shown in FIGS. 8 to 10. Such same processes will not be described in detail to avoid unnecessary duplication, and only different arrangements will be shown and described hereinbelow.

Figure 14:
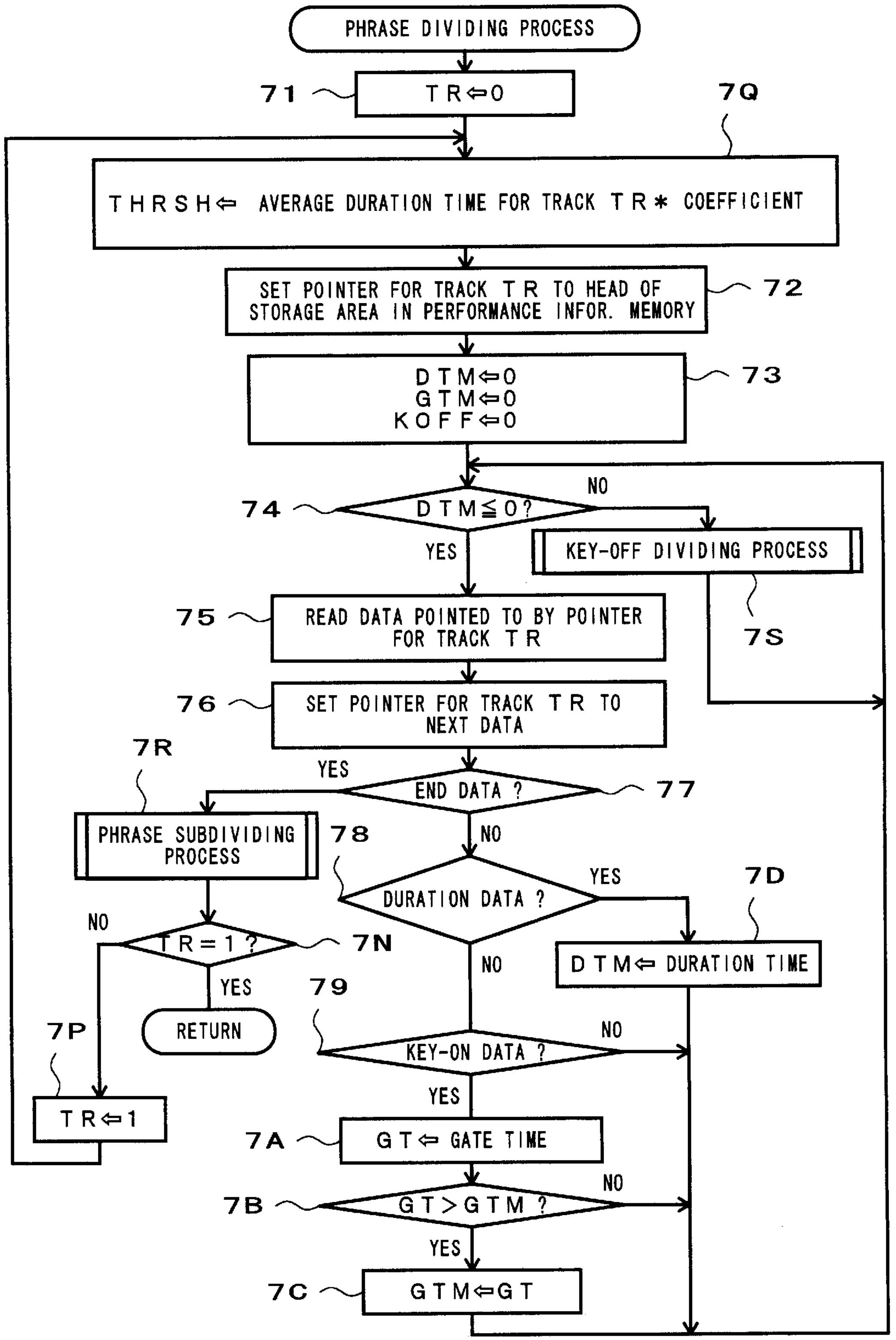
FIG. 14 is a flowchart illustrating a modified example of the phrase dividing process of FIG. 7 which is applied to the second embodiment of FIG. 13.

FIG. 14 shows a modified example of the "phrase dividing process" (step 49 of FIG. 4), wherein same reference characters as in FIG. 7 denote same steps as in the figure. These same steps will not be described, and only those different from FIG. 7 will be described.

The phrase dividing process of FIG. 14 is different from that of FIG. 7 at that step 7Q is inserted before step 72, step 7R is inserted for executing a "phrase subdividing process" in response to an YES determination in step 77, and "a key-off dividing process" collectively shown as step 7S is added.

In the newly added step 7Q, a value derived by multiplying the average of duration times of track number TR (i.e., value obtained by dividing the total of duration times of track number TR by the total number of duration codes) by a predetermined coefficient is stored as a threshold value into a threshold value register THRSH.

Figure 16:
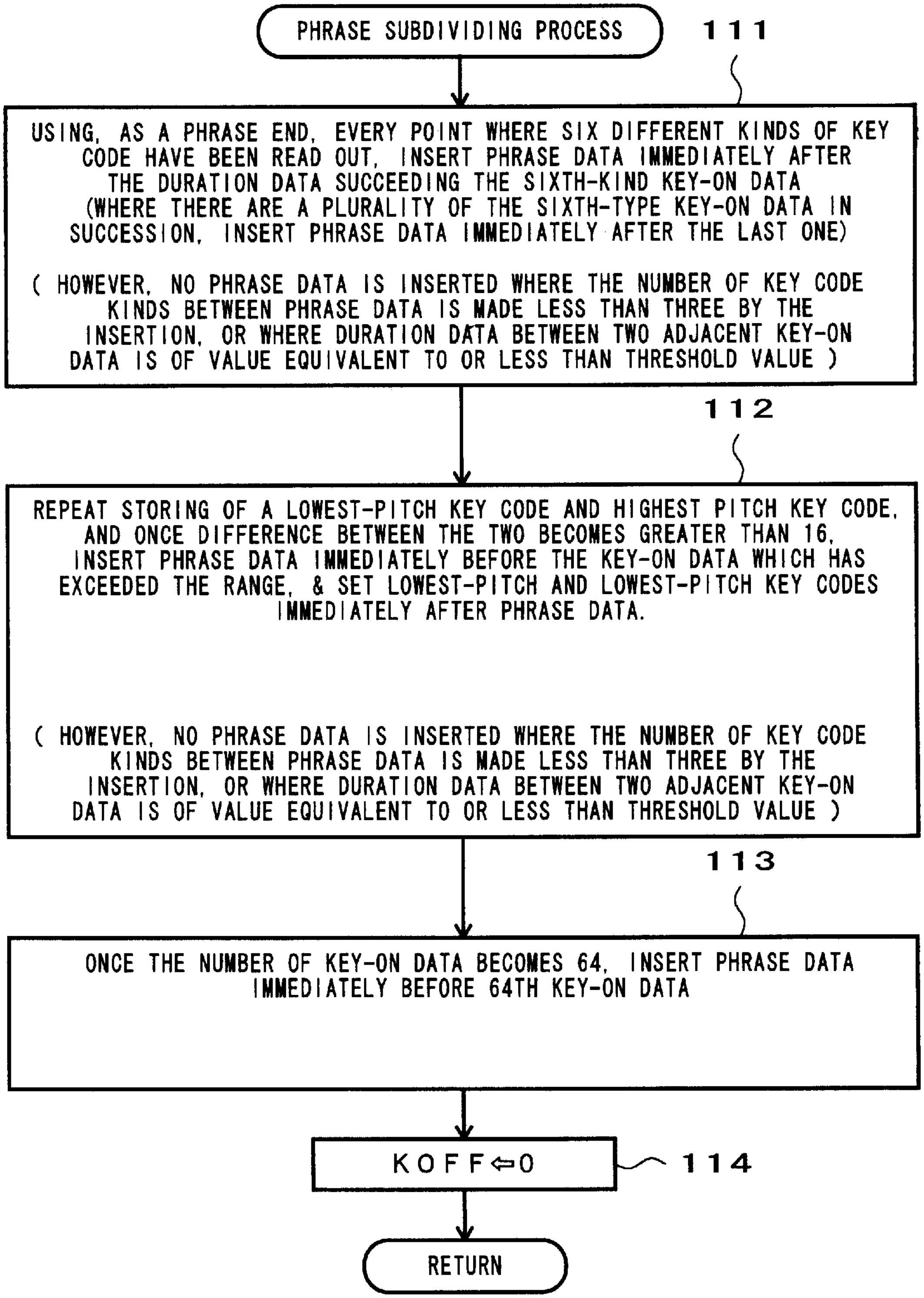
FIG. 16 is a flowchart illustrating a detailed example of a phrase subdividing process of FIG. 14.

In the newly added step 7R, the phrase subdividing process as shown in FIG. 16 is executed in response to the determination result in step 77 that the read-out data is end data.

Figure 15:
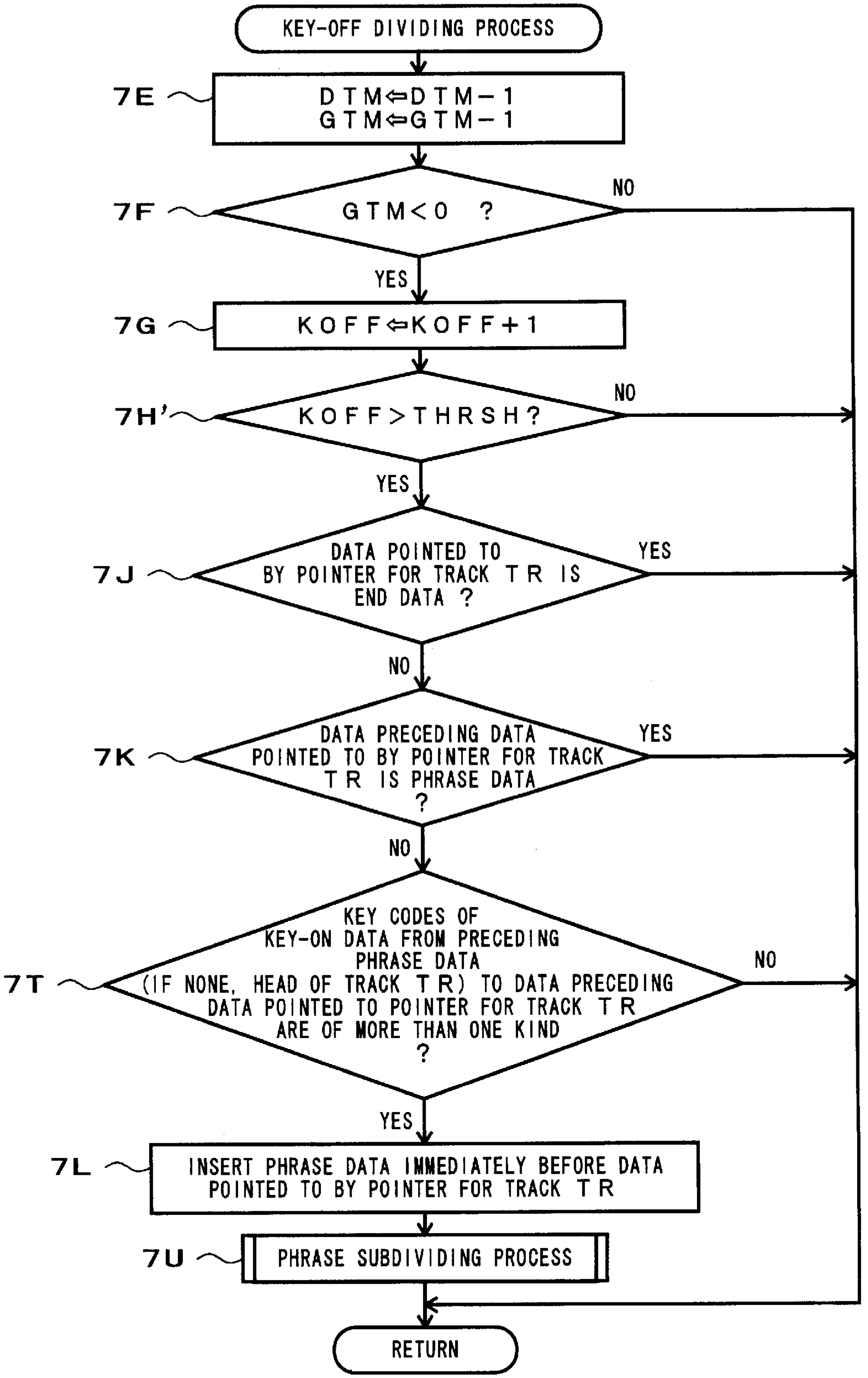
FIG. 15 is a flowchart illustrating a detailed example of a key-off dividing process of FIG. 14.

The key-off dividing process collectively shown in FIG. 14 (step 7S) corresponds to steps 7E to 7M of FIG. 7 and is flowcharted in detail in FIG. 15. In FIG. 15, steps 7E, 7F, 7G, 7J, 7K and 7L are directed to same operations as those of the corresponding step numbers of FIG. 7. Only steps different from those of FIG. 7 will be described. In step 7H', a comparison is made between the content of the threshold value register THRSH stored in step 7Q and the stored value in the key-off time counting register THRSH. At step 7T inserted between steps 7K and 7L, a determination is made as to whether there are two kinds of key code in key-on data between the preceding phrase data (if none, head data of the track number register TR) and the data immediately before the data pointed to by the pointer for the track specified by the register TR. If answered in the affirmative, the program proceeds to step 7L, but if not, the program reverts to step 74 of FIG. 14. At step 7U following step 7L is performed the phrase subdividing process as shown in FIG. 16. After that, the program reverts to step 74 of FIG. 14.

FIG. 16 is a flowchart illustrating a detailed example of the phrase subdividing process which is performed at steps 7R and 7U in the following step sequence.

Step 111: Using, as a phrase end, every point where six different kinds of key code have been read out, phrase data is inserted immediately after the duration data succeeding the sixth-kind key-on data (where there are a plurality of the sixth-type key-on data in succession, the phrase data is inserted immediately after the last one).

However, no phrase data is inserted where the number of key code types between phrase data is made less than three by the insertion, or where duration data between two adjacent key-on data is of value equivalent to or less than the threshold value stored in the register THRSH.

Step 112: Storing of a lowest-pitch key code and highest pitch key code is repetitively performed, and once the difference between the two becomes greater than 16, phrase data is inserted immediately before the key-on data which has exceeded the range. The lowest-pitch and lowest-pitch key codes are set to the key code of the key-on data immediately after the phrase data.

However, as at the preceding step, no phrase data is inserted where the number of key code kinds between phrase data is made less than three by the insertion, or where duration data between two adjacent key-on data is of value equivalent to or less than the threshold value stored in the register THRSH.

Step 113: Once the number of key-on data becomes 64, phrase data is inserted immediately before the 64th key-on data.

Step 114: Now that new phrase data has been inserted by the operation of step 7L of FIG. 15, the key-off time counting register KOFF is reset to “0”, and then the program reverts to step 74 (FIG. 14) to carry out operations of steps 74 to 7S until end data is read out.

The phrase dividing process in the second embodiment is carried out substantially in a similar manner to that in the above-described first embodiment, and therefore, the foregoing description is applicable here. To describe only what is different from the phrase dividing process in the first embodiment, the manner of setting the threshold value is different. Whereas the threshold value is an optional value (e.g., “12”) in the first embodiment, the threshold value is arithmetically calculated in the second embodiment at step 7Q. In the case of the performance data of FIGS. 1 and 3, there exist four duration data “24” and two duration data “48”, and “32” is calculated at step 7Q of FIG. 14 as the average of the duration data. If the predetermined coefficient is “½” at step 7Q, then threshold value of “16” is obtained, which is stored into the threshold value register THRSH.

As described above, the second embodiment is characterized in that the phrase dividing process of FIG. 14 includes step 7Q for calculating the threshold value THRSH, and it permits an optimum phrase division by varying the coefficient used.

Next, a description will be given about another embodiment of the phrase dividing process according to the present invention.

Whereas the above embodiments have been described in relation to a case where the performance data stored in the performance information memory 4 comprise normal automatic performance data which are analyzed to detect a place where the gate-off state time is greater than the predetermined threshold value and phrase data is inserted in the detected place, the performance data for use in this embodiment contain, as key data, finger number data each indicating a finger to be used for depressing a key. In this embodiment, the performance data are analyzed to detect a place where cross-fingering takes place, and phrase data is inserted in the detected place. Namely, in the embodiment, in making the key-depression instructing display phrase by phrase, a place where the cross-fingering peculiar to keyboard instruments is regarded as a sort of phrase, and phrase data is inserted in the place, so as to efficiently make the phrase-by-phrase key-depression instructing display suitable for the fingering.

FIGS. 17A and 17B are diagrams showing another exemplary format of the performance data for a single track (track number=0) stored in the performance information memory 4. FIG. 17A corresponds to a score of FIG. 18, and FIG. 17B extractively shows a portion of the performance data relating to a damper-pedal-off code. In FIGS. 17A and 17B, each of the key data includes finger number data each indicating a finger to be used for depressing a key, in addition to key-on code, key code, velocity data and gate time data. Finger number “1” represents the thumb, “2” the index finger, “3” the middle finger, “4” the medical finger, and “5” the little finger. In this embodiment, the phrase dividing device contained in the electronic musical instrument is designed to insert phrase data between duration time data and a key-on code as shown in FIG. 17A at a time point when cross-fingering takes place, and also insert phrase data between a pedal-off code and a duration code as shown in FIG. 17B at a time point when the damper pedal is released (i.e., upon detection of a pedal-off code).

Figure 19:
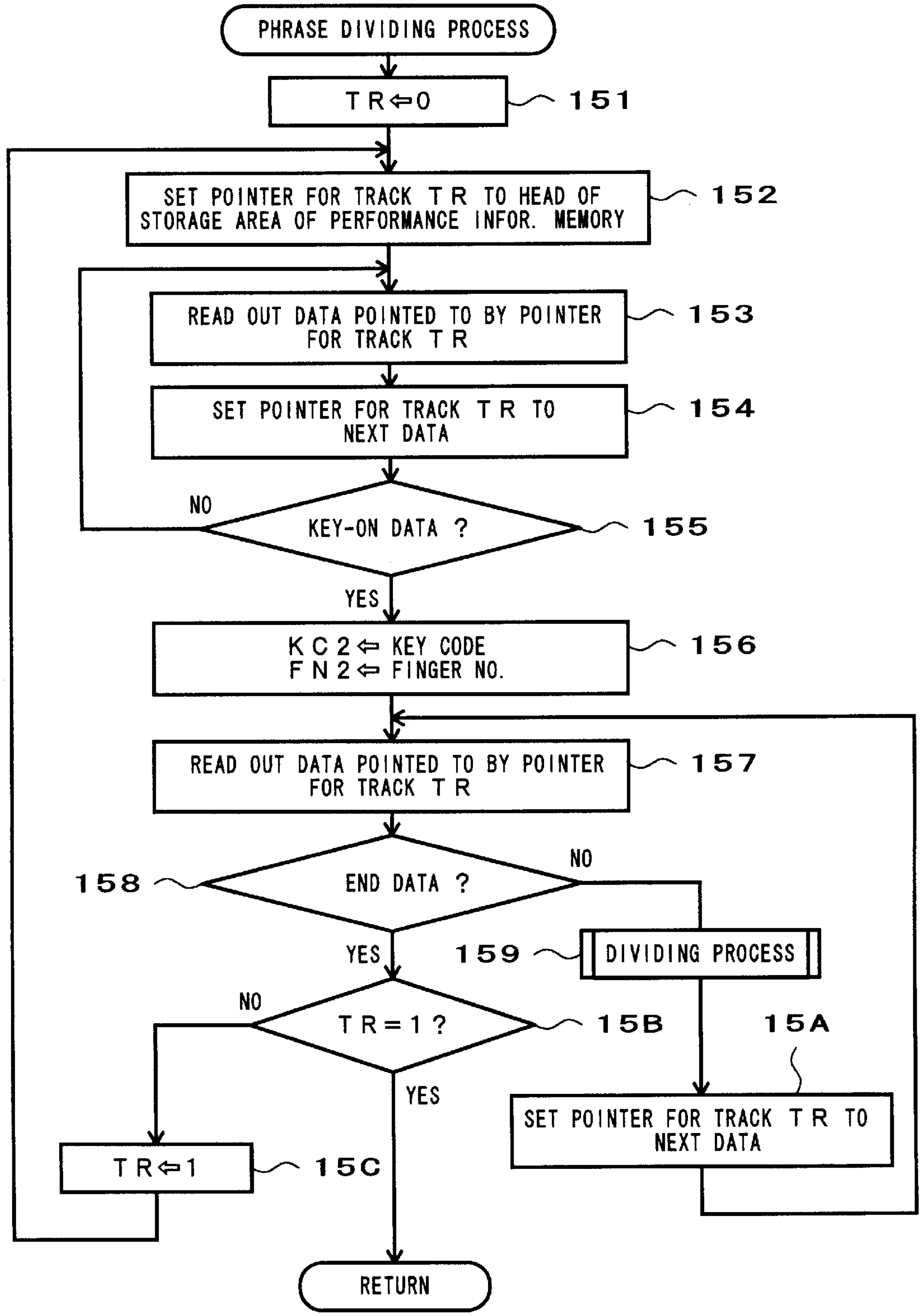
FIG. 19 is a flowchart illustrating another example of the phrase dividing process of FIG. 7 or 14.

The following embodiment is arranged in much the same way as the above embodiment and is different therefrom only in that a phrase dividing process of FIG. 19 is executed in place of the phrase dividing process of FIG. 14.

FIG. 19 is a flowchart illustrating the detail of the other phrase dividing process, operations are executed for dividing the performance data (having finger number data) as shown in FIG. 17A or 17B which has been read out from the disk 14 at step 48 of the FIG. 4 main routine and written into the performance information memory 4; namely, the performance data is divided phrase by phrase on the basis of the fingering. This phrase dividing process is performed in the following step sequence.

Step 151: The track number register TR is set to “0”.

Step 152: The read pointer for a track specified by the track number register TR is set to point to the head address of the corresponding storage area in the performance information memory 4.

Step 153: Performance data pointed to by the read pointer is read out.

Step 154: In preparation for a next readout operation, the read pointer for the track specified by the track number register TR is set to point to the read address of next data.

Step 155: A determination is made as to whether the data read out at step 153 is key-on data or not. If it is key-on data (YES), the program proceeds to step 156, but if it is other than key-on data (NO), the program loops back to step 153.

Step 156: Now that the read-out data is key-on data as determined at the preceding step 155, the key code and finger number data within the key-on data are stored into a second key code register KC2 and second finger number register KC2 and FN2, respectively.

Step 157: Performance data pointed to by the read pointer in time series according to the order of keys to be depressed, and finger numbers are stored into the first and second finger number registers FN1 and FN2 in time series according to the order of keys to be depressed. Thus, at steps 164 to 167, a determination will be made, on the basis of the stored values in the first and second finger number registers FN1 and FN2, whether the fingering corresponds to either cross-fingering.

Step 164: It is determined whether the track number register TR is at “0”, the value stored in the second key code register KC2 is equivalent to or greater than that in the first key code register KC1, and the value stored in the second finger number register FN2 is smaller than that in the first finger number register FN1. If all these conditions are met (YES), the program proceeds to step 168; otherwise, the program moves to next step 165. Namely, at this step, a determination is made as to whether there has occurred a so-called “right-hand finger passing” where, for the right-hand key depression, the current finger number value becomes smaller than the preceding finger number value although the current key code value stays the same as or becomes greater than the preceding key code.

Step 165: It is determined whether the track number register TR is at “0”, the value stored in the second key code register KC2 is equivalent to or smaller than that in the first key code register KC1, and the value stored in the second finger number register FN2 is greater than that in the first finger number register FN1. If all these conditions are met (YES), the program proceeds to step 168; otherwise, the program moves to next step 166. Namely, at this step, a determination is made as to whether there has occurred a so-called "right-hand finger crossing" where, for the right-hand key depression, the current finger number value becomes greater than the preceding finger number value although the current key code value stays the same as or becomes smaller than the preceding key code.

Step 166: It is determined whether the track number register TR is at "1", the value stored in the second key code register KC2 is equivalent to or greater than that in the first key code register KC1, and the value stored in the second finger number register FN2 is greater than that in the first finger number register FN1. If all these conditions are met (YES), the program proceeds to step 168; otherwise, the program moves to next step 167. Namely, at this step, a determination is made as to whether there has occurred a so-called "left-hand finger passing" where, for the left-hand key depression, the current finger number value becomes greater than the preceding finger number value although the current key code value stays the same as or becomes greater than the preceding key code.

Step 167: It is determined whether the track number register TR is at "1", the value stored in the second key code register KC2 is equivalent to or smaller than that in the first key code register KC1, and the value stored in the second finger number register FN2 is smaller than that in the first finger number register FN1. If all these conditions are met (YES), the program proceeds to step 168; otherwise, the for the track specified by the track number register TR is read out.

Step 158: A determination is made as to whether the data read out at the preceding step 157 is end data or not. If it is end data (YES), the program proceeds to step 15B, but if it is other than end data (NO), the program loops back to step 159.

Step 159: Now that the read-out data is not end data as determined at the preceding step 157, a dividing process as shown in FIG. 20 is executed.

Figure 20:
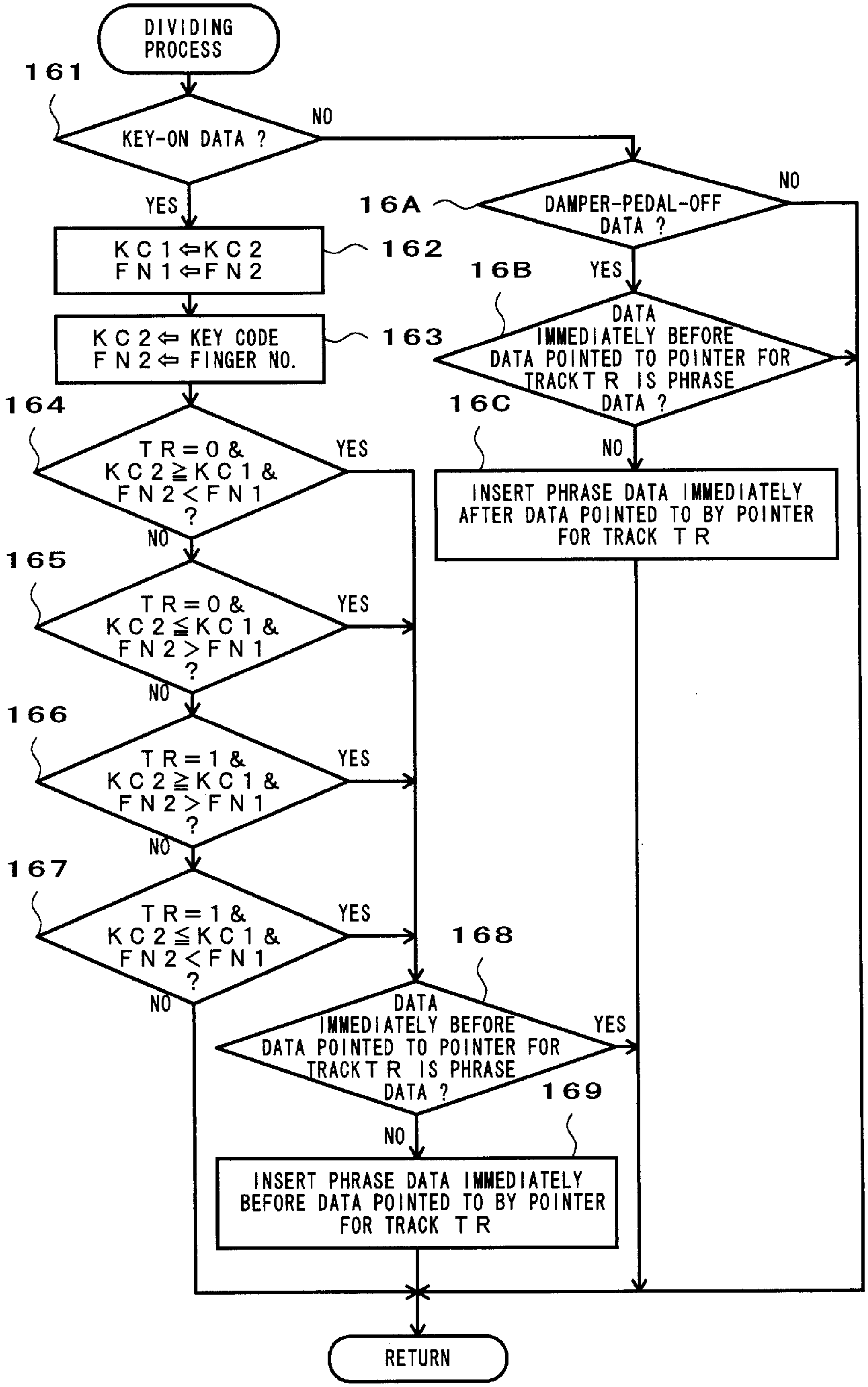
FIG. 20 is a flowchart illustrating a detailed example of the phrase dividing process of FIG. 19.

FIG. 20 is a detailed flowchart of the dividing process which is carried out in the following step sequence.

Step 161: A determination is made as to whether the data read out at step 157 is key-on data or not. If it is key-on data (YES), the program proceeds to step 162, but if it is other than key-on data (NO), the program goes to step 16A.

Step 162: Now that the read-out data is key-on data as determined at the preceding step 161, the key code stored in the second key code register KC2 is stored into a first key code register KC and the finger number data stored in the second finger number register K2 is stored into a first key code register KC1.

Step 163: The key code and finger number data within the read-out key-on data are stored into a second key code register KC2 and second finger number register KC2 and FN2, respectively.

By the operations of steps 162 and 163, key codes are stored into the first and second key code registers KC1 and KC2 program removes to step 15A of FIG. 19. Namely, at this step, a determination is made as to whether there has occurred a so-called "left-hand finger crossing" where, for the left-hand key depression, the current finger number value becomes smaller than the preceding finger number value although the current key code value stays the same as or becomes smaller than the preceding key code.

Step 168: A determination is made as to whether data immediately before the performance data pointed to the read pointer for the track specified by the register TR is phrase data or not. If answered in the affirmative, the program reverts to step 15A of FIG. 19, but if the data is other than phrase data, the program proceeds to step 169.

Now that any of steps 164 to 167 has determined that there has occurred a cross-fingering, it is normally sufficient to insert phrase data immediately before the data pointed to by the pointer; however, in case the data immediately before the data pointed to be the pointer is phrase data, then insertion of phrase data becomes meaningless. This is why this step determines presence or absence of such phrase data.

Step 169: Phrase data is inserted immediately before the data pointed to by the pointer for the track specified by the register TR, and then the program reverts to step 15A of FIG. 19.

Step 16A: Because of the determination at step 161 that the read-out data is not key-on data, it is further determined at this step whether the read-out data is damper-pedal-off data or not. With an affirmative answer, the program proceeds to step 16B, but if it is other than damper- pedal-off data (NO), the program reverts to step 15A of FIG. 19.

Step 16B: A determination is made as to whether data immediately before the performance data pointed to the read pointer for the track specified by the register TR is phrase data or not. If answered in the affirmative, the program reverts to step 15A of FIG. 19, but if the data is other than phrase data, the program proceeds to step 16C.

Since step 16A has determined that the read-out data is damper-pedal-off data, it is normally sufficient to insert phrase data immediately after the data pointed to by the pointer; however, in case the data immediately after the data pointed to be the pointer is phrase data, then insertion of phrase data becomes meaningless. This is why this step determines presence or absence of such phrase data.

Step 16C: Phrase data is inserted immediately after the data pointed to by the pointer for the track specified by the register TR, and then the program reverts to step 15A of FIG. 19.

Step 15A: In preparation for a next readout operation, the read pointer for the track specified by the track number register TR is set to point to the read address of next data.

Then, the program reverts to step 157.

Step 15B: It is determined whether the track number register TR is at a value of "1" or not. If answered in the affirmative, the program returns to step 48 of FIG. 22, but if not, the program proceeds to step 15C.

Step 15C: Because in this phrase dividing process, "0" is set into the track number register TR at step step 151, the NO determination at step 15B means that the register TR is at "0", so that "1" is set into the register TR and then the program loops back to step 152 to perform the above-mentioned operations on left-hand performance data. Consequently, the operations of steps 152 to 15A will be performed for track number "1".

The following description is about a manner in which the performance data of FIGS. 17A and 17B corresponding to the score of FIG. 18 is divided by the phrase dividing process of FIG. 19.

First, "0" is set into the track number register TR at step 151, and the phrase dividing process (steps 152 to 15A) is carried out for the track storing the performance data of the right-hand key depression until a NO determination results at step 15B. At step 152, the pointer is set to point to the address of the first key-on data of FIG. 17A. At step 153, the first key-on data, i.e., data relating "F4 (=65)", of FIG. 17A is read out. Then, at step 154, the pointer is set to point to the following duration data. Because the data read out at step 153 is key-on data, the operations of step 156 is executed, where the key code "65" and finger number "1" of the key-on data "F4 (=65)" are stored into the second key code register KC2 and second finger number register FN2, respectively.

Now that the duration time "24" is read out at step 157, NO determinations are obtained at steps 158, 161 and 16A, the pointer is set to next key-on data at step 15A, and the data relating to "G4 (=67)" is read out at step 157. Thus, the operations of steps 162 and 163 are performed by way of steps 158 and 161. At step 162, the key code "65" and finger number "1" stored in the second key code register KC2 and second finger number register FN2 are stored into the first key code register KC1 and first finger number register FN1, respectively. At step 163, the key code "67" and finger number "2" of the key-on data "G4 (=67)" are stored into the second key code register KC2 and second finger number register FN2, respectively.

At this time point, the conditions of the various registers are TR=0, KC2>KC1 and FN2>FN1, and NO determination result at steps 164 to 167, so that the program reverts to step 157 by way of step 15A. After that, the above-mentioned operations are repeated until data relating to the key-on data "C5 (=72)" is read out.

Then, once the data relating to the key-on data "C5 (=72)" is read out, the operations of steps 162 and 163 are performed by way of steps 158 and 161. At step 162, the key code "71" and finger number "4" stored in the second key code register KC2 and second finger number register FN2 are stored into the first key code register KC1 and first finger number register FN1, respectively. At step 163, the key code "72" and finger number "1" of the key-on data "C5 (=72)" are stored into the second key code register KC2 and second finger number register FN2, respectively.

At this time point, the conditions of the various registers are TR=0, KC2≧KC1 and FN2<FN1, and an YES determination results at step 164. However, the determination at step 168 becomes negative because the data immediately before the data pointed to by the pointer is duration data, not phrase data. Phrase data is inserted at step 169 immediately before the fifth key-on data "C5 (=72)" pointed to by the pointer, and the above-mentioned operations are repeated until end data is read out, so as to insert phrase data in a predetermined position.

Then, once end data is read out, an YES determination is obtained at step 158, and "1" is set into the track number register TR, so that the operations of steps 152 to 15A are repeated for track number "1".

When a pedal-off code of FIG. 17B indicative of deactivation of the damper pedal is read out at step 157 during the above-mentioned phrase dividing process, the operation of step 16A is performed by way of steps 158 and 161. At step 16A, an affirmative determination results because the read-out data is a pedal-off code indicative of deactivation of the damper pedal. The determination at step 16B becomes negative because the data immediately before the data pointed to by the pointer is duration data, not phrase data. Then, phrase data is inserted at step 16C immediately before the pedal-off code pointed to by the pointer as shown in FIG. 17B. After that, the above-mentioned operations are repeated until end data is read out, so as to insert phrase data in a predetermined position.

Then, once end data is read out, an YES determination is obtained at step 158, and "1" is set into the track number register TR, so that the operations of steps 152 to 15A are repeated for track number "1".

In the above-mentioned manner, the second embodiment reads out the performance data stored with finger numbers to be used for the key-depression instructing display, to thereby divide the performance data into predetermined phrases.

Next, a description will be given about a comparative progression process II which is another embodiment of the comparative progression process of FIG. 5. The comparative progression process of FIG. 5 has been described as lighting all the LEDs corresponding key codes registered in the key code list when an indicated key is depressed and keeping the current-phrase-corresponding LEDs lit during the phrase; on the other hand, the comparative progression process II of FIG. 21 is arranged in such a manner that, when an indicated key has been depressed, the corresponding (blinking) LED is turned off if the depressed key code is no more present in the current phrase.

Figure 21:
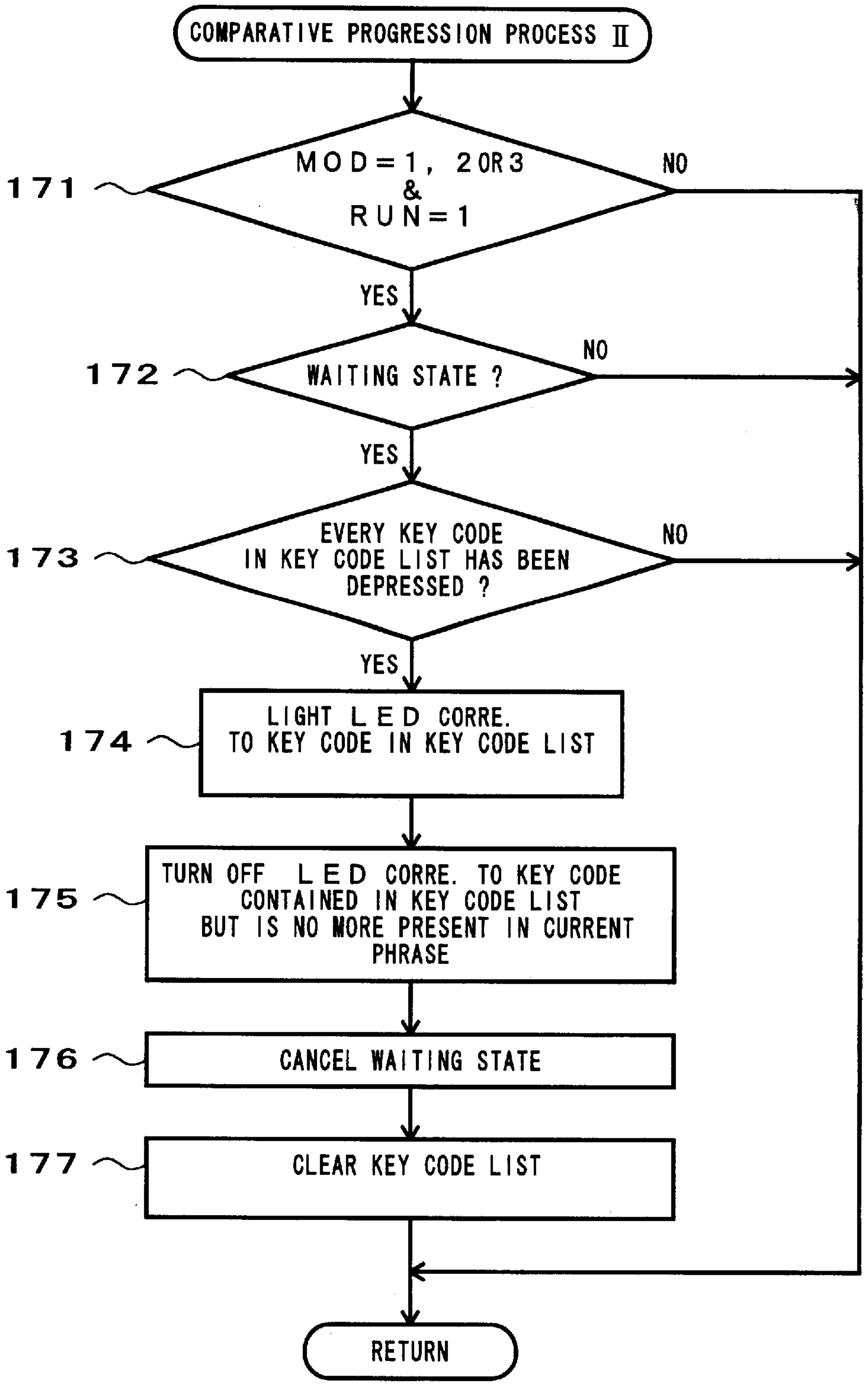
FIG. 21 is a flowchart illustrating comparative progression process II which is another embodiment of the comparative progression process of FIG. 5.

FIG. 21 shows the detail of the comparative progression process II, which is carried out in the following step sequence. Steps 171 to 175 and step 177 of FIG. 21 are substantially the same as steps 51 to 56 of FIG. 5 and will therefore be described briefly.

Step 171: A determination is made as to whether the mode number register MOD is at one of the values "0", "1", "2" and "3" and the running state flag RUN is at "1". If answered in the affirmative, the program proceeds to step 172; otherwise the program moves to step 47 of FIG. 4.

Step 172: A determination is made as to whether the instrument is in a waiting state, i.e., whether the waiting state flag WAIT is at "1". If answered in the affirmative (YES), the program goes to next step 173; otherwise, the program returns to the main routine to enter step 47.

Step 173: It is determined whether every key code registered in the key code list has actually been depressed. If every registered key code has been depressed (YES), the program proceeds to step 174, but if not, the program returns to the main routine to enter step 47 of FIG. 4.

Step 174: Because of the affirmative determination at step 173, the blinking LED corresponding to every registered key code in the list is lit.

Step 175: The LED is turned off which corresponds to a key code contained in the key code list but is no more present in the current phrase. This step is newly added in the comparative progression process II. Consequently, by the operation of step 175, when an indicated key has been depressed, the corresponding (blinking) LED is turned off if the depressed key code is no more present in the current phrase.

Step 176: The waiting state flag WAIT is reset to "0" to cancel the waiting state.

Step 177: The key code list is cleared, and then, the program returns to the main routine to enter step 47.

This comparative progression process II may be performed in place of the comparative progression process of step 84 of FIG. 8, in which case the program will proceed to step 85 of FIG. 8 when NO determination result at steps 171 to 173 and upon termination of step 177.

The performance data divided into phrases according to the above-mentioned embodiment may be used for music piece analysis such as detection of musical key or formula or for automatic arrangement. In such a case, the performance data may be stored in phrases in a data base.

Although the embodiment has been described above as obtaining the threshold value by a predetermined arithmetic operation of multiplying the average value of duration time by a predetermined coefficient, the threshold value may be obtained by converting the average value of duration data by use of a table. Alternatively, an absolute time or a predetermined number of beats may be set as the threshold value. In setting an absolute value to the threshold value, a comparison may be made between a value deprived by multiplying a stored value in the key-off time counting register KOFF by "60/(TMP×24)" and the threshold value, in order to correlate the value of the register KOFF to the absolute value. Namely, the determination formula at step 7H' of FIG. 15 may be changed to "KOFF*(60/(TMP×24))", wherein TMP denotes the performance speed of a music piece which may be represented by the number of quarter notes performed per minute.

Further, the performance formula at step 7Q of FIG. 14 may be changed such as to "(the total of key-off times for track TR/the number of key-off events for track TR)*coefficient" or to "(the total number of key-on events for track TR/the total of key-on times for track TR)*coefficient". The threshold value obtained in such a manner will represent the frequency of staccatos, because a music piece with more staccatos has longer total duration of all key-off events.

The embodiment has been described above in connection with a case where a plurality of key-depression displaying modes are provided. It is also possible to provide beginner or junior class, intermediate class and senior class modes corresponding to technical levels of players so that any one of these classes can be selected via a mode selecting switch. In this case, the number of LED to be lit simultaneously (i.e., maximum and minimum numbers of keys to be depressed simultaneously) may be increased as the player's class becomes higher.

Whereas the embodiment has been described as obtaining the threshold value by multiplying the average value of duration time for a single track by a predetermined coefficient, the phrase division may also be performed by dividing the performance data into sections of one or more measures and setting a threshold value for each of such sections.

Furthermore, although the embodiment has been described as performing a further phrase subdividing process after a predetermined key-off dividing process, it is possible to omit the phrase subdividing process; alternatively, the phrase subdividing process may be performed separately from the key-off dividing process. Moreover, although the operations of steps 111 to 113 have been described as being executed as the phrase subdividing process of FIG. 16, these steps may be executed singly or in combination. Also, the phrase subdividing process of FIG. 16 may be executed after the dividing process of step 159 in the phrase dividing process of FIG. 19 or before the determination of step 15B. Namely, the phrase division may be executed by appropriately combining the key-off dividing process of step 7S of FIG. 14 (FIG. 15), phrase subdividing process of steps 111 to 113 of FIG. 16 and dividing process of step 159 of FIG. 19 (FIG. 20).

With the present invention arranged in the above-mention manner, performance information undivided in phrases can be automatically divided into phrases.

Next, with reference to FIGS. 22 to 35, a description will be given hereinbelow about a third embodiment of the present invention. This third embodiment is a modified example of the second embodiment described above with reference to FIGS. 13 to 21, and features another embodiment of the phrase dividing device in accordance with the present invention. The hardware structure of an electronic musical instrument incorporating therein the phrase dividing device according to the third embodiment may be the same as that shown in FIG. 13.

Figure 22:
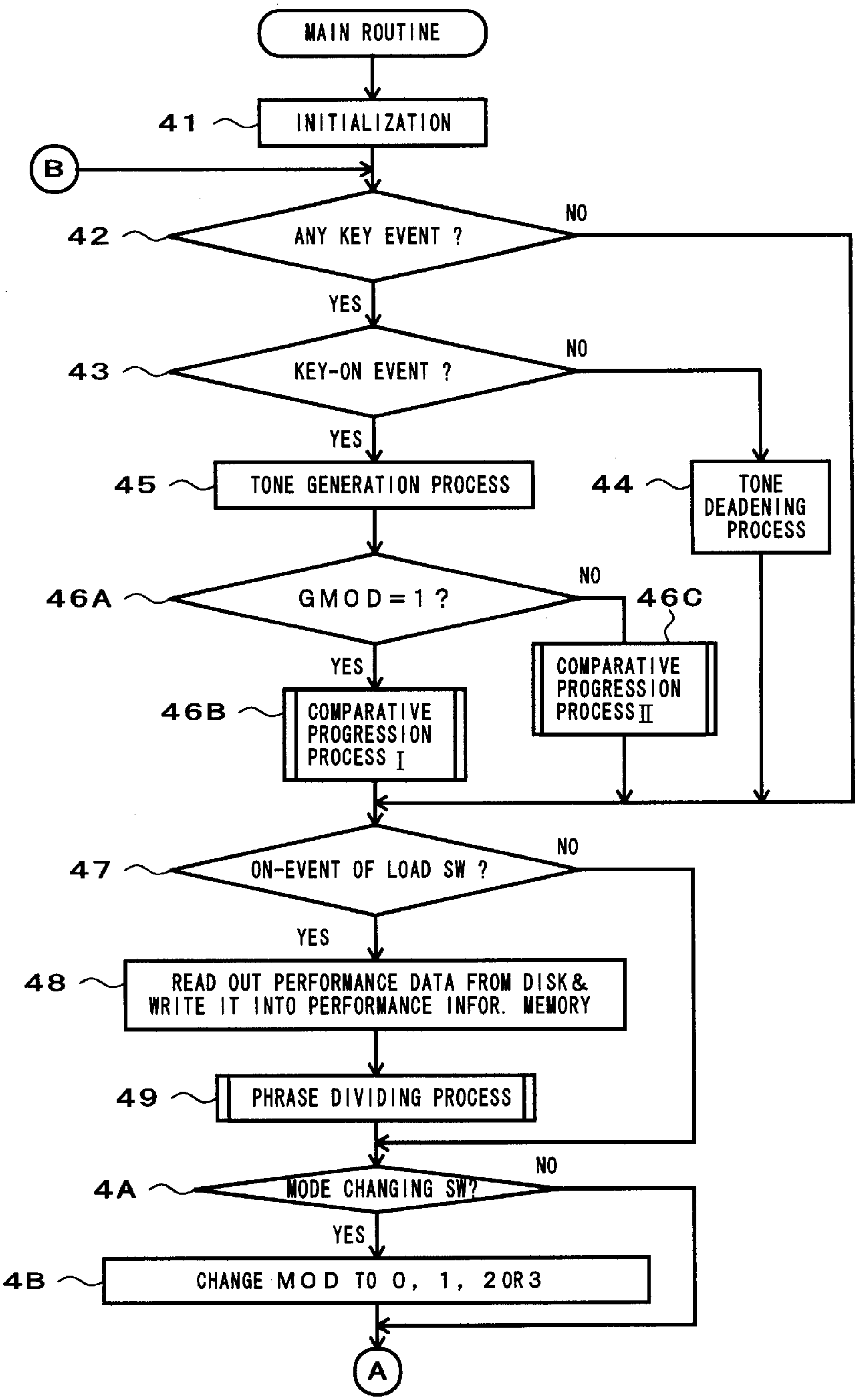
FIG. 22 is a flowchart illustrating an example of the former half of an example main routine performed by a microcomputer of the electronic musical instrument in accordance with the third embodiment of the present invention.
Figure 23:
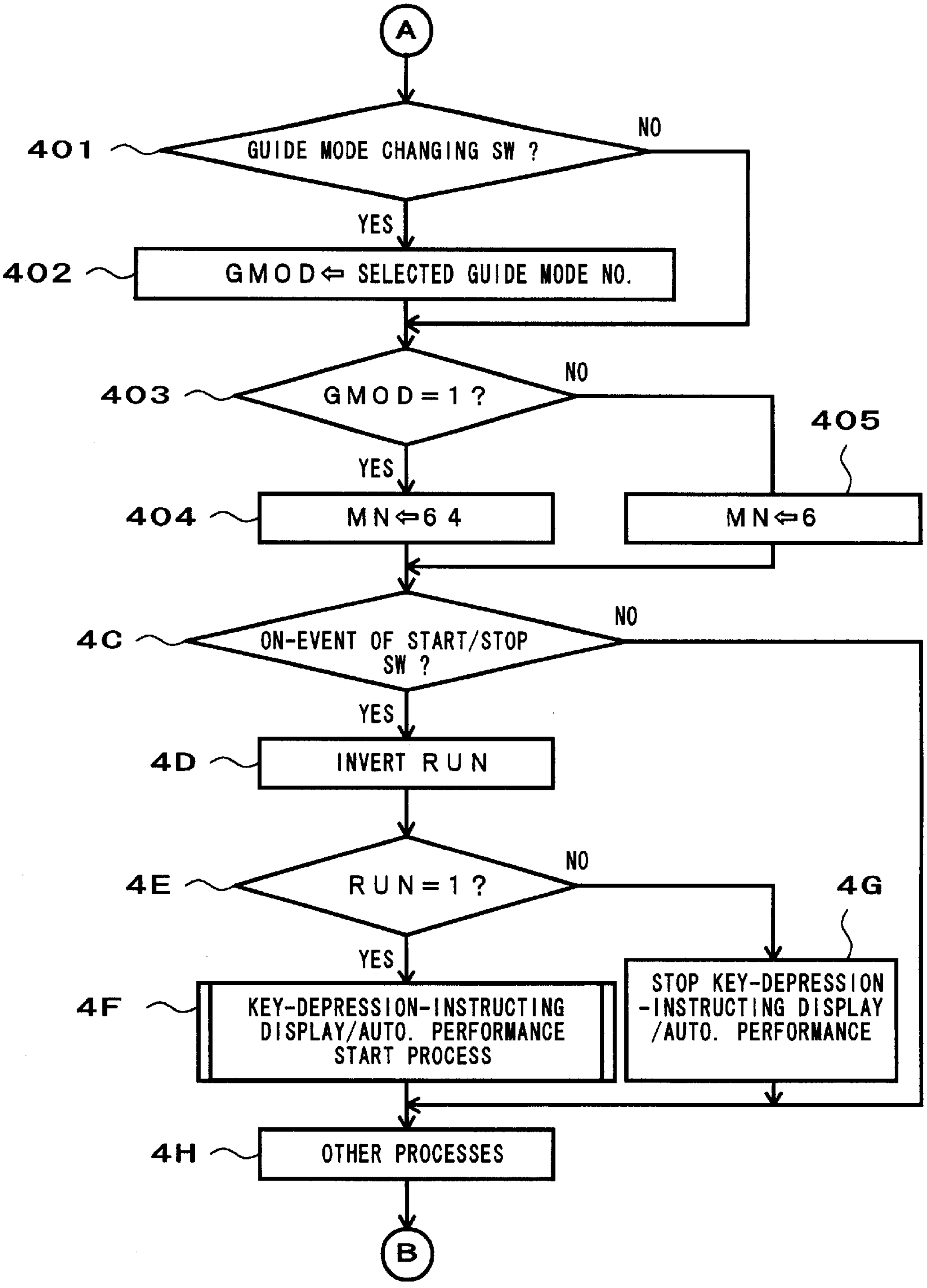
FIG. 23 is a flowchart illustrating the latter half of the main routine of FIG. 22.

In the third embodiment, the performance data in the performance information memory 4 is the same as that shown in FIG. 3, but the main routine is not the same as in FIG. 4 but changed as shown in FIGS. 22 and 23.

In the main routine of FIGS. 22 and 23, steps for performing the same operations as those in FIG. 4 are denoted by the same reference characters as in the figure. The main routine as shown in FIGS. 22 and 23 is different from that of FIG. 4 in that, whereas the step following the tone generation process of step 45 in FIG. 4 is a single "comparative progression process" of step 46, it includes steps 46A, 46B and 46C to permit one of comparative progression processes I and II to be selectively performed. The operations at these steps 46A to 46C are as follows.

Step 46A: It is determined whether a guide mode register GMOD is at a value of "1" or not. If answered in the affirmative, the routine proceeds to the comparative progression process I of step 46B in order to make the key-depression instructing display by LED lighting alone, but if answered in the negative, the routine branches to the comparative progression process II of step 46C in order to repeat the key-depression instructing display of an erroneously depressed key by both LED lighting and tone generation.

Step 46B: The comparative progression process I as shown in FIG. 24 is performed where control is made as to whether or not to make a next key-depression instructing display while making a comparative determination as to whether every indicated key has been depressed, and then the routine proceeds to step 47.

Figure 25:
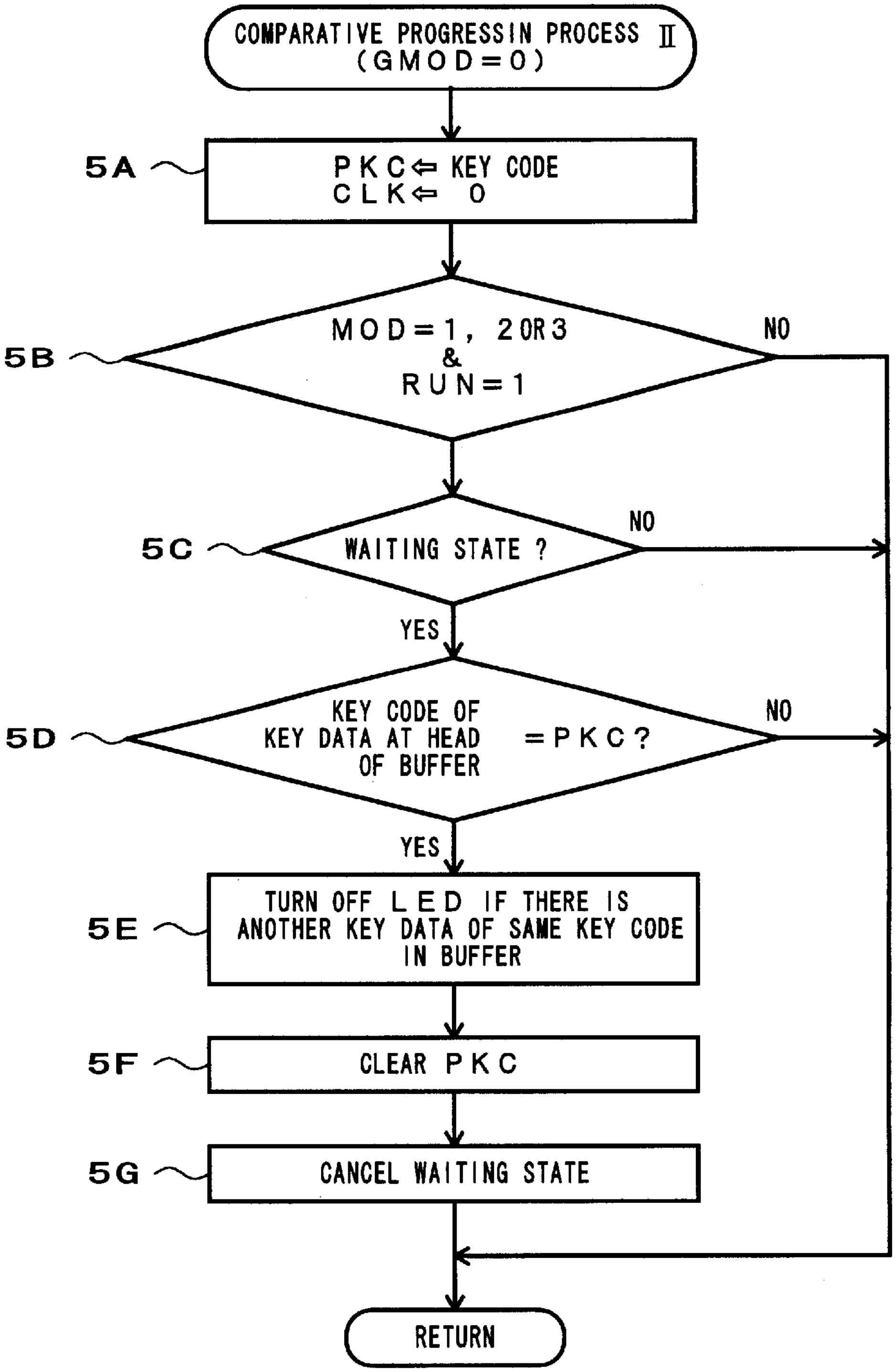
FIG. 25 is a flowchart illustrating a detailed example of comparative progression process II of FIG. 22.

Step 46C: The comparative progression process II as shown in FIG. 25 is performed where a comparative determination is made as to whether every indicated key (in this embodiment, key indicated by fully or blinkingly lighting a corresponding LED) has been depressed and also control is made as to whether or not the key-depression instructing display should be repeated for any erroneously depressed key. Then, the routine proceeds to step 47.

Figure 24:
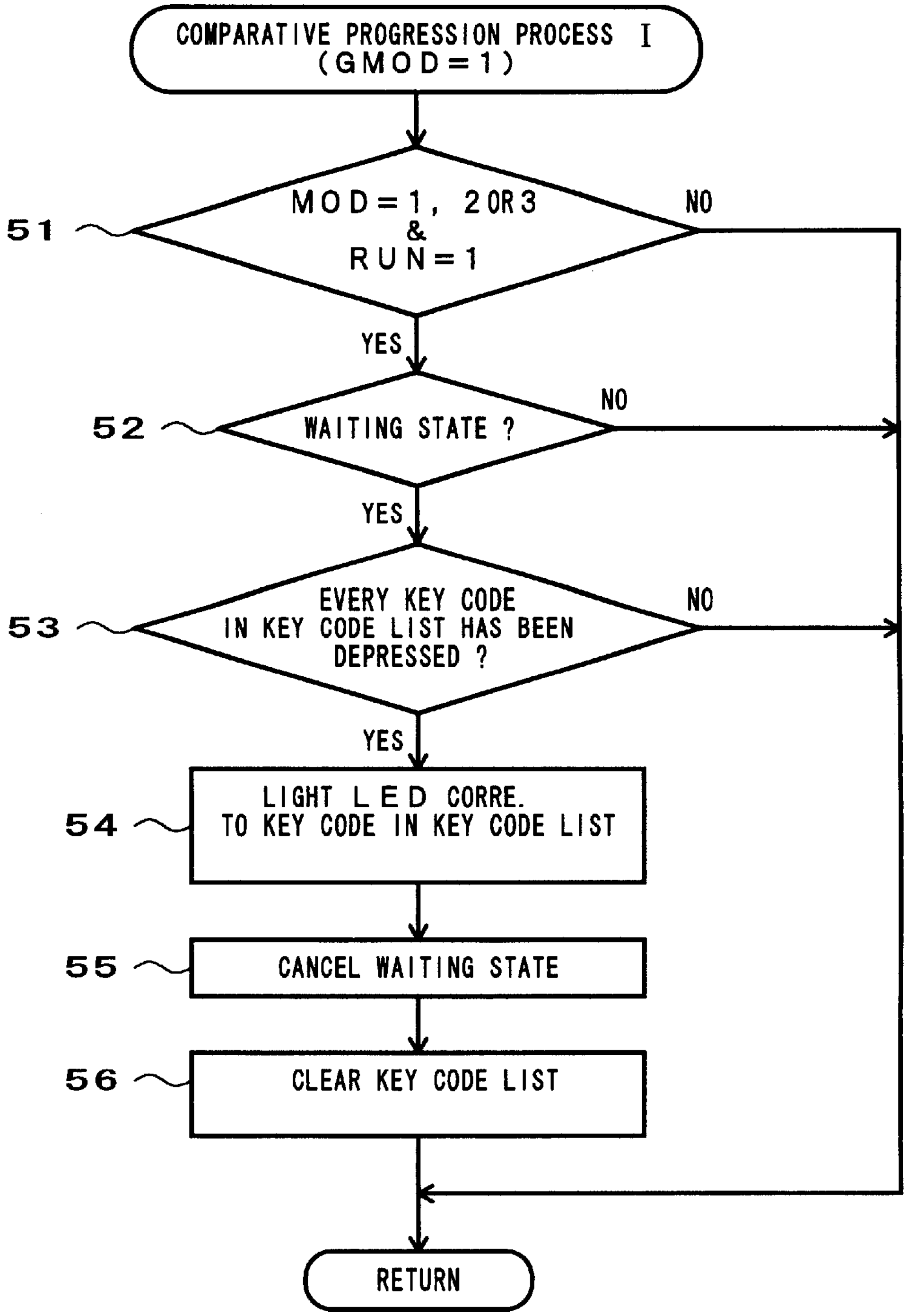
FIG. 24 is a flowchart illustrating a detailed example of comparative progression process I of FIG. 22.

The contents of the comparative progression process I shown in FIG. 24 is the same as the comparative progression process of FIG. 5 and therefore will not be described to avoid unnecessary duplication.

FIG. 25 shows the detail of the comparative progression process II of step 46C which is carried out in the following step sequence.

Step 5A: Because of the determination at previous step 43 that the detected key event is a key-on event, the key code is stored" into a performance key code register PKC and a clock register CLK is reset to "0".

Step 5B: Similarly to step 51, it is determined whether the mode number register MOD is at a value of "1", "2" or "3" and the running state flag RUN is at "1". If answered in the affirmative, the program proceeds to step 5C; otherwise, the program returns to step 47 of the main routine of FIG. 22.

Step 5C: A determination is made as to whether the instrument is in the waiting state, i.e., whether the waiting state flag WAIT is at "1". If answered in the affirmative (YES), the program goes to next step 5D; otherwise, the program returns to the main routine of FIG. 22 to enter step 47. The waiting state flag WAIT is set to "1" at step 328 of FIG. 32 when a key code stored in the performance key code register PKC and a key code of the performance data coincide with each other during an interrupt process II as will be described later, and hence, the affirmative determination at this step 5C means that new key-on data up to the phrase end has been transferred to a buffer at step 32B of FIG. 32.

Step 5D: A determination is made as to whether the key code of key-on data stored at the head of the buffer and the key code stored in the performance key code register PKC coincide with each other. If answered in the affirmative, the program proceeds to step 5E, but if not, the program moves to step 47 of FIG. 22.

Step 5E: The determination at step 5C that the musical instrument is in the waiting state and determination at step 5D that the key codes stored in the buffer an performance key code register PKC coincide with each other mean that a right key depression according with the indication has occurred after the key-depression instructing display by both the LED lighting and the tone generation. Consequently, this step turns off the LED corresponding to the key code stored in the performance key code register PKC. However, the LED is maintained in the lit state if there is another key data of the same key code in the buffer.

Step 5F: The performance key code register PKC is cleared.

Step 5G: The waiting state flag WAIT is reset to "0" to cancel the waiting state, in response to which will be executed the operation of step 307 of FIG. 30 and the operations at and after step 312 of FIG. 31.

Referring back to the main routine of FIGS. 22 and 23, steps 47 to 4B of FIG. 22 perform the same operations as those of the corresponding step numbers in FIG. 4. Also, steps 4C to 4H of FIG. 23 perform the same operations as those of the corresponding step numbers in FIG. 4. This main routine differs from that of FIG. 4 in that steps 401 to 405 are inserted between steps 4B and 4C, and these inserted steps 401 to 405 will be described.

Step 401: The operators 13 are scanned to determine whether there has occurred an on-event of a guide mode changing switch (not shown). If answered in the affirmative, the routine proceeds to next step 402, but if not, the routine jumps to step 403.

Step 402: Now that there has occurred an on-event of the guide mode changing switch as determined at step 401, the guide mode register GMOD is changed between values "0" and "1". Namely, if the value stored in the guide mode register GMOD prior to this step is "0", then it is changed to "1", while if the value stored in the guide mode register GMOD prior to this step is "1", it is changed to "0". The stored value "0" in the guide mode register GMOD represents a repeated key-depression instructing mode where the key-depression by both the LED lighting and the tone generation is repeatedly made until a right key depression is performed, while the stored value "1" in the guide mode register GMOD represents a suspended key-depression instructing mode where the key-depression by the LED lighting alone is performed and a suspended state is maintained until a right key depression is performed.

Step 403: It is determined whether the guide mode register GMOD is at a value of "1" or not. With an affirmative determination, the routine proceeds to next step 404, but with a negative answer, the routine branches to step 405.

Step 404: The affirmative determination at the preceding step 403 implies that the suspended key-depression instructing mode is currently ON, and thus "64" is set at this step into a maximum-number-of-note register MN which specifies a maximum number of notes to define a phrase for use at step 113' of a phrase subdividing process of FIG. 27 as will be described later.

Step 405: The negative determination at the preceding step 403 implies that the repeated key-depression instructing mode is currently ON, and thus "6" is set at this step into the maximum-number-of-note register MN for the purpose mentioned above in connection with step 404.

No particular inconvenience arises with the suspended key-depression instructing mode no matter how great the number of notes forming a phrase may be; however, with the repeated key-depression instructing mode, the significance to repeat the indication may decrease if the number of notes forming a phrase is relatively great. For this reason, this embodiment is arranged to vary the maximum number of notes forming a phrase depending on the key-depression instructing mode selected.

After step 404 or 405, operations of steps 4C to 4H are performed as in FIG. 4, and then the routine loops back to step 42 of FIG. 22.

Figure 26:
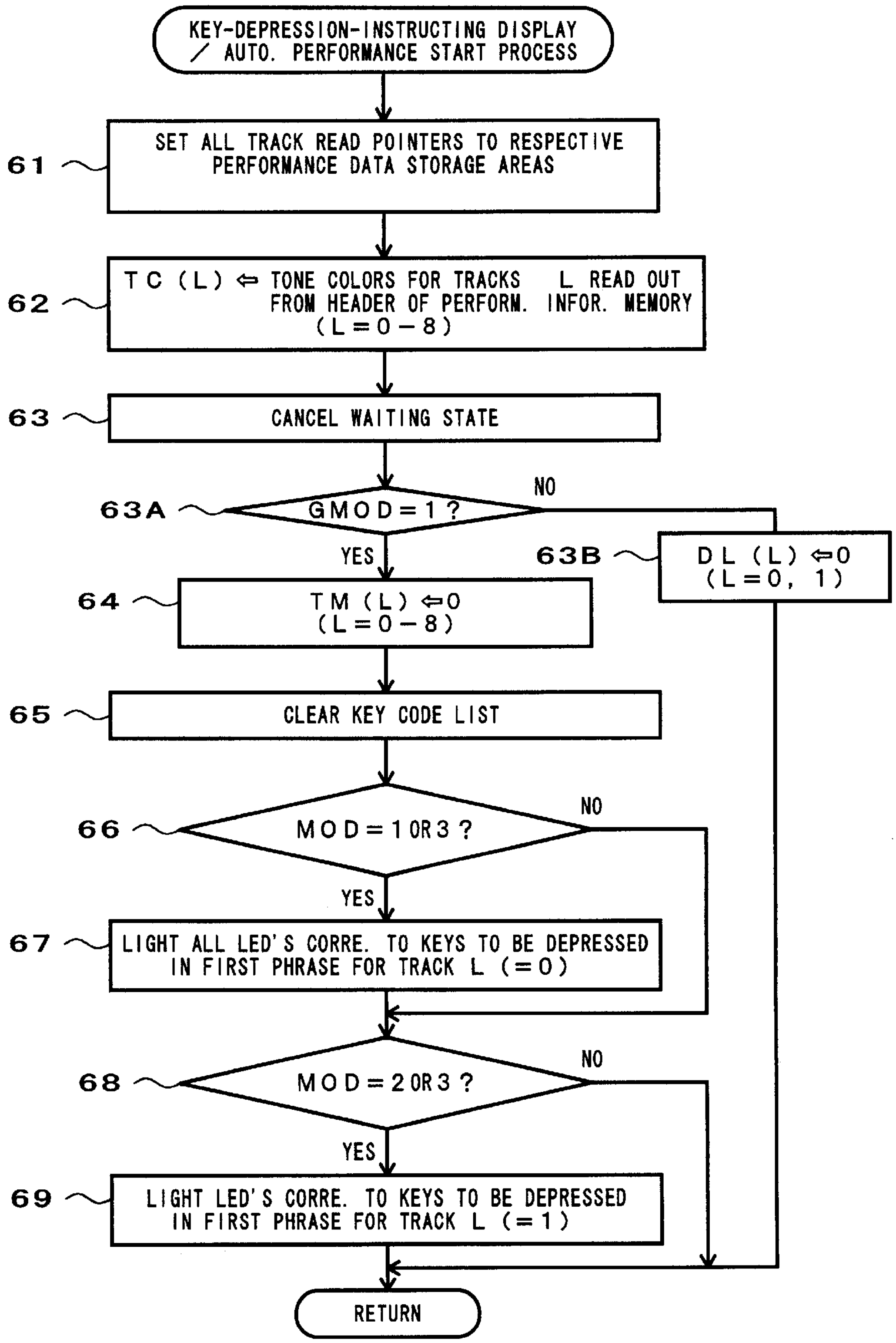
FIG. 26 is a flowchart illustrating a detailed example of a key-depression instructing display/automatic performance start process of FIG. 23.

In FIG. 26, there is shown the detail of a key-depression instructing display/automatic performance start process, which is substantially the same as that of FIG. 6 but different therefrom in that step 63 is inserted between steps 63 and 64 and that step 6B is executed when a NO determination results at step 63A.

Step 63A: It is determined whether the guide mode register GMOD is at a value of "1" or not. With an affirmative determination, the process proceeds to next step 64, but with a negative answer, the process branches to step 63B.

Step 63B: Now that the guide mode register GMOD is at "0" as determined at the preceding step 63A, the duration time registers DL for track numbers "0" and "1" are reset to "0", and the program reverts to step 42.

The phrase dividing process at step 49 in the main routine according to the third embodiment is virtually the same as that shown in FIG. 14. The key-off dividing process of step 7S of FIG. 14 for use in the embodiment may be the same as that shown in FIG. 15, but the phrase subdividing process of step 7R for use in the the embodiment is slightly different from that shown in FIG. 16.

Figure 27:
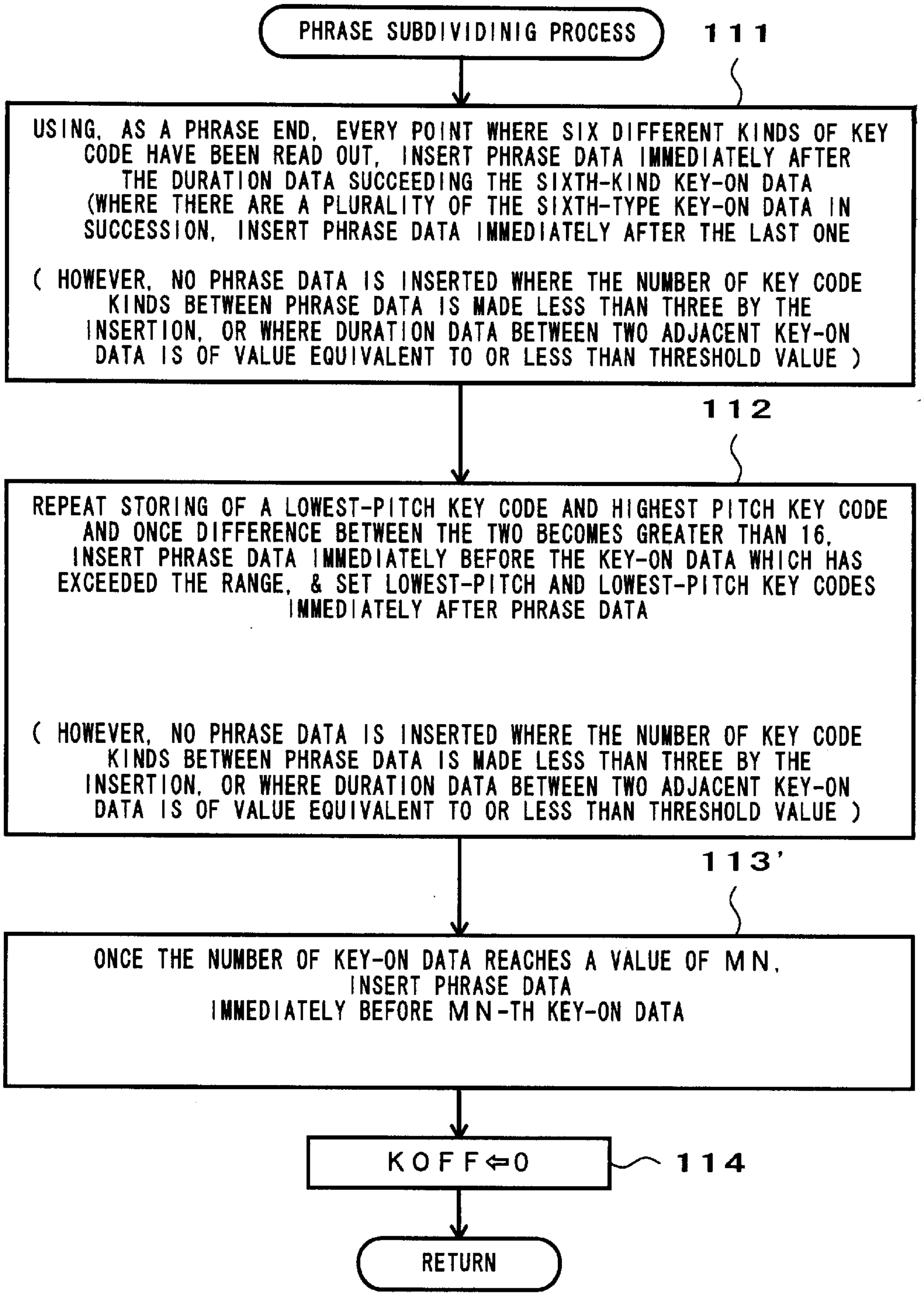
FIG. 27 is a flowchart illustrating a modified example of the phrase subdividing process of FIG. 16 which is applied to the third embodiment; of FIG. 22.

FIG. 27 illustrating an example of the phrase subdividing process (step 7R) which is applied to the third embodiment. In FIG. 27, steps 111, 112 and 114 are directed to the same operations as those of the corresponding reference characters in FIG. 16. Step 113' of FIG. 27 is slightly different from step 113 of FIG. 16. Namely, at step 113 of FIG. 16, a phrase is wound up when the number of key-on data reaches "64", while at step 113' of FIG. 27, a phrase is wound up when the number of key-on data reaches a value stored in the maximum-number-of-note register MN. The register MN takes a value of "64" or "6" depending on which of steps 404 and 405 of FIG. 23 the main routine passes.

Figure 28:
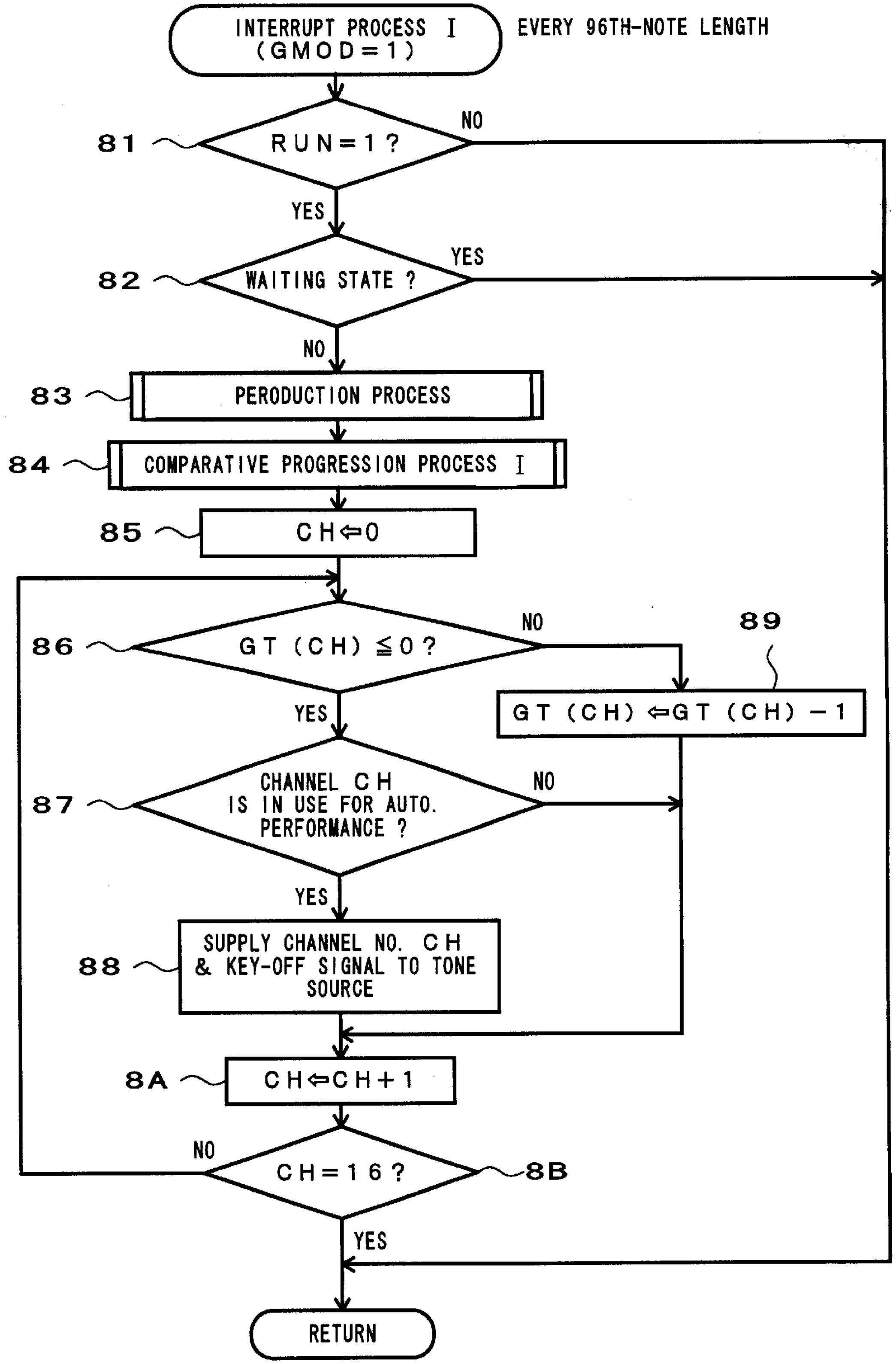
FIG. 28 is a flowchart illustrating interrupt process I which is applied to the third embodiment and performed at an interrupt rate of 96 times per measure (once for every 96th-note) when a guide mode register is at "1"

FIG. 28 illustrates the interrupt process I which is performed at an interrupt rate of 96 times per measure (once for every 96th-note) when the guide mode register is at "1". This interrupt process I is similar to the interrupt process of FIG. 8 and features key-depression instructing display and automatic accompaniment processes. The interrupt process I is different from that of FIG. 8 in that step 84 of the former is the "comparative progression process I" while step 84 of the latter is the "comparative progression process". However, because as previously noted, the comparative progression process I (FIG. 24) is substantially the same as the comparative progression process (FIG. 5), FIGS. 28 and 8 illustrate practically the same process. Accordingly, the reproduction process of FIG. 9 and data process of FIG. 10 are also performed here in relation to the reproduction process of step 83.

Figure 29:
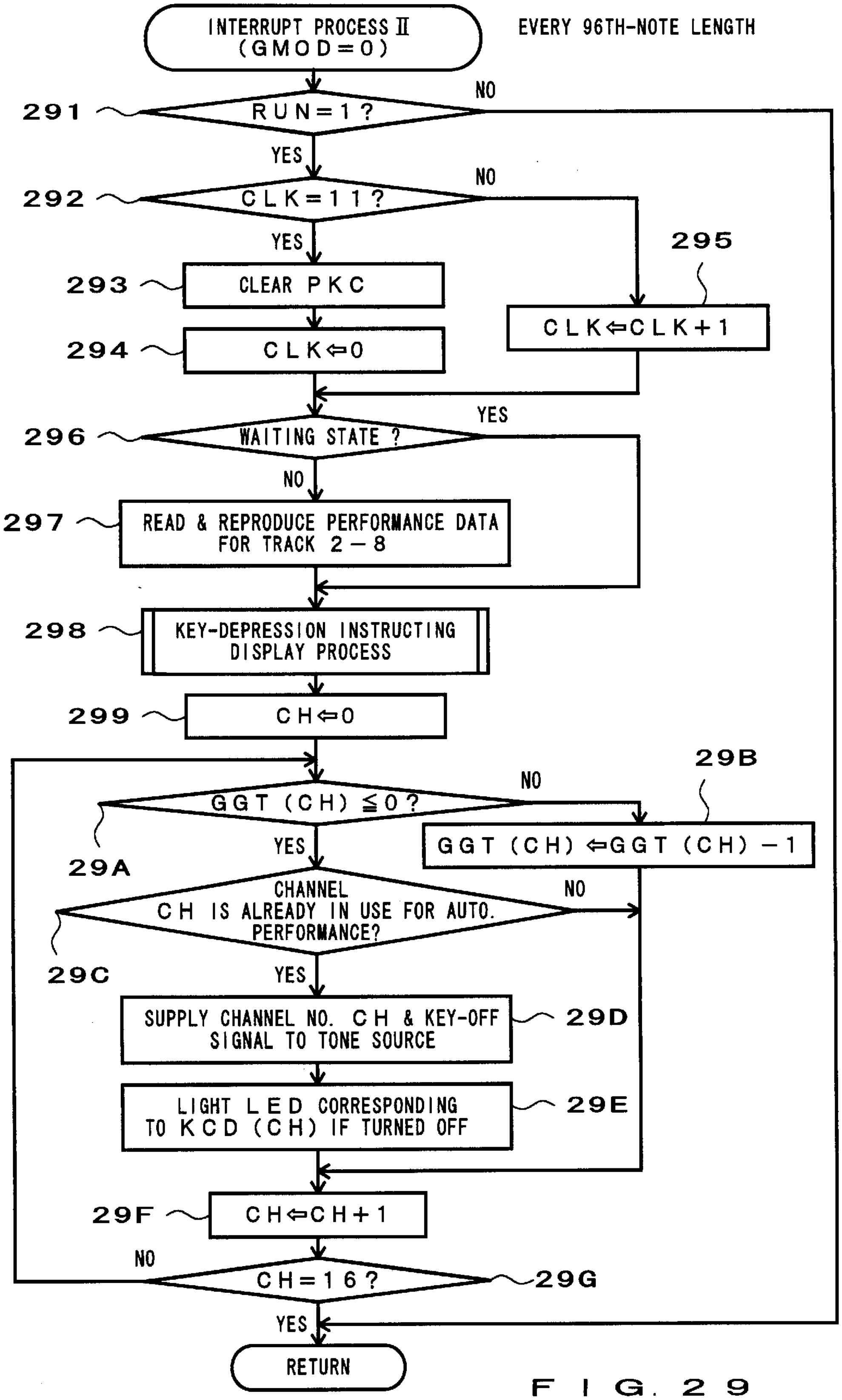
FIG. 29 is a flowchart illustrating interrupt process II which is applied to the third embodiment and performed at an interrupt rate of 96 times per measure (once for every 96th-note) when the guide mode register is at "0"

FIG. 29 illustrates the interrupt process II which is performed at an interrupt rate of 96 times per measure (once for every 96th-note) when the guide mode register is at "0". This interrupt process II principally features a key-depression instructing display process by the LED lighting and tone generation, and an automatic accompaniment process. In this interrupt process, the key-depression instructing display process is repeated when an erroneous key depression occurs. The interrupt process II is carried out in the following step sequence.

Step 291: A determination is made as to whether the running state flag RUN is at "1" or not. With an affirmative determination (YES), the program proceeds to next step 292; otherwise, the process immediately returns to the main routine and waits till next interrupt timing.

Steps 292 to 295 are directed to clearing the performance key code register PKC every predetermined period (corresponding to the time length of an eighth-note).

Step 292: Since this interrupt process is performed once for every 96th-note length, the interrupt time point corresponds to an eighth-not length when the value in the clock register CLK has changed from "0" to "11". So, it is determined at this step whether the current value in the clock register CLK is "11" or not. If it is "11", the program proceeds to step 292, but if not, the program branches to step 295.

Step 293: The affirmative determination at the preceding step 292 that the current value in the clock register CLK is "11" implies that a time corresponding to an eighth-note length has passed since the clock register CLK was reset to "0" at step 5A of FIG. 25, the performance key code register PKC is cleared at this step.

Step 294: The clock register CLK is reset to "0" in order to again count the time corresponding to an eighth-note length.

Step 295: The determination at the preceding step 292 that the current value in the clock register CLK is not "11" implies that the time corresponding to an eighth-note length has not yet passed, and so the clock register CLK is incremented by "1" at this step.

Step 296: A determination is made as to whether the musical instrument is in the waiting state, i.e., whether the waiting state flag WAIT is at "1" or not. With an affirmative determination (YES), the program jumps to step 298, but if not, the program proceeds to next step 297. When the musical instrument is in the waiting state, no automatic accompaniment is not performed.

Step 297: The performance data stored on track numbers "2" to "8" are sequentially read out for audible reproduction. This reproduction is carried out by operations similar to those of the above-mentioned steps 109, 10A and 10B of FIG. 10 and hence will not be described in detail. In this case, the gate time is stored into the gate time register GGT(CH).

Step 298: Key designating data stored on track number "0" are sequentially read out, and the key-depression instructing display process is performed as shown in FIG. 30 on the basis of the read-out data.

Figure 30:
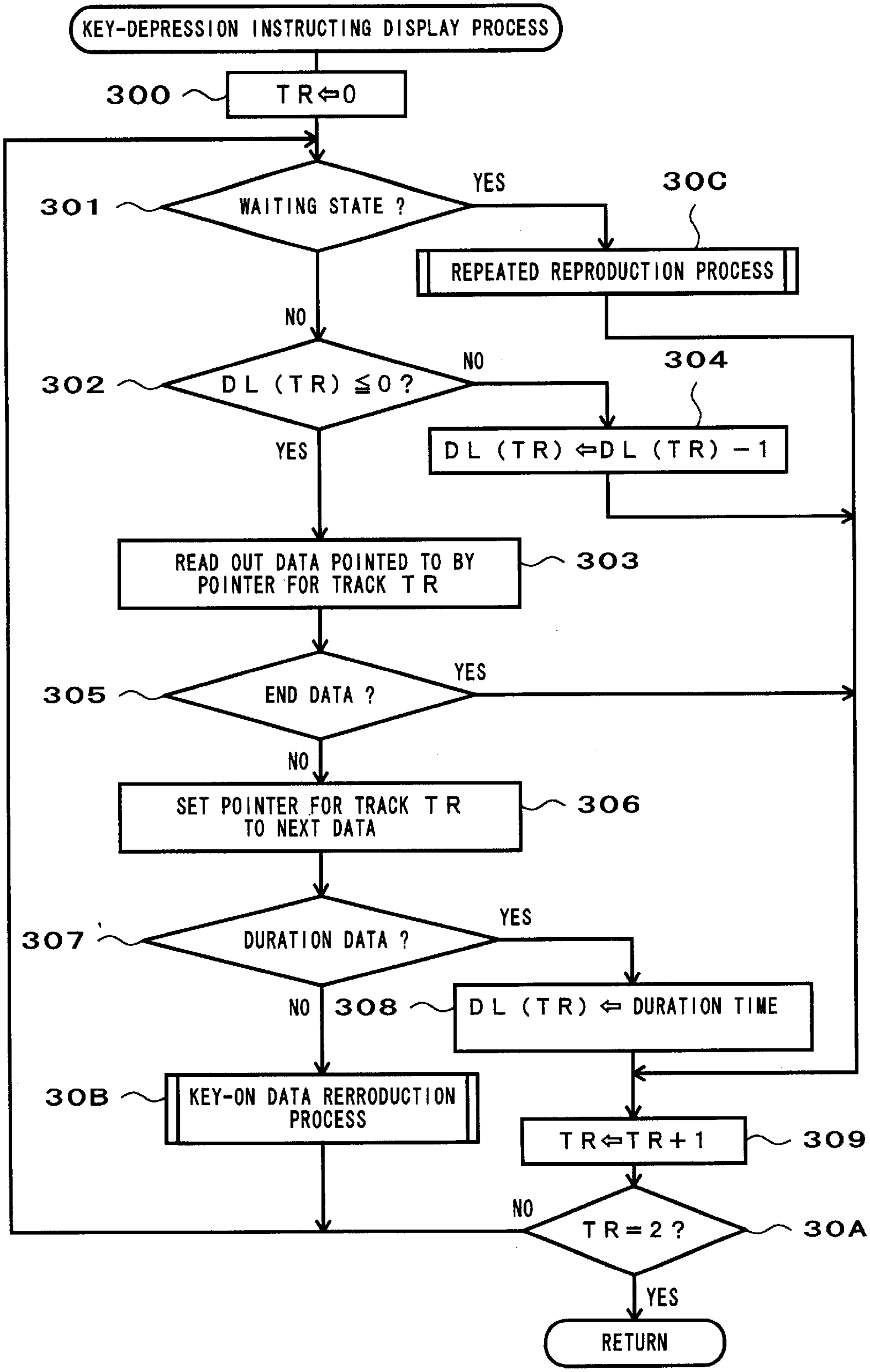
FIG. 30 is a flowchart illustrating a detailed example of a key-depression instructing display process of FIG. 29.

FIG. 30 shows the detail of the indication process of step 298, which is carried out in the following step sequence.

Step 300: "0" is set to the track number register TR. Although the track number register TR has been described, in the above-mentioned embodiments, as storing the values "0" to "8", the track number register TR in this embodiment stores only "0" and "1" relating to the key-depression instructing display.

Step 301: A determination is made as to whether the musical instrument is in the waiting state, i.e., whether the waiting state flag WAIT is at "1". If answered in the affirmative (YES), the program goes to step 30C; otherwise, the program proceeds to step 302.

Step 302: Because the preceding step 301 has determined that the musical instrument is not in the waiting state, it is further determined whether or not the current value in the duration time register DL(TR) is "0" or less. If it is "0" or less (YES), the program goes to step 303; otherwise, the program proceeds to step 304.

Step 303: Because of the affirmative determination at the preceding step 302 that the duration time register DL(TR) is at "0" or less, the key instructing data is read out which is pointed to by the read pointer for the track number specified by the track number register TR.

Step 304: Because of the determination at preceding at the preceding step 302 that the duration time register DL(TR) is greater than "0", the register DL(TR) is incremented by "1", and then the program goes to step 309.

Step 305: It is determined whether the data read out at step 303 is end data or not. If answered in the affirmative (YES), the program goes to step 309, but if the read-out data is other than end data (NO), the program proceeds to step 306.

Step 306: The read pointer for the track number specified by the track number register TR is set to point to the read address of next data. For example, where the data read out at step 303 is key-on data, the read pointer is advanced by four; where the read-out data is duration data, the read pointer is advanced by two.

Step 307: It is determined whether the data read out at step 303 is duration data or not. If answered in the affirmative (YES), the program goes to step 308, but if the read-out data is other than duration data (NO), the program proceeds to step 30B.

Step 308: Because the read-out data is duration data as determined at the preceding step 307, the duration time is stored into the duration time register DL(TR), and the program proceeds to step 309.

Step 309: This step is taken, when the duration time register DL(TR) has been decremented by "1" at step 304, when step 305 has determined that the read-out data for the current track number TR is end data, when a repeated reproduction process of step 30C has been completed, or when the duration time has been stored into the duration time register DL(TR). At this step, the value in the track number register TR is incremented by "1" so as to execute the above-mentioned key-depression designating process for track number "1".

Step 30A: it is determined here whether the value in the track number register TR incremented at step 309 has become "2", i.e., whether the key-depression designating process has been completed for track numbers "0" and "1". If answered in the affirmative (YES), the program reverts to step 299 of FIG. 29; otherwise, the program loops back to step 301 in order to repeat the above-mentioned key-depression designating process for track number "1".

Step 30B: A key-on data reproduction process of FIG. 31 is performed on the key-on data read out at the preceding step 303.

Figure 31:
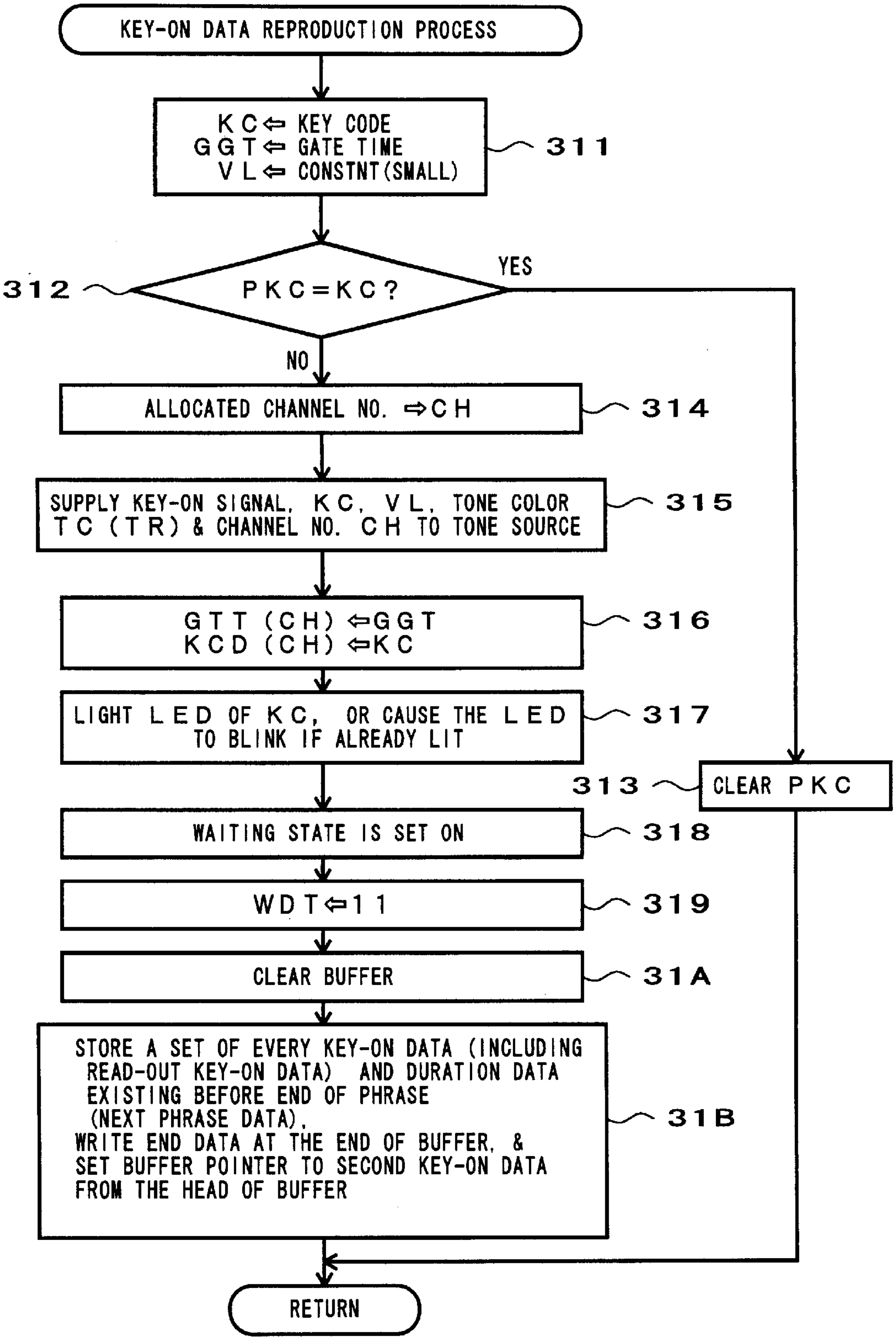
FIG. 31 is a flowchart illustrating a detailed example of a key-on data reproduction process of FIG. 30.

FIG. 31 illustrates the detail of the key-on data reproduction process of step 30B, which is carried out in the following step sequence.

Step 311: The key code, gate time and constant (small) of the key-on data read out at step 303 are stored into the designated key code register KC, designated gate time register GGT and velocity register VL, respectively. The constant (small) stored in the velocity register VL is a value that determines a predetermined small volume, audible by the player, at which a tone of pitch corresponding to a key indicated by the LED is generated concurrently with the LED indication.

Step 312: A determination is made as to whether the key codes stored in the performance key code register PKC and indicated key code register KC coincide with each other, i.e., whether the player has depressed a key rightly in accordance with the key-depression instructing display by LED lighting. If the key codes coincide with each other (YES), the program goes to step 313, but if not (erroneous key depression), the program moves to step 314. The term "erroneous key depression" as used herein refers to both of the case where the player has depressed a key different from the LED-indicated key and the case where the player has not depressed any key despite the LED-indication.

Step 313: Because of the determination at the preceding step 312 that the player has rightly depressed the LED-indicated key, the performance key code register PKC is cleared, and the program returns to step 301.

Step 314: Because of the determination at the preceding step 312 that the key codes stored in the performance key code register PKC and indicated key code register KC do not coincide with each other, an available channel is allocated from among tone source channels for tone generation based on the key-depression instructing data, and the allocated channel number is stored into the channel register CH. Step 315: On the basis of the key-on data read out from among the stored performance data, the key-on signal, key code stored in the designated key code register KC, velocity stored in the designated velocity register VL, tone color stored in the tone color register TC(0) and channel number stored in the channel number register CH are supplied to the tone source circuit 9.

Step 316: The gate time in the designated gate time register GGT is stored into the gate time register GTT(CH), and the key code in the designated key code register KC is stored into the key code register KCD(CH).

Step 317: The LED corresponding to the key code stored in the designated key code register KC is lit. However, where the corresponding LED is already in the lit state, it is caused to blink. Namely, in this embodiment, for a period between the time when the erroneous key depression has occurred and the time when the indicated key is rightly depressed, the LED corresponding to every key-on data existing within the phrase after the erroneous key depression is lit in a sequential manner. Because the LED corresponding to the erroneously depressed key is maintained in the lit state even after the lighting indication has been terminated for every such key-on data, it is caused to keep blinking on and after the second repeated key-depression instructing display.

Step 318: "1" is set into the waiting state register WAIT to place the musical instrument in the waiting state. After this, the key-depression instructing display will be executed on the basis of the key-depression instructing data transferred into the buffer at later-described step 31B, until the waiting state is cancelled at step 5G of FIG. 25, i.e., until a right key is depressed.

Step 319: "11" is set into a wait duration register WDT, so that the repeated reproduction process of step 30C (FIGS. 30 and 32) is actually executed after passage of a time approximately corresponding to a 16th-note length.

Step 31A: The stored contents of the buffer are cleared.

Step 31B: Into the buffer is transferred and stored a set of every key-on data and duration data existing before the end of the phrase (phrase data) (including the read-out key-on data which corresponds to the key code stored in the designated key code register KC). Then, end data is written at the end of the stored data, and the buffer pointer is set to point to the address of the second key-on data from the head of the buffer. After that, the program returns to step 301 of FIG. 30.

Referring back to FIG. 30, the program goes to step 30C once step 301 determines that the waiting state is currently ON.

Step 30C: Because of the determination at the preceding step 301 that the waiting state is currently ON, the repeated reproduction process as shown in FIG. 32 is performed in correspondence with the data in the buffer.

Figure 32:
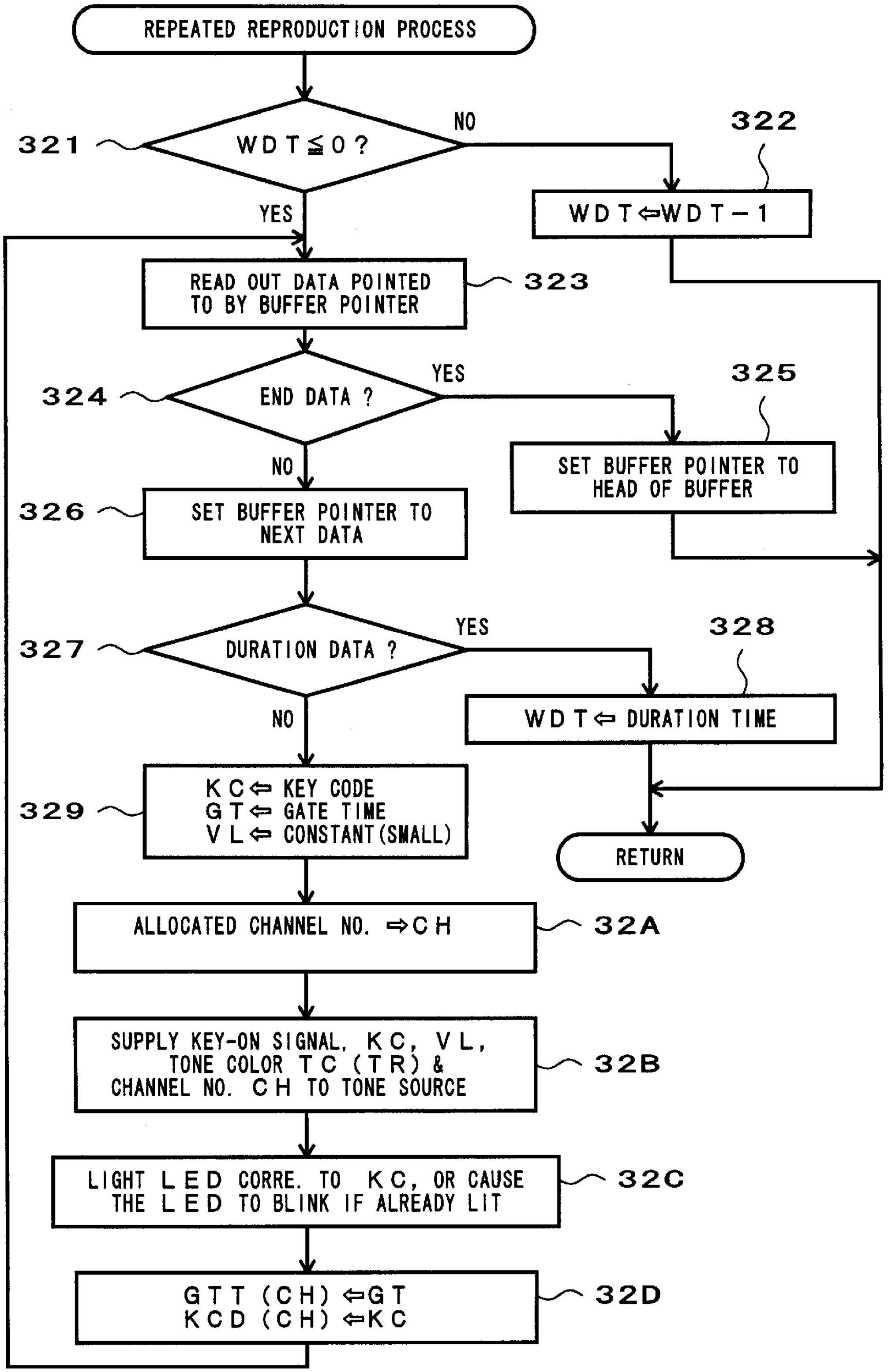
FIG. 32 is a flowchart illustrating a detailed example of a repeated reproduction process of FIG. 30.

FIG. 32 shows the detail of the repeated reproduction process, which is carried out in the following step sequence.

Step 321: It is determined whether the stored value in the wait duration register WDT is "0" or less. If it is "0" or less (YES), the program proceeds to step 323, but if not, the program branches to step 322.

Step 322: Now that the preceding step 321 has determined that the stored value in the wait duration register WDT is greater than "0", the value in the register WDT is incremented by "1", and the program proceeds to step 309.

Step 323: Now that the preceding step 321 has determined that the stored value in the wait duration register WDT is "0" or less, data is read out from the address pointed by the buffer pointer.

Step 324: It is determined whether the data read out at step 323 is end data or not. If answered in the affirmative (YES), the program goes to step 325, but if the read-out data is other than end data (NO), the program proceeds to step 326.

Step 325: Because the data read out at step 323 is end data as determined at step 324, the buffer pointer is set to point to the head address of the buffer in preparation for next data readout, and then the program goes to step 309.

Step 326: The buffer pointer is set to point to the read address of next data. For example, where the data read out at step 323 is key-on data, the pointer is advanced by four; where the read-out data is duration data, the pointer is advanced by two.

Step 327: It is determined whether the data read out at step 323 is duration data or not. If answered in the affirmative (YES), the program goes to step 328, but if the read-out data is key-on data, the program proceeds to step 329.

Step 328: Because the read-out data is duration data as determined at the preceding step 327, the duration time is stored into the wait duration time register WDT, and the program proceeds to step 309 of FIG. 30.

Step 329: The key code, gate time and constant (small) of the read-out key-on data are stored into the designated key code register KC, designated gate time register GGT and velocity register VL, respectively. The constant (small) stored in the velocity register VL, as previously mentioned, is a value that determines a predetermined small volume, audible by the player, at which a tone of pitch corresponding to a key indicated by the LED is generated concurrently with the LED indication.

Step 32A: An available channel is allocated from among the tone source channels for tone generation based on the key-depression instructing data, and the allocated channel number is stored into the channel register CH.

Step 32B: A key-on signal, key code stored in the designated key code register KC, velocity stored in the designated velocity register VL, tone color stored in the tone color register TC(TR) and channel number stored in the channel register CH are supplied to the tone source circuit 9, and the key-depression instructing display by tone generation is made on the basis of the key-on data read out from the buffer.

Step 32C: The LED corresponding to the key code stored in the designated key code register KC is placed in the lit state. However, where the corresponding LED is already in the lit state, it is caused to blink. In this way, the key-depression instructing display by LED lighting is made on the basis of the key-on data read out from the buffer. Step 32D: The gate time in the designated gate time register GGT is stored into the gate time register GTT(CH), and the key code in the designated key code register KC is stored into the key code register KCD(CH). After this, the program loops back to step 323.

Referring back to FIG. 29, the program continues to step 299 after step 298.

Step 299: The channel register CH is set to a value of "0".

Step 29A: It is determined whether the current value stored in the gate time register GGT(CH) corresponding to the channel number set in the channel register CH is "0" or less. If it is "0" or less (YES), the program proceeds to step 29C, but if it is greater than "0" (No), the program branches to step 29B.

Step 29B: Now that the gate time value stored in the gate time register GGT(CH) is greater than "0" as determined at the preceding step 29A, the stored value in the gate time register CT(CH) is decremented by "1", and the program jumps to step 29F.

Step 29C: A determination is made as to whether the channel specified by the stored value in the channel register CH is already in use in an automatic performance. With an affirmative answer, the program moves onto next step 29D, but with a negative answer, the program jumps to step 29F.

Step 29D: This step supplies the tone source circuit 9 with a key-off signal along with the channel number stored in the channel register CH, in order to terminate tone generation in that channel.

Step 29E: If the LED corresponding to the key code stored in the key code register KCD(CH) is blinking, the LED is lit.

Step 29F: The value in the channel register CH is incremented by "1" so as to execute the above-mentioned operations for the next channel.

Step 29G: A determination is made as to whether the current stored value in the channel register CH is "16". If answered in the affirmative, the program returns to the main routine to wait until next interrupt timing, but if answered in the negative, the program loops back to step 29A to repeat the above-mentioned operations for the remaining channel or channels.

When the guide mode register GMOD is at a value of "1" in the third embodiment, operations similar to those described above in connection with FIGS. 1A to 1E take place.

The following description is about an example of the operation taking place when the guide mode register GMOD is at "0".

FIGS. 33A to 33F shows an example of the repeated key-depression instructing mode where the key-depression instructing display by both the LED lighting and the tone generation is repeatedly made until a right key depression is performed. The score shown in FIG. 33A is different from that of FIG. 1A, and FIG. 34 shows an example of performance data corresponding to the score of FIG. 33A.

Figure 35A:
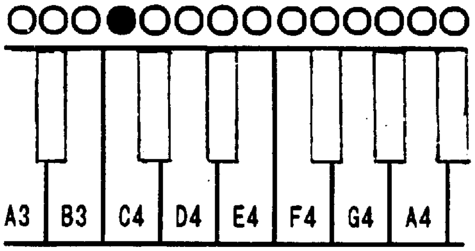
Figure 35B:
Figure 35C:
Figure 35D:

FIG. 33B shows an operation of the musical instrument performed when the player has executed a right performance operation without any erroneous key depression, and FIGS. 33C to 33F show in time series the operational flow of the electronic musical instrument taking place when the player has made an erroneous key depression. FIGS. 35A to 35U schematically show in time series a manner in which the LEDs are lit in correspondence with the flow of FIGS. 33C to 33F for the key-depression instructing display. The lighting states of the LEDs vary sequentially from that of FIG. 35A to that of FIG. 35U. In these figure, LEDs being lit are shown in blackcolor circles, LEDs not being lit (being turned off) shown in while-color circles, and blinking LEDs shown in shaded circles.

According to the score of FIG. 33A, keys are depressed in order of "F4", "G4", "A4", "C5", "D5" and "E5". The following description is only about the track of track number "0", and description about the track of track number "1" is omitted.

Figure 34:
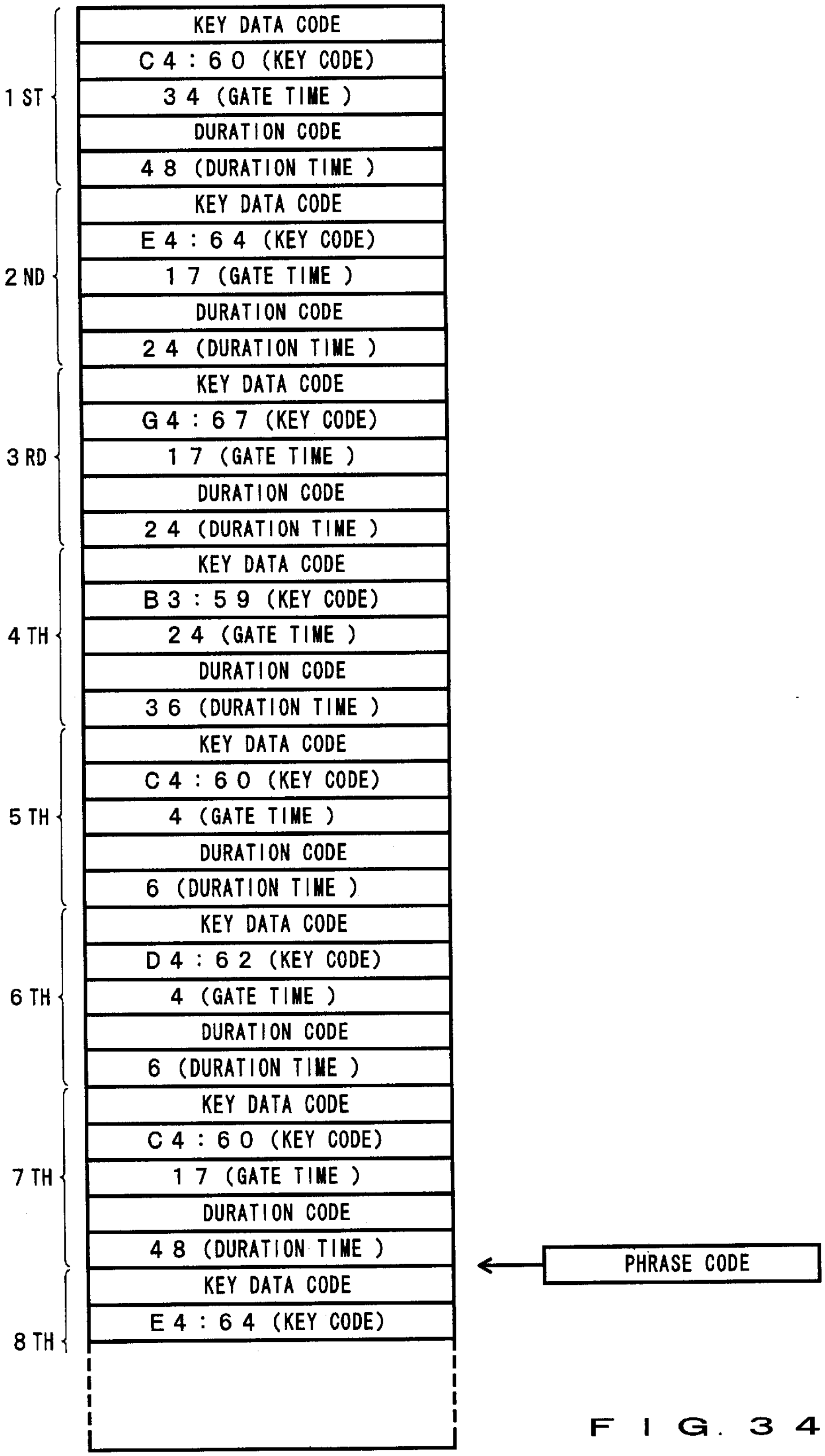
FIG. 34 is a diagram showing an example of performance data corresponding to a score of FIG. 33A, and FIGS. 35A to 35U schematically show how, in the third embodiment, the electronic musical instrument lights LEDs for a key-depression instructing display when the operator has depressed a wrong key.

First, once the load switch is activated, performance data as shown in FIG. 34 is read out from the disk 14 (FIGS. 2 and 13) and loaded into the performance information memory 4 (FIGS. 2 and 3) at step 48 of FIG. 22. Then, by the phrase dividing process of step 49 of FIG. 14, a phrase code is inserted after the key-on data "C4 (=60)" immediately preceding a quarter rest, i.e., between the seventh key-on data "C4 (=60)" and the eighth key-on data "E4 (=64)" as shown in FIG. 34. Assume here that the mode number register MOD is currently set to any one of values "1", "2" and "3" by the operation of step 4B of FIG. 22.

Then, once the start/stop switch for automatic performance/key-depression instructing display is activated, the key-depression instructing display/automatic performance start process is triggered at step 4G of FIG. 24 (FIG. 26). By this automatic performance start process, the waiting state is cancelled, and the duration time register DL(L) is reset to "0". After this, the key-depression instructing display by both LED lighting and tone generation, and automatic performance based on the performance data of track numbers 2 to 8 will be carried out sequentially as shown in FIG. 33B.

At first interrupt timing, the operation of step 297 is executed by way of steps 291, 292, 295 and 296 of FIG. 29. At step 297, the performance data of track numbers 2 to 8 are read out to carry out the automatic performance. Then, the key-depression instructing display process is executed at step 298 (FIG. 30).

In the key-depression instructing displayed process of FIG. 30, the operation of step 303 is executed by way of steps 301 and 302. This step 303 reads out the first key-on data pointed to by the read pointer for track number "0". Thus, the key-on data reproduction process of step 30B (FIG. 31) is executed by way of steps 305 to 307.

In the key-on data reproduction process of FIG. 31, the first key code "C4 (=60)", gate time "34" and predetermined constant (small) are stored into the designated key code register KC, designated gate time register GGT and velocity register VL, respectively.

Since no key has been depressed yet at this time point, a NO determination results at step 312, so that the operations of steps 314 to 31B are performed in series. In these operations is performed the key-depression instructing display process by only LED lighting or by both LED lighting and tone generation. The waiting state is set ON at step 318, and "11" is set into the wait duration register WDT at step 319. At steps 31A and 31B, the first to seventh key-on data of FIG. 34 existing before the phrase data are stored into the buffer, end data is written at the end of the buffer, and the buffer pointer is set to point to the second key-on data "E4 (=64)". Then, when the program reverts to step 301, an YES determination is obtained, so that the repeated reproduction process of step 30C is performed as shown in FIG. 32.

A NO determination results at step 321 of the repeated reproduction process of FIG. 32, so that the operations at and after step 299 will be performed by way of step 322. This is because "11" has been stored in the wait duration register WDT at step 319 of FIG. 31. Therefore, the musical instrument waits until the player depresses a key within a period before the stored value in the duration register WDT becomes "0", i.e., for a time period corresponding to 12 arrivals of the interrupt timing (eighth-no length).

Once a right key is depressed during the waiting period corresponding to the stored value in the wait duration register WDT, the comparative progression process II of FIG. 25 is performed, so that the key code of the depressed key is stored into the performance key code register PKC and the clock register CLK is reset to "0". Then, the operations of steps 5E to 5G are executed by way of steps 5B to 5D. However, the LED having been lit so far is turned at step 5E, the performance key code register PKC is cleared at step 5F, and the waiting state is cancelled at step 5G.

When a waiting period has passed which corresponds to the stored value in the wait duration register WDT, it is determined that an "erroneous key depression" has occurred, so that operations for an erroneous key depression are performed as will be described below. Namely, in this case, an YES determination is made at step 321 of FIG. 32 and hence the operations at and after step 323 are executed, so that the key-depression instructing display by both LED lighting and tone generation is effected on the basis of the performance data within the buffer. However, during this key-depression instructing display, no automatic accompaniment is performed at step 297 of FIG. 29.

Now, a description will be made about a case where, although the player has depressed the right keys for the first and second key-on data of FIG. 34, a wrong key has been depressed for the third key-on data "G4 (=67)" as shown in FIG. 33A.

Assume here that a right key is depressed during a predetermined period (waiting period corresponding to the stored value in the wait duration register WDT) after the key-depression instructing display. Namely, the LED corresponding to the first key-on data is lit as shown in FIG. 35A, through the above-mentioned key-depression instructing display process on the first key-on data. Then, the LED is turned off in response to the player's depression of the right key corresponding to the lit LED. Similarly, the LED corresponding to the second key-on data is lit as shown in FIG. 35B, through the above-mentioned key-depression instructing display process on the second key-on data. This LED is turned off in response to the player's depression of the right key corresponding to the lit LED. Then, the above-mentioned key-depression in structing display process is performed on the third key-on data. However, in the event that a wrong key, i.e., a key different from that designated by the third key-on data has been depressed before execution of the key-depression instructing display for the key-on data, a wrong key has been depressed before execution of the key indication, or no key has been depressed despite the key depression, the key-depression instructing display by both LED lighting and tone generation as shown in FIGS. 33C to 33E is effected on the basis of the performance data within the buffer.

More specifically, where a wrong key has been depressed before the key-depression instructing display, a NO determination results at step 5C of FIG. 25, and then the operations at steps 314 to 31B of the key-on data reproduction process of FIG. 31 are performed. Where a wrong key has been depressed after the key-depression instructing display, the above-mentioned operations at steps 314 to 31B of the key-on data reproduction process of FIG. 31 are performed, and then a NO determination is made at step 5D of FIG. 25.

In this way, in both the cases where an erroneous key depression has occurred before and after the key indication, there are performed the operations at steps 314 to 31B of FIG. 31 and the operation of step 5D corresponding to the erroneous key depression.

Next, a detailed description will be given about the case where the erroneous key depression has occurred after the key-depression instructing display.

As previously mentioned, at the first interrupt timing after the right key depression for the first and second key-on data, the operation of step 297 is executed, by way of steps 291, 292, 295 and 296 of FIG. 29, to read out the performance data of track numbers 2 to 8 to carry out the automatic performance. Then, the key-depression instructing display process is executed at step 298 (FIG. 30).

In the key-depression instructing displayed process of FIG. 30, the operation of step 303 is executed, by way of steps 301 and 302, to read out the third key-on data pointed to by the read pointer for track number "0". Then, a NO determination is made at step 305, the read pointer for track "0" is set to point to the address of the third duration code, and the key-on data reproduction process of step 30B (FIG. 31) is executed by way of step 307.

In the key-on data reproduction process of FIG. 31, the third key code "G4 (=67)", gate time "24" and predetermined constant (small) are stored into the designated key code register KC, designated gate time register GGT and velocity register VL, respectively.

Since no key has been depressed yet at this time point, a NO determination results at step 312, so that the operations of steps 314 to 31B are performed in series. In these operations is performed the key-depression instructing display process by both LED lighting and tone generation as shown in FIG. 35C, the waiting state is set ON, and "11" is set into the wait duration register WDT. Also, data from the third key-in data to the seventh key-on data immediately before the phrase code of FIG. 34 are stored into the buffer. Then, when the program reverts to step 301 of FIG. 30, an YES determination is obtained, so that the repeated reproduction process of step 30C is performed as shown in FIG. 32.

A NO determination results at step 321 in the repeated reproduction process of FIG. 32, so that the operations at and after step 299 will be performed by way of step 322. Then, the player depresses a wrong key (different from the indicated key) within a period before the stored value in the duration register WDT becomes "0", i.e., before lapse of a time corresponding to 12 arrivals of the interrupt timing (eighth-not length).

In response to this, the key code of the erroneously depressed key is stored into the performance key code register PKC and the clock register CLK is reset to "0" in the comparative progression process II of FIG. 25. Then, a NO determination is made at step 5D by way of steps 5B and 5C.

At the next interrupt timing, an YES determination is made at step 296 by way of steps 291, 292 and 295 of FIG. 29, so that the key-depression instructing displayed process of FIG. 30 is executed at step 298. Accordingly, no accompaniment is performed until the right key is depressed.

In the key-depression instructing display process of FIG. 30, the repeated reproduction process of FIG. 32 is executed by way of step 301. At step 321 of the repeated reproduction process of FIG. 32, a NO determination results, so that the operations at and after step 299 of FIG. 29 are performed by way of step 322. Then, once the stored value in the wait duration register WDT becomes "0", an YES determination is made at step 321, so that the operations at steps 323 to 32D are performed. In this way, the key-depression instructing display by both LED lighting and tone generation as shown in FIG. 33C is effected on four key-on data from the fourth key-on data "B3 (=59)" to the seventh key-on data "C4 (=60)" immediately before the phrase data.

Figure 35E:
Figure 35F:
Figure 35G:
Figure 35H:

The key-depression instructing display of FIG. 33C is carried out in the order as shown in FIGS. 35D to 35G. Namely, the LED corresponding to the fourth key-on data "B3 (=59)" is newly lit while the LED corresponding to the third key-on data "G4 (=64)" is maintained in the lit state. In FIG. 35E, the LED corresponding to the fifth key-on data "C4 (=60)" is newly lit while the LEDs corresponding to the third and fourth key-on data are maintained in the lit state. Further, in FIG. 35F, the LED corresponding to the sixth key-on data "D4 (=62)" is newly lit while the LEDs corresponding to the third, fourth and fifth key-on data are maintained in the lit state. Further, in FIG. 35G, the LED corresponding to the seventh key-on data "C4 (=60)" is caused to blink at step 32C of FIG. 32 while the LEDs corresponding to the third, fourth and sixth key-on data are maintained in the lit state, because the LED corresponding to the seventh key-on data "C4 (=60)" has already been lit at the time of FIG. 35E.

In case the right key depression is made after this, the key-depression instructing display as shown in FIG. 33D is effected on five key-on data from the third key-on data "G4 (=67)" of the erroneously depressed key to the seventh key-on data "C4 (=60)" immediately before the phrase data.

Figure 35I:
Figure 35J:
Figure 35K:
Figure 35L:
Figure 35M:
Figure 35N:
Figure 35O:
Figure 35P:

The key-depression instructing display of FIG. 33D is carried out in the order as shown in FIGS. 35H to 35L. Namely, in FIG. 35H, the LED corresponding to the third key-on data "G4 (=67)" of the erroneously depressed key is caused to blink while the LEDs corresponding to the fourth to seventh key-on data are maintained in the lit state. In FIG. 35I, the LED corresponding to the fourth key-on data is caused to blink while the LEDs corresponding to the third and fourth to seventh key-on data are maintained in the lit state. In FIG. 35J, the LED corresponding to the fifth (seventh) key-on data is caused to blink while the LEDs corresponding to the third and fourth and sixth key-on data are maintained in the lit state. In FIG. 35K, the LED corresponding to the sixth key-on data is caused to blink while the LEDs corresponding to the third to fifth and seventh key-on data are maintained in the lit state. Further, in FIG. 35L, the LED corresponding to the fifth (seventh) key-on data is caused to blink while the LEDs corresponding to the third and fourth and sixth key-on data are maintained in the lit state.

Then, until the key depression takes place, the key-depression instructing display as shown in FIG. 33E is effected on three key-on data from the third key-on data "G4 (=67)" to the fifth key-on data "C4 (=60)" occurring at the time of the right key depression. The key-depression instructing display of FIG. 33E is carried out in the order of FIG. 35M to FIG. 350.

Once a right key is depressed at a time point as shown in FIG. 33E, the comparative progression process II of FIG. 25 is performed in response thereto, and thus the key-depression instructing display and accompaniment will become similar to those before the erroneous key depression. More specifically, in the comparative progression process II of FIG. 25, the key code "G4 (=67)" of the rightly depressed key is stored into the performance key code register PKC and the clock register CLK is reset to "0". Then, the operations of steps 5E to 5G are executed by way of steps 5B to 5D. Now that there is no key-on data of a same key code in the buffer, the LED is turned at step 5E, the performance key code register PKC is cleared at step 5F, and the waiting state is cancelled at step 5G. After this, the program returns to the main routine.

At the next interrupt timing, the running state flag RUN is at "1", the clock register CLK is at "0", and the waiting state has been cancelled, so that the operation of step 297 is executed, by way of steps 291, 292, 295 and 296 of FIG. 29, to read out the performance data of track numbers 2 to 8 to carry out an automatic performance. Then, the key-depression instructing display process of FIG. 30 is executed at step 298. In the key-depression instructing displayed process of FIG. 30, the operation of step 303 is executed, by way of steps 301 and 302, to read out the fourth key-on data pointed to by the read pointer for track number "0". Then, a NO determination is made at step 305, the read pointer for track "0" is set to point to the address of the fourth duration code, and the key-on data reproduction process of step 30B (FIG. 31) is executed by way of step 307.

In the key-on data reproduction process of FIG. 31, the fourth key code "B3 (=59)", gate time "24" and predetermined constant (small) are stored into the designated key code register KC, designated gate time register GGT and velocity register VL, respectively.

Figure 35Q:
Figure 35R:

Since no key has been depressed yet at this time point, a NO determination results at step 312, so that the operations of steps 314 to 31B are performed in series. At step 317, the LED is caused to blink which corresponds to the fourth key code "B3 (=59)". This is because the LED corresponding to the seventh key-on data is already in the lit state. By the above-mentioned operations, the LED lighting conditions become as shown in FIG. 35Q.

Figure 35S:
Figure 35T:
Figure 35U:

After that, a key-depression instructing display similar to that prior to the erroneous key depression will be effected while the LED being lit is caused to blink and turned off. Namely, in FIG. 35R, the LED corresponding to the fifth key-on data is caused to blink while the LED corresponding to the fourth key-on data is turned off and the LED corresponding to the sixth key-on data is maintained in the lit state. In FIG. 35S, the LED corresponding to the sixth key-on data is caused to blink while the LED corresponding to the seventh key-on data is maintained in the lit state. Further, in FIG. 35T, the LED corresponding to the sixth key-on data is turned off and the LED corresponding to the seventh key-on data is caused to blink. In FIG. 35U, the LED corresponding to the seventh key-on data is turned off.

In case an erroneous key depression takes place again during the series of the operations, the above-mentioned operations are repeated.

The above embodiment of the repeated key-depression instructing display (namely, third embodiment) has been described in relation to a case where, even where the player doest not depress keys in accordance with the order of key-on data of a sequencer, the depressed keys are determined as depressed simultaneously as long as the key-on events continue at intervals less than a predetermined duration time, and where the key codes of the depressed keys. Alternatively, the depressed keys may be determined as being not coincident if the keys are not depressed in accordance with the order of key-on data of the sequencer.

Further, the third embodiment has been described in relation to a case where tone generation is effected both as the key-depression instructing display and by the player's key depression. In an alternative arrangement, when there is a key depression by the player, the tone generation by the player's key depression may be effected with priority and the tone generation as the key-depression instructing display may be suspended. In such a case, upon passage of a predetermined time after the player stopped depressing keys, the key-depression instructing display by tone generation may be again effected for undepressed key-on data.

Furthermore, whereas the third embodiment has been described above as not executing a repeated performance for accompaniment parts for which no key-depression instructing display is made, the repeated performance may alternatively be executed for the accompaniment parts.

Moreover, although the third embodiment has been described as repeating the key-depression instructing display for key-on data on and after an erroneous key depression, it is also possible to repeat the phrase containing the erroneously depressed key-on data, i.e., the entire phrase (from the beginning to end of the phrase) obtained by the phrase division. The phrase may be repeated from key-on data, located a few key-on data before the erroneously depressed key-on data, to the end of the phrase.

In addition, the third embodiment has been described as effecting the key-depression instructing display after having waited for a predetermined time (approximately corresponding to the length of an eighth-note) from the occurrence of an erroneously depressed key. The predetermined time may be more or less than the length of an eighth-note or may be another optional time in seconds.

What is claimed is:

1. An electronic musical instrument comprising:

a plurality of performance operators corresponding to a plurality of tone pitches;

display means including a plurality of key-displaying elements provided in corresponding relation to said performance operators;

performance information supply means for supplying a series of performance information constituting optional music piece, said performance information containing at least tone pitch information;

dividing means for dividing the performance information for a music piece supplied from said performance information supply means into a plurality of time sections, in accordance with contents of the performance information, and for modifying said performance information by inserting dividing information at points corresponding to divisions between said time sections; and control means for, in accordance with performance progression of the music piece and for each of the time sections, activating, into a displaying state, said key-displaying element corresponding to every tone pitch information contained in the performance information present within the time section.

2. An electronic musical instrument as defined in claim 1 wherein said dividing means determines, from the series of performance information, a plurality of phrases dividing the music piece and divides the performance information into the time sections in correspondence with the determined phrases.

3. An electronic musical instrument as defined in claim 1 wherein said dividing means detects, from the series of performance information, a change point where performance fingering changes, determines phrases dividing the music piece on the basis of detection of the change point, and divides the performance information into the time sections in correspondence with the determined phrases.

4. An electronic musical instrument as defined in claim 1 wherein said dividing means includes determination means for, in accordance with the contents of the series of the performance information for a music piece supplied from said performance information supply means, determining boundaries between the time sections, and means for supplying dividing information corresponding to the boundaries between the time sections determined by said determination means, and wherein the series of performance information is divided into the time sections by dividing the series of performance information sequentially supplied from said performance information supply means in accordance with the dividing information.

5. An electronic musical instrument as claimed in claim 1, wherein the control means simultaneously activates, into the displaying state, the key-displaying element corresponding to every tone pitch information contained in the performance information present within the time section.

6. An electronic musical instrument as claimed in claim 1, wherein the dividing means divides, into the plurality of time sections, the performance information for a single performance part of the music piece supplied from the performance information supply means.

7. An electronic musical instrument as claimed in claim 1, wherein the performance information supply means supplies a series of performance information for each of plural performance parts constituting the optional music piece and also supplies end information at the end of each of said series of performance information.

8. An electronic musical instrument comprising:

a plurality of performance operators corresponding to a plurality of tone pitches;

display means including a plurality of key-displaying elements provided in corresponding relation to said performance operators;

performance information supply means for supplying a series of performance information constituting optional music piece, said performance information containing at least tone pitch information;

dividing means for dividing the performance information for a music piece supplied from said performance information supply means into a plurality of time sections, and for modifying said performance information by inserting dividing information at points corresponding to divisions between said time sections; and control means for, in accordance with performance progression of the music piece and for each of the time sections, activating, into a displaying state, said key-displaying element corresponding to every tone pitch information contained in the performance information present within the time section, said activation by said control means of said key-displaying elements being simultaneously effected throughout the time section in a first predetermined display mode.

9. An electronic musical instrument as defined in claim 8 wherein said control means continues to activate said key-displaying elements in the first displaying mode, even where any of said performance operators corresponding to said key-displaying elements is operated when said displaying element corresponding to every tone pitch information contained in the performance information present within specific one of the time sections is being activated in correspondence with said specific time section.

10. An electronic musical instrument as defined in claim 8 which further comprises display change means for, in accordance with the performance progression within said specific time section, changing a display mode of specific one of said key-displaying elements corresponding to specific said tone pitch information to be next performed from said first display mode to a predetermined second display mode.

11. An electronic musical instrument as defined in claim 10 wherein when any of said performance operators corresponding to specific said key-displaying element activated into the displaying state of said second display mode is operated, said display change means restores said specific key-displaying element from said second display mode to said first display mode.

12. An electronic musical instrument as claimed in claim 8, wherein the dividing means divides, into the plurality of time sections, the performance information for a single performance part of the music piece supplied from the performance information supply means.

13. An electronic musical instrument as claimed in claim 8, wherein the performance information supply means supplies a series of performance information for each of plural performance parts constituting the optional music piece and also supplies end information at the end of each of said series of performance information.

14. An electronic musical instrument comprising:

a plurality of performance operators corresponding to a plurality of tone pitches;

display means including a plurality of key-displaying elements provided in corresponding relation to said performance operators;

performance information supply means for supplying a series of performance information constituting optional music pieces said performance information containing at least tone pitch information;

dividing means for dividing the performance information for a music piece supplied from said performance information supply means into a plurality of time sections, and for modifying said performance information by inserting dividing information at points corresponding to divisions between said time sections; and control means for, in accordance with performance progression of the music piece and for each of the time sections, performing control to activate, into a displaying state of first display mode, said key-displaying element corresponding to every tone pitch information contained in the performance information present within the time section, and also, in accordance with the progression of performance within the time section, changing a display mode of specific one of said key-displaying elements corresponding to specific one of said tone pitch information to be performed from said first display mode to a predetermined second display mode.

15. An electronic musical instrument as defined in claim 14 wherein when one of said performance operators corresponding to said specific key-displaying elements activated in the displaying state of said second display mode is operated, said control means restores said specific key-displaying element from said second display mode to said first display mode.

16. An electronic musical instrument as defined in claim 14 wherein said first display mode is a mode to place said key-displaying elements in a lit displaying state, and said second display mode is a mode to place said key-displaying element in a blinking displaying state.

17. An electronic musical instrument as defined in claim 14 wherein said second display mode is effected by controlling said key-displaying element to blink in such order that said key-displaying element is first in a turned-off state and then placed in a lit state.

18. An electronic musical instrument as claimed in claim 14, wherein the control means simultaneously activates, into the displaying state, the key-displaying element corresponding to every tone pitch information contained in the performance information present within the time section.

19. An electronic musical instrument as claimed in claim 14, wherein the dividing means divides, into the plurality of time sections, the performance information for a single performance part of the music piece supplied from the performance information supply means.

20. An electronic musical instrument as claimed in claim 14, wherein the performance information supply means supplies a series of performance information for each of plural performance parts constituting the optional music piece and also supplies end information at the end of each of said series of performance information.

21. An electronic musical instrument comprising:

a plurality of performance operators corresponding to a plurality of tone pitches;

display means including a plurality of key-displaying elements provided in corresponding relation to said performance operators;

performance information supply means for supplying a series of performance information constituting optional music piece, said performance information containing at least tone pitch information;

dividing means for dividing the performance information for a music piece supplied from said performance information supply means into a plurality of time sections, and for modifying said performance information by inserting dividing information at points corresponding to divisions between said time sections; and control means for, in accordance with performance progression of the music piece and for each of the time sections, performing control to activate, into a displaying state of predetermined display mode, said key-displaying elements corresponding to the tone pitch information contained in the performance information present within a first time section, and to activate, into a displaying state of predetermined display mode, said key-displaying elements corresponding to the tone pitch information of the performance information present within a second time section following said first time section.

22. An electronic musical instrument as defined in claim 21 wherein when a performance in said first time section has progressed to reach performance timing of Nth (wherein N is a natural number) tone pitch information before an end of said first time section, said control means simultaneously activates, into the displaying mode, said key-displaying element corresponding to every tone pitch information of the performance information present within said second time section.

23. An electronic musical instrument as defined in claim 21 wherein when said control means activates, into the displaying state, first said key-displaying element corresponding to the predetermined tone pitch information present within said first time section, said control means performs control to sequentially activate, into the displaying state, predetermined one or more of said key-displaying elements provided between said first key-displaying element and second said key-displaying element corresponding to predetermined said tone pitch information present within said second time section, and then said control means performs control to activate, into the displaying state of predetermined display mode, said key-displaying elements corresponding to the tone pitch information of the performance information present within said second time section.

24. An electronic musical instrument as claimed in claim 21, wherein the control means simultaneously activates, into the displaying state, the key-displaying element corresponding to every tone pitch information contained in the performance information present within the time section.

25. An electronic musical instrument as claimed in claim 21, wherein the dividing means divides, into the plurality of time sections, the performance information for a single performance part of the music piece supplied from the performance information supply means.

26. An electronic musical instrument as claimed in claim 21, wherein the performance information supply means supplies a series of performance information for each of plural performance parts constituting the optional music piece and also supplies end information at the end of each of said series of performance information.

27. An electronic musical instrument comprising:

a plurality of performance operators corresponding to a plurality of tone pitches;

display means including a plurality of key-displaying elements provided in corresponding relation to said performance operators;

performance information supply means for supplying a series of performance information constituting optional music piece, said performance information containing at least tone pitch information;

dividing means for dividing the performance information for a music piece supplied from said performance information supply means into a plurality of time sections, and for modifying said performance information by inserting dividing information at points corresponding to divisions between said time sections; and control means for, in accordance with performance progression of the music piece and for each of the time sections, performing control to activate, into a displaying state of predetermined display mode, said key-displaying elements corresponding to the tone pitch information contained in the performance information present within a first time section, and also start activating, in the course of or at the end of said first time section, said key-displaying elements corresponding to the tone pitch information of the performance information present within a second time section following said first time section into a displaying state of predetermined display mode, wherein prior to starting activating said key-displaying elements for said second time section, said control means performs control to sequentially activate, into a displaying state, predetermined one or more of said key-displaying elements provided between first said key-displaying element corresponding to predetermined said tone pitch information present within said first time section and second said key-displaying element corresponding to predetermined said tone pitch information present within said second time section.

28. An electronic musical instrument as defined in claim 27 wherein said first key-displaying element corresponds to the tone pitch information to be performed last in said first time section, and said second key-displaying element corresponds to the tone pitch information to be performed first in said second time section.

29. A phrase dividing device comprising:

performance information supply means for supplying a series of performance information constituting optional music piece;

detection means for detecting, from the series of performance information, a change point where performance fingering changes, and dividing means for determining a point dividing the music piece on the basis of detection by said detection means and dividing the series of performance information supplied from said performance information supply means, at said point determined by said dividing means, into a plurality of time sections.

30. A phrase dividing device as defined in claim 29 wherein said detection means detects a change point where player's fingers operating said performance operators effects cross-fingering.

31. An electronic musical instrument as claimed in claim 29, wherein the dividing means divides, into the plurality of time sections, the performance information for a single performance part of the music piece supplied from the performance information supply means.

32. An electronic musical instrument as claimed in claim 29, wherein the performance information supply means supplies a series of performance information for each of plural performance parts constituting the optional music piece and also supplies end information at the end of each of said series of performance information.

33. A phrase dividing device comprising:

performance information supply means for supplying a series of performance information constituting optional music piece;

foot operator information supply means including a foot operator operable by a player's foot and supplying foot operator information indicative of an operational state of said foot operator, and dividing means for dividing the series of performance information supplied from said performance information supply means into a plurality of time sections, in accordance with the foot operator information supplied from said foot operator information supply means, and for modifying said performance information by inserting dividing information at points corresponding to divisions between said time sections.

34. An electronic musical instrument as claimed in claim 33, wherein the dividing means divides, into the plurality of time sections, the performance information for a single performance part of the music piece supplied from the performance information supply means.

35. An electronic musical instrument as claimed in claim 33, wherein the performance information supply means supplies a series of performance information for each of plural performance parts constituting the optional music piece and also supplies end information at the end of each of said series of performance information.

36. A phrase dividing device comprising:

performance information supply means for supplying a series of performance information constituting optional music piece, said performance information including at least key-on and key-off information to control tone generation;

detection means for detecting, on the basis of the key-on and key-off information supplied from said performance information supply means, when an key-off state lasts more than a predetermined time, and dividing means for, on the basis of detection by said detection means, dividing the series of performance information supplied from said performance information supply means at every point where the key-off state lasts more than the predetermined time and thereby dividing the series of performance information into a plurality of time sections.

37. A phrase dividing device as defined in claim 36 wherein said predetermined time is determined by a predetermined calculation based on the performance information supplied from said performance information supply means and has a time length variable in response to a variation in the performance information.

38. A phrase dividing device as defined in claim 36 wherein said predetermined time has an optionally set time length.

39. An electronic musical instrument as claimed in claim 36, wherein the dividing means divides, into the plurality of time sections, the performance information for a single performance part of the music piece supplied from the performance information supply means.

40. An electronic musical instrument as claimed in claim 36, wherein the performance information supply means supplies a series of performance information for each of plural performance parts constituting the optional music piece and also supplies end information at the end of each of said series of performance information.

41. A phrase dividing device comprising:

performance information supply means for supplying a series of performance information constituting optional music piece, said performance information including at least tone pitch information, and dividing means for dividing the series of performance information supplied from said performance information supply means into a plurality of time sections, on the basis of a pitch range of the tone pitch information supplied from said performance information supply means, and for modifying said performance information by inserting dividing information at points corresponding to divisions between said time sections.

42. An electronic musical instrument as claimed in claim 41, wherein the dividing means divides, into the plurality of time sections, the performance information for a single performance part of the music piece supplied from the performance information supply means.

43. An electronic musical instrument as claimed in claim 41, wherein the performance information supply means supplies a series of performance information for each of plural performance parts constituting the optional music piece and also supplies end information at the end of each of said series of performance information.

44. A phrase dividing device comprising:

performance information supply means for supplying a series of performance information constituting optional music piece, said performance information including at least tone pitch information, and dividing means for dividing the series of performance information supplied from said performance information supply means into a plurality of time sections in such a manner that the number of different tone pitch information contained in each of the time sections is less than a predetermined value, and for modifying said performance information by inserting dividing information at points corresponding to divisions between said time sections.

45. An electronic musical instrument as claimed in claim 44, wherein the dividing means divides, into the plurality of time sections, the performance information for a single performance part of the music piece supplied from the performance information supply means.

46. An electronic musical instrument as claimed in claim 44, wherein the performance information supply means supplies a series of performance information for each of plural performance parts constituting the optional music piece and also supplies end information at the end of each of said series of performance information.

47. A phrase dividing device comprising:

performance information supply means for supplying a series of performance information constituting optional music piece, said performance information including at least tone pitch information, and dividing means for dividing the series of performance information supplied from said performance information supply means into a plurality of time sections in such a manner that the number of different tone pitch information contained in each of the time sections is more than a predetermined value, and for modifying said performance information by inserting dividing information at points corresponding to divisions between said time sections.

48. An electronic musical instrument as claimed in claim 47, wherein the dividing means divides, into the plurality of time sections, the performance information for a single performance part of the music piece supplied from the performance information supply means.

49. An electronic musical instrument as claimed in claim 47, wherein the performance information supply means supplies a series of performance information for each of plural performance parts constituting the optional music piece and also supplies end information at the end of each of said series of performance information.

50. A phrase dividing device comprising:

performance information supply means for supplying a series of performance information constituting optional music piece, said performance information including at least tone pitch information, and dividing means for dividing the series of performance information supplied from said performance information supply means into a plurality of time sections in such a manner that the number of different tone pitch information contained in each of the time sections is within a range between first and second predetermined values, and for modifying said performance information by inserting dividing information at points corresponding to divisions between said time sections.

51. An electronic musical instrument as claimed in claim 50, wherein the dividing means divides, into the plurality of time sections, the performance information for a single performance part of the music piece supplied from the performance information supply means.

52. An electronic musical instrument as claimed in claim 50, wherein the performance information supply means supplies a series of performance information for each of plural performance parts constituting the optional music piece and also supplies end information at the end of each of said series of performance information.

53. A phrase dividing device comprising:

performance information supply means for supplying a series of performance information constituting optional music piece, said performance information including at least tone pitch information, and dividing means for dividing the series of performance information supplied from said performance information supply means into a plurality of time sections, in accordance with the number of the tone pitch information contained in the performance information, and for modifying said performance information by inserting dividing information at points corresponding to divisions between said time sections.

54. An electronic musical instrument as claimed in claim 53, wherein the dividing means divides, into the plurality of time sections, the performance information for a single performance part of the music piece supplied from the performance information supply means.

55. An electronic musical instrument as claimed in claim 53, wherein the performance information supply means supplies a series of performance information for each of plural performance parts constituting the optional music piece and also supplies end information at the end of each of said series of performance information.

56. An electronic musical instrument comprising:

a plurality of performance operators corresponding to a plurality of tone pitches;

a display device that includes a plurality of key-displaying elements provided in corresponding relation to said performance operators;

a performance information supply section that supplies a series of performance information constituting optional music pieces, said performance information containing at least tone pitch information;

a dividing section that divides the performance information for a music piece supplied from said performance information supply section into a plurality of time sections, in accordance with contents of the performance information, and that modifies said performance information by inserting dividing information at points corresponding to divisions between said time sections; and a control section that, in accordance with performance progression of the music piece and for each of the time sections, activates, into a displaying state, said key-displaying element corresponding to every tone pitch information contained in the performance information present within the time section.

57. A phrase dividing device comprising:

a performance information supply section that supplies a series of performance information constituting optional music pieces, said performance information including at least key-on and key-off information to control tone generation;

a detection section that detects, on the basis of the key-on and key-off information supplied from said performance information supply section, when a key-off state lasts more than a predetermined time, and a dividing section that, on the basis of detection by said detection section, divides the series of performance information supplied from said performance information supply section at every point where the key-off state lasts more than the predetermined time and thereby divides the series of performance information into a plurality of time sections.

58. A phrase dividing device comprising:

a performance information supply section that supplies a series of performance information constituting optional music pieces, said performance information including at least tone pitch information, and a dividing section that divides the series of performance information supplied from said performance information supply section into a plurality of time sections, on the basis of a pitch range of the tone pitch information supplied from said performance information supply section, and that modifies said performance information by inserting dividing information at points corresponding to divisions between said time sections.

59. A method of key-displaying in an electronic musical instrument which comprises a plurality of performance operators corresponding to a plurality of tone pitches and a display device including a plurality of key-displaying elements provided in corresponding relation to said performance operators, said method comprising the steps of:

supplying a series of performance information constituting optional music pieces, said performance information containing at least tone pitch information;

dividing the performance information for a music piece supplied by the step of supplying into a plurality of time sections, in accordance with contents of the performance information;

modifying said performance information by inserting dividing information at points corresponding to divisions between said time sections; and activating, in accordance with performance progression of the music piece and for each of the time sections, into a displaying state, said key-displaying element corresponding to every tone pitch information contained in the performance information present within the time section.

60. A method of dividing performance information into plural phrases, said method comprising the steps of:

supplying a series of performance information constituting optional music pieces, said performance information including at least key-on and key-off information to control tone generation;

detecting, on the basis of the key-on and key-off information supplied by the step of supplying, when a key-off state lasts more than a predetermined time, and dividing, on the basis of detection by the step of detecting, the series of performance information supplied by the step of supplying at every point where the key-off state lasts more than the predetermined time and thereby dividing the series of performance information into a plurality of time sections.

61. A method of dividing performance information into plural phrases, said method comprising the steps of:

supplying a series of performance information constituting optional music pieces, said performance information including at least tone pitch information;

dividing the series of performance information supplied by the step of supplying into a plurality of time sections, on the basis of a pitch range of the tone pitch information supplied by said step of supplying; and modifying said performance information by inserting dividing information at points corresponding to divisions between said time sections.

62. A machine-readable recording medium containing a group of instructions of a program for key-displaying in an electronic musical instrument to be executed by a processor, said electronic musical instrument having a plurality of performance operators corresponding to a plurality of tone pitches and a display device including a plurality of key-displaying elements provided in corresponding relation to said performance operators, said method comprising the steps of:

supplying a series of performance information constituting optional music pieces, said performance information containing at least tone pitch information;

dividing the performance information for a music piece supplied by the step of supplying into a plurality of time sections, in accordance with contents of the performance information;

modifying said performance information by inserting dividing information at points corresponding to divisions between said time sections; and activating, in accordance with performance progression of the music piece and for each of the time sections, into a displaying state, said key-displaying element corresponding to every tone pitch information contained in the performance information present within the time section.

63. A machine-readable recording medium containing a group of instructions of a program for dividing performance information into plural phrases to be executed by a processor, said program comprising the steps of:

supplying a series of performance information constituting optional music pieces, said performance information including at least key-on and key-off information to control tone generation;

detecting, on the basis of the key-on and key-off information supplied by the step of supplying, when a key-off state lasts more than a predetermined time, and dividing, on the basis of detection by the step of detecting, the series of performance information supplied by the step of supplying at every point where the key-off state lasts more than the predetermined time and thereby dividing the series of performance information into a plurality of time sections.

64. A machine-readable recording medium containing a group of instructions of a program for dividing performance information into plural phrases to be executed by a processor, said program comprising steps of:

supplying a series of performance information constituting optional music pieces, said performance information including at least tone pitch information;

dividing the series of performance information supplied by the step of supplying into a plurality of time sections, on the basis of a pitch range of the tone pitch information supplied by said step of supplying; and modifying said performance information by inserting dividing information at points corresponding to divisions between said time sections.

65. An electronic musical instrument comprising:

a plurality of performance operators corresponding to a plurality of tone pitches;

a display coupled to said performance operators having a plurality of key-displaying elements provided in corresponding relation to said performance operators;

a performance information memory adapted to provide a series of performance information constituting optional music pieces, said performance information containing at least tone pitch information; and a processor coupled to at least said performance information memory and said key displaying elements, the processor adapted to divide the performance information provided by said performance information memory into a plurality of time sections, in accordance with contents of the performance information, wherein said processor is also adapted to modify said performance information by inserting dividing information at points corresponding to divisions between said time sections, wherein said processor is also adapted to activate into a displaying state, in accordance with performance progression of the music piece and for each of the time sections, said key-displaying elements corresponding to every tone pitch information contained in the performance information present within the time section.

66. A phrase dividing device comprising:

a performance information memory adapted to supply a series of performance information constituting optional music pieces, said performance information including at least key-on and key-off information to control tone generation;

a depressed key detection circuit coupled to said performance information memory adapted to detect, on the basis of the key-on and key-off information supplied from said performance information memory, when a key-off state lasts more than a predetermined time, and a processor coupled to at least said performance information memory and said depressed key detection circuit, the processor adapted to divide, on the basis of detection by said depressed key detection circuit, the series of performance information supplied from said performance information memory at every point where the key-off state lasts more than the predetermined time, thereby dividing the series of performance information into a plurality of time sections.

67. A phrase dividing device comprising:

a performance information memory adapted to supply a series of performance information constituting optional music pieces, said performance information including at least tone pitch information, and a processor coupled to said performance information memory adapted to divide the series of performance information supplied from said performance information memory into a plurality of time sections, on the basis of a pitch range of the tone pitch information supplied from said performance information memory, wherein said processor is also adapted to modify said performance information by inserting dividing information at points corresponding to divisions between said time sections.

* * * * *